(12) United States Patent
Menze et al.

(10) Patent No.: US 8,162,521 B2
(45) Date of Patent: *Apr. 24, 2012

(54) INDEPENDENT LIGHTING ENERGY INTERRUPTION SYSTEM WITH ENERGY SUBDIVISIONING AND METHOD

(75) Inventors: William F. Menze, Escanaba, MI (US); Michael L. Schultz, Lomira, WI (US); Timothy G. Koch, Slinger, WI (US)

(73) Assignee: Sno-Way International, Inc., Hartford, WI (US)

(*) Notice: Subject to any disclaimer, the term of this patent is extended or adjusted under 35 U.S.C. 154(b) by 34 days.

This patent is subject to a terminal disclaimer.

(21) Appl. No.: 12/843,165

(22) Filed: Jul. 26, 2010

(65) Prior Publication Data

US 2011/0103087 A1 May 5, 2011

Related U.S. Application Data

(63) Continuation of application No. 12/189,460, filed on Aug. 11, 2008, now Pat. No. 7,762,698, which is a continuation-in-part of application No. 11/341,144, filed on Jan. 27, 2006, now Pat. No. 7,410,281, which is a continuation-in-part of application No. 11/146,985, filed on May 29, 2005, now Pat. No. 7,438,458, which is a continuation-in-part of application No. 11/047,303, filed on Jan. 31, 2005, now Pat. No. 7,137,724.

(51) Int. Cl.
*B60Q 1/04* (2006.01)
*B60Q 1/26* (2006.01)
*H01R 33/00* (2006.01)

(52) U.S. Cl. ............. 362/543; 362/540; 315/82; 439/36

(58) Field of Classification Search .................. 362/507, 362/543, 549, 540; 307/10.1; 315/82; 439/36
See application file for complete search history.

(56) References Cited

U.S. PATENT DOCUMENTS

| | | | |
|---|---|---|---|
| 4,280,062 A | 7/1981 | Miller et al. |
| 5,420,480 A | 5/1995 | Knepel et al. |
| 5,951,144 A | 9/1999 | Gavigan et al. |
| 5,997,320 A | 12/1999 | DeMello |
| 6,005,300 A | 12/1999 | Kelly |
| 6,153,975 A | 11/2000 | Perdec |
| 6,154,122 A | 11/2000 | Menze |
| 6,265,829 B1 | 7/2001 | Perdec |
| 6,273,729 B1 | 8/2001 | Kelly |
| 6,323,759 B1 | 11/2001 | Menze |
| 6,396,210 B1 | 5/2002 | Menze |
| 6,640,468 B2 | 11/2003 | Menze |

(Continued)

*Primary Examiner* — Alan Cariaso
(74) *Attorney, Agent, or Firm* — Reinhart Boerner Van Deuren s.c.

(57) ABSTRACT

An auxiliary lighting energy interruption system for use with snow plows and like front-mounted vehicle accessories is disclosed which facilitates the interconnection of such systems to the lighting system of a vehicle upon which the vehicle accessory is mounted to provide power to and to control the auxiliary lights with the lighting system of the vehicle. The system provides first and second harness portions for respective installation on the vehicle and the vehicle accessory, with the first harness portion having a first configuration when it is not connected to the second harness portion and a second configuration when it is connected to the second harness portion. The first configuration allow the headlights on the vehicle to operate, while the second configuration allows only the headlights on the vehicle accessory to operate, with changes between the first and second configurations being accomplished without the need for a switch or a relay.

22 Claims, 30 Drawing Sheets

U.S. PATENT DOCUMENTS

| | | |
|---|---|---|
| 6,790,092 B2 | 9/2004 | Parsadayan et al. |
| 7,137,724 B2 | 11/2006 | Menze et al. |
| 7,762,698 B2 * | 7/2010 | Menze .................. 362/543 |
| 2002/0171291 A1 | 11/2002 | Wayne et al. |
| 2006/0172558 A1 | 8/2006 | Menze et al. |
| 2006/0172559 A1 | 8/2006 | Menze et al. |

* cited by examiner

INDEPENDENT LIGHTING ENERGY INTERRUPTION SYSTEM WITH ENERGY SUBDIVISIONING AND METHOD

IDENTIFICATION OF RELATED APPLICATIONS

This patent application is a continuation of U.S. patent application Ser. No. 12/189,460, filed on Aug. 11, 2008, now U.S. Pat. No. 7,762,698, granted on Jul. 27, 2010, entitled "Independent Lighting Energy Interruption System With Energy Subdivisioning and Method," which in turn is a continuation-in-part of U.S. patent application Ser. No. 11/341,144, filed on Jan. 27, 2006, now U.S. Pat. No. 7,410,281, granted on Aug. 12, 2008, entitled "Independent Lighting Energy Interruption System With Advanced Reconfiguration and Method," which itself is a continuation-in-part of U.S. patent application Ser. No. 11/146,985, filed on May 29, 2005, now U.S. Pat. No. 7,438,458, granted on Oct. 21, 2008, entitled "Independent Lighting Energy Interruption System and Method," which in turn is a continuation-in-part of U.S. patent application Ser. No. 11/047,303, filed on Jan. 31, 2005, now U.S. Pat. No. 7,137,724, granted on Nov. 21, 2006, entitled "Independent Lighting System and Method," all four of which patent applications are assigned to the assignee of the present invention, and all four of which patent applications are hereby incorporated herein by reference in their entirety.

BACKGROUND OF THE INVENTION

Field of the Invention

The present invention relates generally to auxiliary lighting systems such as those found on snow plows and like front-mounted vehicle accessories, and more particularly to a wiring harness for facilitating the interconnection of such auxiliary lighting systems to the lighting system of a vehicle upon which the vehicle accessory is mounted to provide power to and to control the auxiliary lights with the lighting system of the vehicle.

Snow plows and like front-mounted vehicle accessories are mounted on vehicles such as pickup trucks or sport utility vehicles (SUV's) have been in use for some time, and such snow plows allow the quick and convenient plowing and removal of snow using the vehicle. Such snow plows and like front-mounted vehicle accessories are removable from the vehicle so that they need be attached to the vehicle only when needed (for snow plows, during the winter season when they will be used, with snow plows typically being removed from the vehicle for the balance of the year). Since such front-mounted vehicle accessories are mounted at the front of the vehicle in a position and at a level in front of the front end of the vehicle, they obstruct the lights of the vehicle, thereby necessitating the inclusion of lights on the vehicle accessory (for snow plows, in a position above the blade of the snow plow). It is particularly important to include headlights on such vehicle accessories which may be used at night (snow plows are frequently used in the early morning hours following a snow storm, well prior to sunrise).

Such front-mounted vehicle accessories typically have auxiliary headlights which are mounted on lighting bars located on the frames of the vehicle accessories. Since front-mounted vehicle accessories are mounted on vehicles in positions which obstruct the headlights of the vehicles, the headlights of vehicles having such vehicle accessories mounted thereon are typically disconnected. This is done for two reasons, the first of which is that since the headlights of a vehicle having a front-mounted vehicle accessory are obstructed by the vehicle accessory, and thus the headlights of the vehicle do not provide useful light and are redundant in view of the headlights mounted on the vehicle accessory. The second reason is that the simultaneous use of both headlights on a vehicle and headlights on a front-mounted vehicle accessory will require a high current drain which will have a number of adverse effect on the vehicle ranging from blowing the fuses on the headlights circuit to potentially and rapidly draining the battery and disabling the vehicle.

For this reason, lighting systems on front-mounted vehicle accessories are designed to allow the headlights of the vehicle to be disconnected and instead to operate the headlights of the vehicle accessory from the lighting system of the vehicle. Early examples of such lighting systems for use with snow plows are shown in U.S. Pat. No. 4,280,062, to Miller et al., and in U.S. Pat. No. 5,420,480, to Knepel et al., both of which are hereby incorporated herein by reference. The Miller et al. reference shows an auxiliary light wiring harness which plugs into the lighting system of the vehicle and provides a switch which allows an operator of the vehicle to select either the vehicle headlights or the snow plow headlights. This system of course has the substantial disadvantage of running extended lengths of wiring through which the electrical current operating the headlights must travel, potentially resulting in losses and diminished brightness from the headlights.

The Knepel et al. shows an automatic headlight switching system which utilizes relays to perform the function of switching between the vehicle headlights or the snow plow headlights. A connector is provided to connect the portion of the wiring harness of the headlight switching system in the vehicle to the portion of the wiring harness on the snow plow. The headlight system detects when the lighting harness of the snow plow is plugged into the wiring harness of the vehicle and actuates the relays to connect the headlights on the snow plow and to disconnect the headlights on the vehicle.

More recently, there have been several additional systems which may be used to interconnect the lighting system of a vehicle with the wiring system of a front-mounted vehicle accessory such as a snow plow. Examples of such systems are shown in U.S. Pat. No. 6,005,300, to Kelly, in U.S. Pat. No. 6,265,829, to Perdec, and in U.S. Pat. No. 6,396,210, to Menze, all of which are hereby incorporated herein by reference. The Kelly reference uses a lighting switch connected to an independent circuit to operate a control module which switches power between the vehicle headlights and the auxiliary headlights. The Perdec reference uses a microprocessor module which may be wirelessly controlled to control the operation of and switching between the vehicle headlights and the auxiliary headlights. The Menze reference discloses a headlight adapter system which uses modular wiring harnesses and connectors with a headlight selector switch to switch power between the vehicle headlights and auxiliary snow plow headlights.

All of these references have one thing in common in that each of them require a switching mechanism of some sort to switch between operation of the vehicle headlights and operation of the auxiliary headlights. The reason for the requirement of a switch is simple—each of these references adds a wiring harness which is permanently installed in the vehicle, and which plugs into a wiring harness located on the front-mounted vehicle accessory. Since it is a requirement that the vehicle headlights and the auxiliary headlights not be operated simultaneously, at least not with both at full intensity, in order to prevent excessive current drain, these previously known systems each require the use of a switch to select either the vehicle headlights or the auxiliary headlights.

Some vehicle lighting systems contain a computer that monitors the lighting circuits for at least headlights, and in some instances parking lights and turn signals as well. In such vehicles, if the right and left side vehicle harness portions are unplugged with the lights on (either turned on manually or in the "auto" position, whether or not the lights are illuminated by the system), a malfunction may be detected by the vehicle computer. When a predetermined number of these malfunctions has occurred, the vehicle must be returned to the dealer to have the computer reset, which is costly and takes the vehicle out of service while the computer is being reset. If the problem reoccurs, the computer must be replaced, which is an even more expensive problem.

It is accordingly the primary objective of the present invention that it provide an independent lighting system for facilitating the operation of auxiliary headlights which automatically disconnects the vehicle headlights whenever the auxiliary headlights are connected for operation with the lighting system of the vehicle. It is a related objective of the present invention that it will automatically disconnect the vehicle headlights and automatically connect the auxiliary headlights when the wiring harness of the front-mounted vehicle accessory is connected to the wiring harness of the vehicle. It is another related objective of the present invention that it eliminate the need for any relays or additional electronic components to perform a switching function between the vehicle headlights and the auxiliary headlights.

It is a further objective of the present invention that it feature a simplified design which does not require any wiring or other connection to the passenger compartment of the vehicle in which it is to be installed. It is a related objective of the present invention that it be relatively simple and quick to install, and that it does not require either advanced knowledge of vehicle electrical systems or special tools in order to accomplish its installation. It is yet another objective of the present invention that it provide sealed connectors to protect against the elements to which it will be exposed in operation. It is a related objective of the present invention that it not rely upon the need for connector caps to protect its connectors, but rather that it eliminate the need for such caps, thereby precluding the possibility of such caps being lost or misplaced.

The independent lighting system of the present invention must also be of construction which is both durable and long lasting, and it should also require little or no maintenance to be provided by the user throughout its operating lifetime. In order to enhance the market appeal of the independent lighting system of the present invention, it should also be of inexpensive construction to thereby afford it the broadest possible market. Finally, it is also an objective that all of the aforesaid advantages and objectives of the independent lighting system of the present invention be achieved without incurring any substantial relative disadvantage.

SUMMARY OF THE INVENTION

The disadvantages and limitations of the background art discussed above are overcome by the present invention. With this invention, an independent lighting system consists of a first wiring harness portion that is connected to the lights of a conventional vehicle lighting system located at the front of the vehicle, and a second wiring harness portion that is connected to auxiliary lights mounted on a vehicle accessory such as a snow plow. The lights which are respectively connected to the two wiring harnesses include, at a minimum, the headlights of the vehicle and auxiliary headlights on the vehicle accessory.

The headlights of vehicles typically utilize modular connectors, with each of the headlights having prongs extending from the back side thereof and the vehicle wiring harness having headlight plugs which are plugged onto the prongs extending from the back side of the headlights. The first harness portion of the independent lighting systems includes connectors which fit between the headlight plugs and the prongs extending from the back side of the headlights. A headlight connector is plugged onto the prongs extending from the back side of each of the headlights, replacing the headlight plugs. A headlight power connector is plugged into each of the headlight plugs, which were plugged onto the prongs extending from the back side of the headlights prior to installation of the independent lighting systems of the present invention.

In the preferred embodiment, the first harness portion of the independent lighting systems of the present invention that is located in the vehicle includes a universal main vehicle harness portion and right and left auxiliary harness portions which are plugged in to the main vehicle harness portion (the right auxiliary harness portion(s) is (are) for connection to the headlight on the right side of the vehicle, and the left auxiliary harness portion(s) is (are) for connection to the headlight on the left side of the vehicle). The right and left auxiliary harness portions each have an auxiliary harness connector as well as a headlight connector and/or a headlight power connector. The auxiliary harness connectors on the right and left auxiliary harness portions mate with auxiliary harness connectors on the main vehicle harness portion.

The main vehicle harness portion has two additional mating harness connectors, with one of the harness connectors being a male harness connector and the other of the harness connectors being a female harness connector. Prior to installation of the vehicle accessory, the male and female harness connectors on the main vehicle harness portion of the independent lighting systems of the present invention are connected together, and the headlights of the vehicle operate in their normal fashion. It should be noted that if the male and female harness connectors on the main vehicle harness portion are not connected together, the headlights of the vehicle will not operate, at least not at their normal intensity.

However, resistors are included to ensure that each of the headlights are electrically connected to the lighting system of the vehicle, thereby avoiding the occurrence of a vehicle computer-detected malfunction if the male and female harness connectors on the main vehicle harness portions are disconnected with the vehicle lights on. The use of the resistor ensures that energy from the lighting system will continue to flow through the lights, thereby preventing the vehicle computer from detecting a malfunction in this event. A separate resistor may be used for each of the headlights (separate resistors for each high or low beam on each side of the vehicle), and resistors may also be used for the parking lights and/or turn signals if they are to be deactivated on the vehicle in favor of corresponding lights on the snow plow.

The second harness portion of the independent lighting systems of the present invention is connected to headlights mounted on the vehicle accessory, and in the preferred embodiment the second harness portion includes right and left halves. The right half of the second harness portion is connected to a headlight on the right side of the vehicle accessory, and the left half of the second harness portion is connected to a headlight on the left side of the vehicle accessory. Each half of the second harness portion has a harness connector, with the harness connectors on the right and left halves of the second harness portion being mating connectors, with one of the harness connectors being a male harness connector and the other of the harness connectors being a female harness connector.

When the vehicle accessory is mounted on the vehicle, the harness connectors on main vehicle harness portion in the vehicle are disconnected from each other, and are respectively connected to the harness connectors on the second harness portion on the vehicle accessory. In the preferred embodiment, the harness connector on the right side of the second harness portion on the vehicle accessory will be connected to the main vehicle harness connector corresponding to the right side lighting of the vehicle, and the harness connector on the left side of the second harness portion on the vehicle accessory will be connected to the main vehicle harness connector corresponding to the left side lighting of the vehicle. Since the harness connectors are male and female mating connectors, it will be appreciated by those skilled in the art that the proper interconnections of the two harness portions will be ensured. It will also be appreciated by those skilled in the art than one of the harness connectors in the second harness portion on the vehicle accessory is male, while the other harness connector in the second harness portion is female.

When the first harness portion in the vehicle is so connected to the second harness portion on the vehicle accessory, the headlights on the vehicle accessory will be operated by the headlight controls of the vehicle, and the headlights of the vehicle will be disconnected and thus will not operate. This includes both high beams and low beams of the headlights. When the vehicle accessory is to be disconnected and removed from the vehicle, the first harness portion is disconnected from the second harness portion, with the harness connectors in the first harness portion in the vehicle being connected together to reconnect the headlights in the vehicle. In addition, the harness connectors in the second harness portion on the vehicle accessory may be connected together to protect them from corrosion. In the preferred embodiment, the harness connectors in both of the first and second harness portions are of weatherproof design and have a sealing construction to protect them from the elements and corrosion.

In the preferred embodiment of the independent lighting systems of the present invention, the first and second harness portions also include wiring and connections to operate parking lights and turn signals on the vehicle accessory when it is installed on the vehicle. Since parking lights and turn signals on some recent vehicles draw too much current to operate simultaneously with the parking lights and the turn signals on the vehicle, the parking lights and the turn signals on the vehicle may if desired be deactivated when the harness connectors of the first harness portion are connected to the harness connectors in the second harness portion, or when the harness connectors in the first harness portion are disconnected.

There are a number of different embodiments of the independent lighting systems of the present invention as described herein, with the different versions being characterized by different auxiliary harness connectors. In all embodiments, the electrically hot connections to the headlights and optionally the electrically hot connections to the parking lights and turn signals are interrupted when the first and second harness portions are connected together. In the various embodiments, both the main vehicle harness as well as the left and right harness portions of the vehicle accessory are unchanged irrespective of which vehicle the vehicle accessory is connected to. Only the right and left auxiliary harnesses need vary from one vehicle to the next.

It may therefore be seen that the present invention teaches independent lighting systems which facilitate the operation of auxiliary headlights by automatically disconnecting the vehicle headlights whenever the auxiliary headlights are connected for operation with the lighting system of the vehicle. The independent lighting systems of the present invention completely eliminate the need for any type of switch to choose between the vehicle headlights and the auxiliary headlights due to their design that allows the mere connection of the wiring harness of the front-mounted vehicle accessory to the wiring harness of the vehicle to disconnect the vehicle headlights and to connect the auxiliary. The independent lighting systems of the present invention also eliminate the need for any relays or additional electronic components to perform a switching function between the vehicle headlights and the auxiliary headlights.

The independent lighting systems of the present invention feature a simplified design which does not require any wiring or other connection to the passenger compartment of the vehicle in which it is installed. The independent lighting systems of the present invention are relatively simple and quick to install, and they require neither advanced knowledge of vehicle electrical systems nor special tools in order to accomplish its installation. The independent lighting systems of the present invention provide sealed connectors to protect against the elements to which they will be exposed in operation, and do not rely upon the need for connector caps to protect their connectors, but rather eliminate the need for such caps entirely, thereby precluding the possibility of their loss or misplacement.

The independent lighting systems of the present invention are of a construction which is both durable and long lasting, and will require little or no maintenance to be provided by the user throughout its operating lifetime. The independent lighting systems of the present invention are also of inexpensive construction to enhance their market appeal and to thereby afford them the broadest possible market. Finally, all of the aforesaid advantages and objectives of the independent lighting systems of the present invention are achieved without incurring any substantial relative disadvantage.

DESCRIPTION OF THE DRAWINGS

These and other advantages of the present invention are best understood with reference to the drawings, in which.

DETAILED DESCRIPTION OF THE PREFERRED EMBODIMENT

Figure 1:
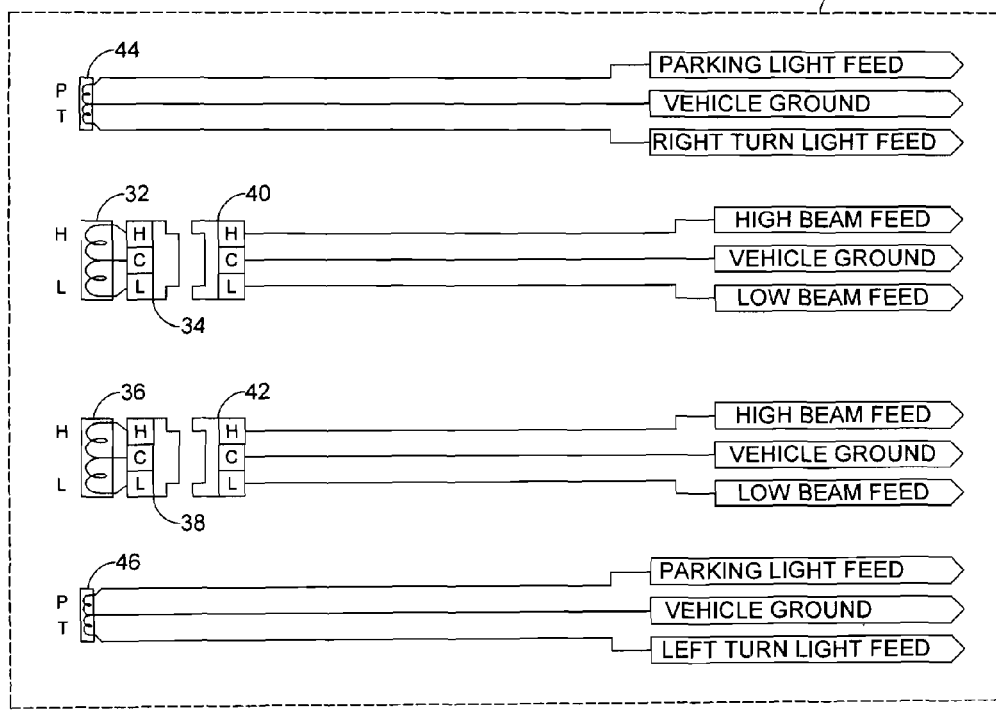
FIG. 1 is a schematic depiction of a portion of a conventional vehicle lighting system showing the lights located at the front of the vehicle, and also showing connectors which are used to connect the two headlights to the vehicle lighting system to provide power to the headlights.

Prior to a description of the present invention, it is helpful to briefly review several of the principal elements of lighting systems used in vehicles and vehicle accessories, and a few features of their common construction. Referring first to FIG. 1, the lights of a conventional vehicle lighting system which are located at the front of a vehicle 30 are illustrated, together with their connection to the electrical system of the vehicle 30. A headlight 32 having a connector element 34 (typically prongs extending from the back side thereof) is located on the right side of the vehicle 30 and a headlight 36 having a connector element 38 (also typically prongs extending from the back side thereof) is located on the left side of the vehicle 30.

A headlight plug 40 is shown for connection to the connector element 34 on the headlight 32, and a headlight plug 42 is shown for connection to the connector element 38 on the headlight 36. The headlight plugs 40 and 42 are shown as each being electrically connected to a high beam feed (a high beam electrically hot connection), a low beam feed (a low beam electrically hot connection), and a vehicle ground. The high beam feed and the vehicle ground are both connected to a high beam filament in each of the headlights 32 and 36, and the low beam feed and the vehicle ground are both connected to a low beam filament in each of the headlights 32 and 36.

Also included in the vehicle 30 is a parking/turn light 44 on the right side of the vehicle 30 and a parking/turn light 46 on the left side of the vehicle 30. The parking/turn lights 44 and 46 are shown as each being electrically connected to a parking light feed (a parking light electrically hot connection), a turn signal feed (a turn signal electrically hot connection), and the vehicle ground. The parking light feed and the vehicle ground are both connected to a parking light filament in each of the parking/turn lights 44 and 46, the right turn signal feed and the vehicle ground are connected to a turn signal filament in the parking/turn light 44, and the left turn signal feed and the vehicle ground are connected to a turn signal filament in the parking/turn light 46.

Figure 2:
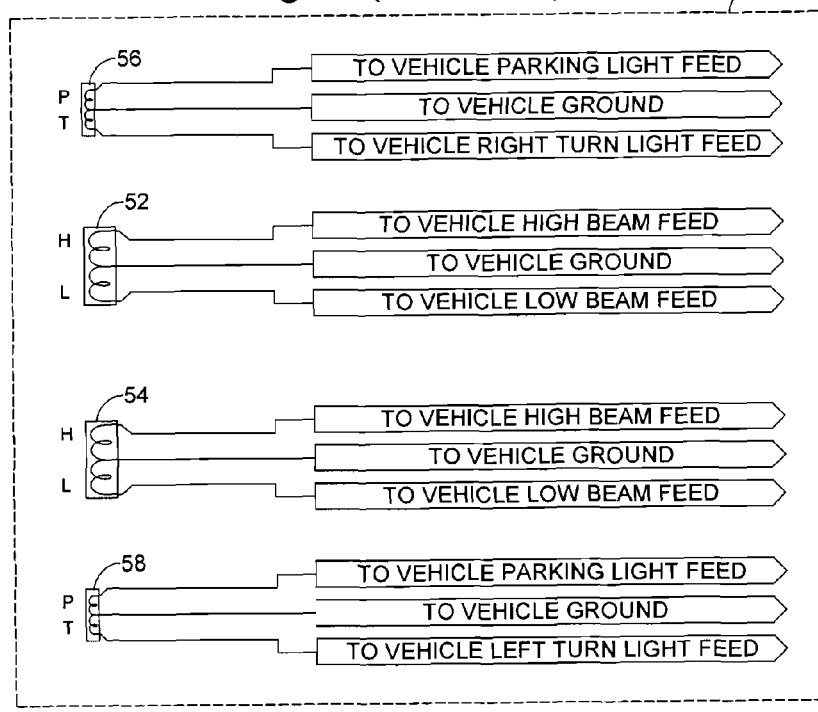
FIG. 2 is a schematic depiction of auxiliary lights located on a vehicle accessory which must be connected to the vehicle lighting system shown in FIG. 1 to operate the auxiliary lights.

Referring next to FIG. 2, the auxiliary lights located on a vehicle accessory 50 to be operated by the vehicle lighting system of the vehicle 30 (shown in FIG. 1) are illustrated, together with connections to be made to the electrical system of the vehicle 30 to operate them. A headlight 52 is located on the right side of the vehicle accessory 50 and a headlight 54 is located on the left side of the vehicle accessory 50. The headlights 52 and 54 are shown as each being electrically connected to a vehicle high beam feed (a high beam electrically hot connection from the vehicle 30), a vehicle low beam feed (a low beam electrically hot connection from the vehicle 30), and a vehicle ground (from the vehicle 30). The vehicle high beam feed and the vehicle ground are both connected to a high beam filament in each of the headlights 52 and 54, and the vehicle low beam feed and the vehicle ground are both connected to a low beam filament in each of the headlights 52 and 54.

Also included in the vehicle accessory 50 is a parking/turn light 56 on the right side of the vehicle accessory 50 and a parking/turn light 58 on the left side of the vehicle accessory 50. The parking/turn lights 56 and 58 are shown as each being electrically connected to a vehicle parking light feed (a parking light electrically hot connection from the vehicle 30), a vehicle turn signal feed (a turn signal electrically hot connection from the vehicle 30), and the vehicle ground (from the vehicle 30). The vehicle parking light feed and the vehicle ground are both connected to a parking light filament in each of the parking/turn lights 56 and 58, the vehicle right turn signal feed and the vehicle ground are connected to a turn signal filament in the parking/turn light 56, and the vehicle left turn signal feed and the vehicle ground are connected to a turn signal filament in the parking/turn light 58.

The systems of the present invention include modular harness portions which are for installation into the lighting system of the vehicle 30, and a harness portion which is for installation into the auxiliary lighting system of the vehicle accessory 50. The vehicle harness portions will be connected to the electrical wiring operating the headlights 32 and 34 by inserting elements of the vehicle harness portions between the connector element 34 of the headlight 32 and the headlight plug 40, and between the connector element 38 of the headlight 36 and the headlight plug 42 (all of which are shown in FIG. 1). In the preferred embodiments, the vehicle harness portions will also be installed into the electrical wiring operating the parking/turn lights 44 and 46.

The vehicle harness portions in the vehicle 30 have a first configuration when it they are not connected to the accessory harness portion in the vehicle accessory 50, and a second configuration when they are connected to the accessory harness portion in the vehicle accessory 50. In the first configuration, the vehicle harness portions will allow the headlights 32 and 36 in the vehicle 30 to operate, but in the second configuration, the vehicle harness portions will not allow the headlights 32 and 36 in the vehicle 30 to operate. Instead, the headlights 52 and 54 in the vehicle accessory 50 will be allowed to operate. Changes between the two configurations are accomplished by the independent lighting system without using a single switch or relay.

A first series of embodiments of the independent lighting system described in the first above-identified parent patent application is shown in three embodiments in FIGS. 3 and 4, FIGS. 5 and 6, and FIGS. 7 and 8, respectively. In each of these three embodiments, the vehicle harness portions in the vehicle 30 consist of right and left halves, each of which has a harness connector. Similarly the accessory harness portion in the vehicle accessory 50 also consists of right and left halves, each of which has a harness connector.

In each of these three embodiments, the harness connectors on the right and left halves of the first harness portion are different halves of a mating pair. Likewise, the harness connectors on the right and left halves of the second harness portion are different halves of a mating pair of the same design as the harness connectors of the first harness portion. In the first configuration of the first harness portion, the harness connector on the right half of the first harness portion is connected to the harness connector on the left half of the first harness portion. In the second configuration of the first harness portion, the harness connector on the right half of the first harness portion is connected to the harness connector on the right half of the second harness portion, and the harness connector on the left half of the first harness portion is connected to the harness connector on the left half of the second harness portion.

The harness connectors may be, for example, sealed connectors such as the MX150 series environmentally sealed connectors available from Molex, Inc. of Lisle, Ill. The MX150 connector has connector housings with integrated two-way sealing to form a seal between mating connectors and an integral releasable locking latch to assure positive mating of the connector halves. It will be appreciated by those skilled in the art that when the harness connectors on the right and left sides of the first harness portion in the vehicle 30 are connected together in the first configuration, the right and left connectors of the second harness portion in the vehicle accessory 50 can also be connected together to protect them from exposure to the elements. Thus, in both the first configuration and in the second configuration, all four of the harness connectors on the first and second harness portions are protected, without requiring the use of sealing caps.

Figure 3:
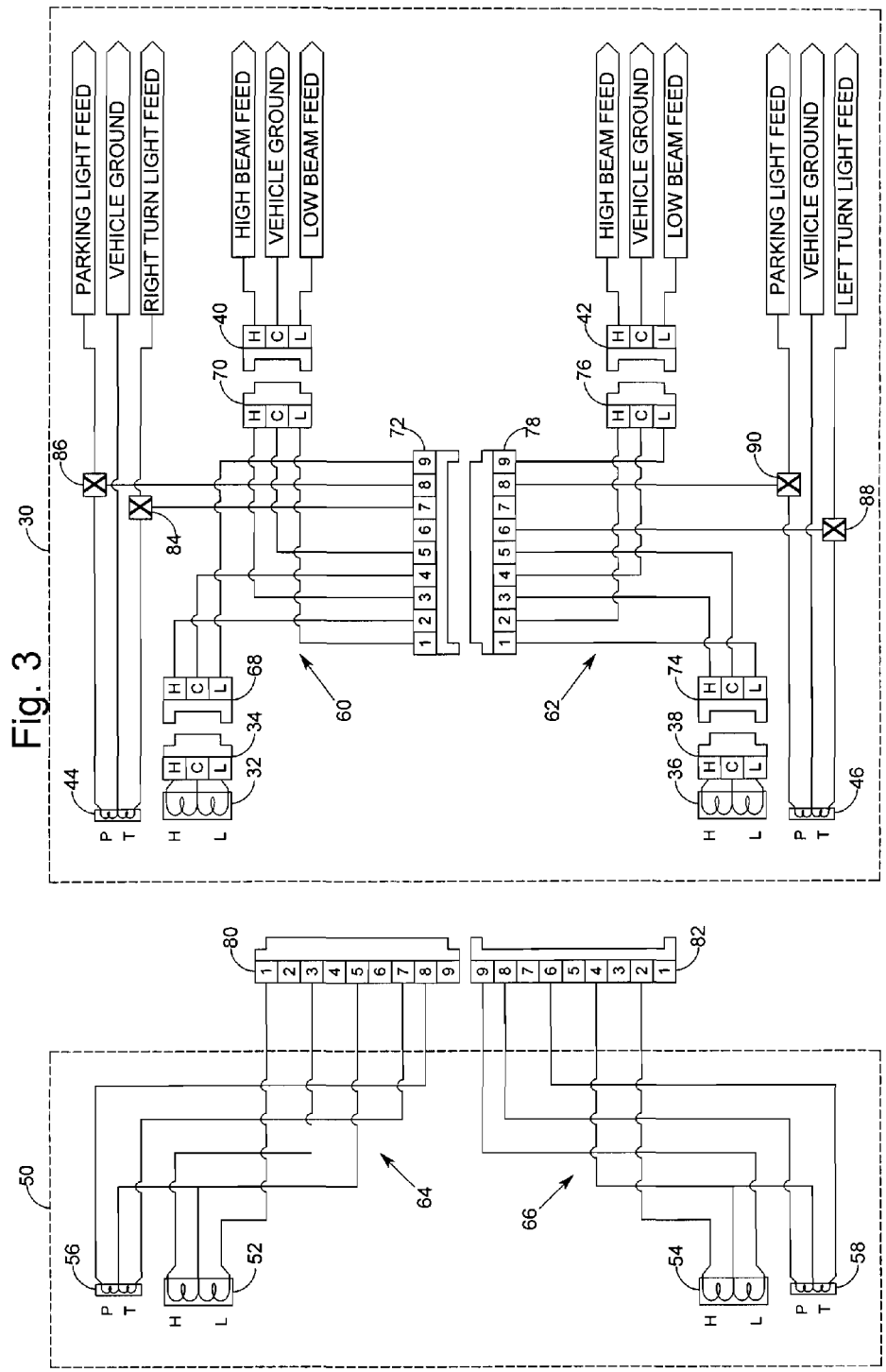
FIG. 3 is a schematic depiction of a first embodiment of an independent lighting system which is constructed to connect and operate the auxiliary lights located on a vehicle accessory shown in FIG. 2 to the vehicle lighting system shown in FIG. 1, with the auxiliary lights not connected to the vehicle lighting system.

Referring first to FIG. 3, a first version of the independent lighting system is shown in the first configuration (which is used when the vehicle accessory 50 is not connected to the vehicle 30). The first harness portion consists of a right side first harness portion 60 and a left side first harness portion 62, and the second harness portion consists of a right side second harness portion 64 and a left side second harness portion 66. The right side first harness portion 60 includes a headlight connector 68 which is connected to the connector element 34 of the headlight 32, a headlight power connector 70 which is connected to the headlight plug 40, and a right side first harness connector 72. The left side first harness portion 62 includes a headlight connector 74 which is connected to the connector element 38 of the headlight 36, a headlight power connector 76 which is connected to the headlight plug 42, and a left side first harness connector 78.

Figure 4:
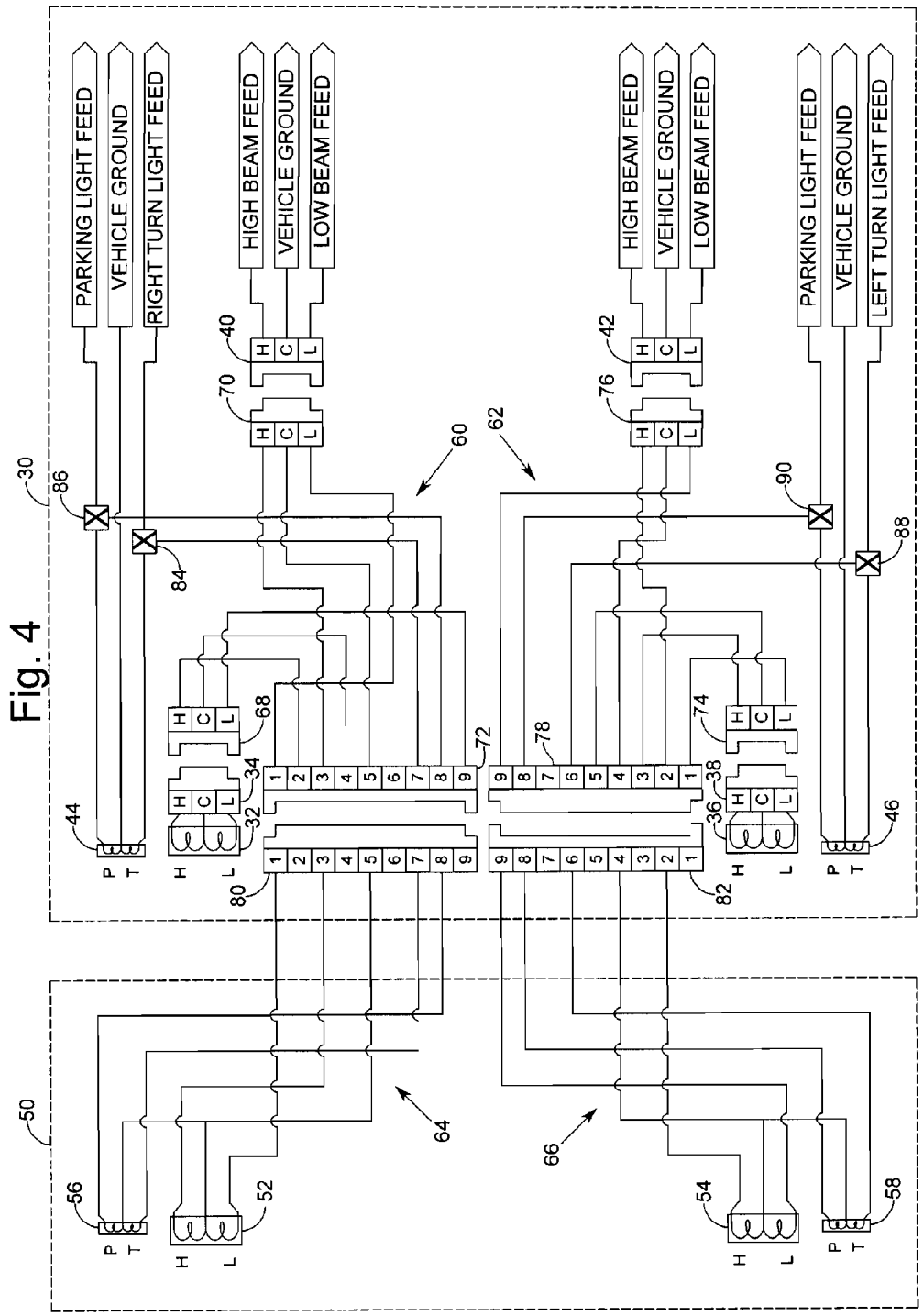
FIG. 4 is a schematic depiction of the first embodiment independent lighting system illustrated in FIG. 3, but with the auxiliary lights connected to the vehicle lighting system.

The right side second harness portion 64 has a right side second harness connector 80, and the left side second harness portion 66 has a left side second harness connector 82. The right side first harness connector 72 will mate with the left side first harness connector 78 or with the right side second harness connector 80, but not with the left side second harness connector 82. The left side first harness connector 78 will mate with the right side first harness connector 72 or with the left side second harness connector 82, but not with the right side second harness connector 80. The right side second harness connector 80 and the left side second harness connector 82 will also mate with each other. In FIGS. 3 and 4, the right side first harness connector 72 and the left side second harness connector 82 are female connectors, and the left side first harness connector 78 and the right side second harness connector 80 are male connectors, but this configuration could be reversed.

In the first version of the independent lighting system shown in FIGS. 3 and 4, the right side first harness connector 72, the left side first harness connector 78, the right side second harness connector 80, and the left side second harness connector 82 are all nine-pin connectors. With regard to the right side first harness connector 72, pins 1, 3, and 5 are respectively connected to the headlight power connector 70 as the low beam feed, the high beam feed, and the vehicle ground. Pins 2, 4, and 9 of the right side first harness connector 72 are respectively connected to the headlight connector 68 as the high beam lead, the common (ground) lead, and the low beam lead. Pin 7 of the right side first harness connector 72 is connected to the right turn signal feed using a right turn signal feed tap 84, and pin 8 of the right side first harness connector 72 is connected to the parking light feed using a parking light feed tap 86.

With regard to the left side first harness connector 78, Pins 1, 3, and 5 are respectively connected to the headlight connector 74 as the low beam lead, the high beam lead, and the common (ground) lead. Pins 2, 4, and 9 of the left side first harness connector 78 are respectively connected to the headlight power connector 76 as the high beam feed, the vehicle ground, and the low beam feed. Pin 6 of the left side first harness connector 78 is connected to the left turn signal feed using a left turn signal feed tap 88, and Pin 8 of the left side first harness connector 78 is connected to the parking light feed using a parking light feed tap 90.

With regard to the right side second harness connector 80, Pin 1 is connected to the low beam lead of the headlight 52, Pin 3 is connected to the high beam lead of the headlight 52, Pin 5 is connected to the common (ground) leads of both the headlight 52 and the parking/turn light 56, Pin 7 is connected to the right turn signal lead of the parking/turn light 56, and Pin 8 is connected to the parking light feed of the parking/turn light 56. With regard to the left side second harness connector 82, Pin 2 is connected to the high beam lead of the headlight 54, Pin 4 is connected to the common (ground) leads of both the headlight 54 and the parking/turn light 58, Pin 6 is connected to is connected to the left turn signal lead of the parking/turn light 58, Pin 8 is connected to the parking light feed of the parking/turn light 58, and Pin 9 is connected to the low beam lead of the headlight 54.

It will be appreciated by those skilled in the art that the first version of the independent lighting system illustrated in FIGS. 3 and 4 switches both the hot leads and the common leads from the headlights 32 and 36 of the vehicle 30 to the headlights 52 and 54 of the vehicle accessory 50. When the right side first harness connector 72 and the left side first harness connector 78 are connected together as shown in FIG. 3, the headlights 32 and 36 of the vehicle 30 will be operative. If the right side first harness connector 72 and the left side first harness connector 78 are not connected to each other, the headlights 32 and 36 of the vehicle 30 will be inoperative.

Referring now to FIG. 4, the first version of the independent lighting system is shown in the second configuration (which is used when the vehicle accessory 50 is connected to the vehicle 30). When the right side first harness connector 72 is connected to the right side second harness connector 80 and the left side first harness connector 78 is connected to the left side second harness connector 82, the headlights 52 and 54 of the vehicle accessory 50 will be operative, and the headlights 32 and 36 of the vehicle 30 will not be operative.

Figure 5:
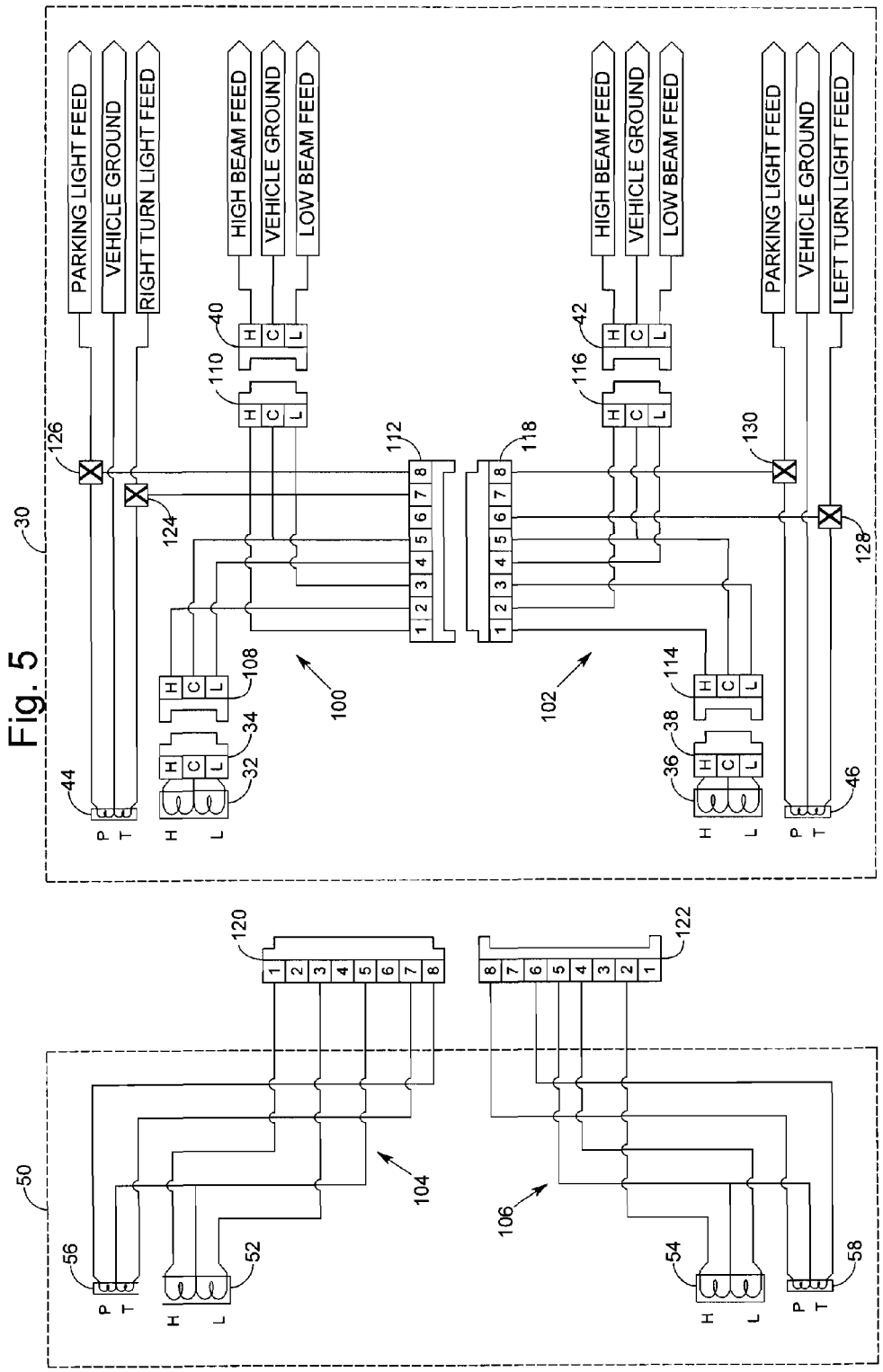
FIG. 5 is a schematic depiction of a second embodiment of an independent lighting system which is constructed to connect and operate the auxiliary lights located on a vehicle accessory shown in FIG. 2 to the vehicle lighting system shown in FIG. 1, with the auxiliary lights not connected to the vehicle lighting system.

Referring next to FIG. 5, a second version of the independent lighting system is shown in the first configuration (which is used when the vehicle accessory 50 is not connected to the vehicle 30). The first harness portion consists of a right side first harness portion 100 and a left side first harness portion 102, and the second harness portion consists of a right side second harness portion 104 and a left side second harness portion 106. The right side first harness portion 100 includes a headlight connector 108 which is connected to the connector element 34 of the headlight 32, a headlight power connector 110 which is connected to the headlight plug 40, and a right side first harness connector 112. The left side first harness portion 102 includes a headlight connector 114 which is connected to the connector element 38 of the headlight 36, a headlight power connector 116 which is connected to the headlight plug 42, and a left side first harness connector 118.

Figure 6:
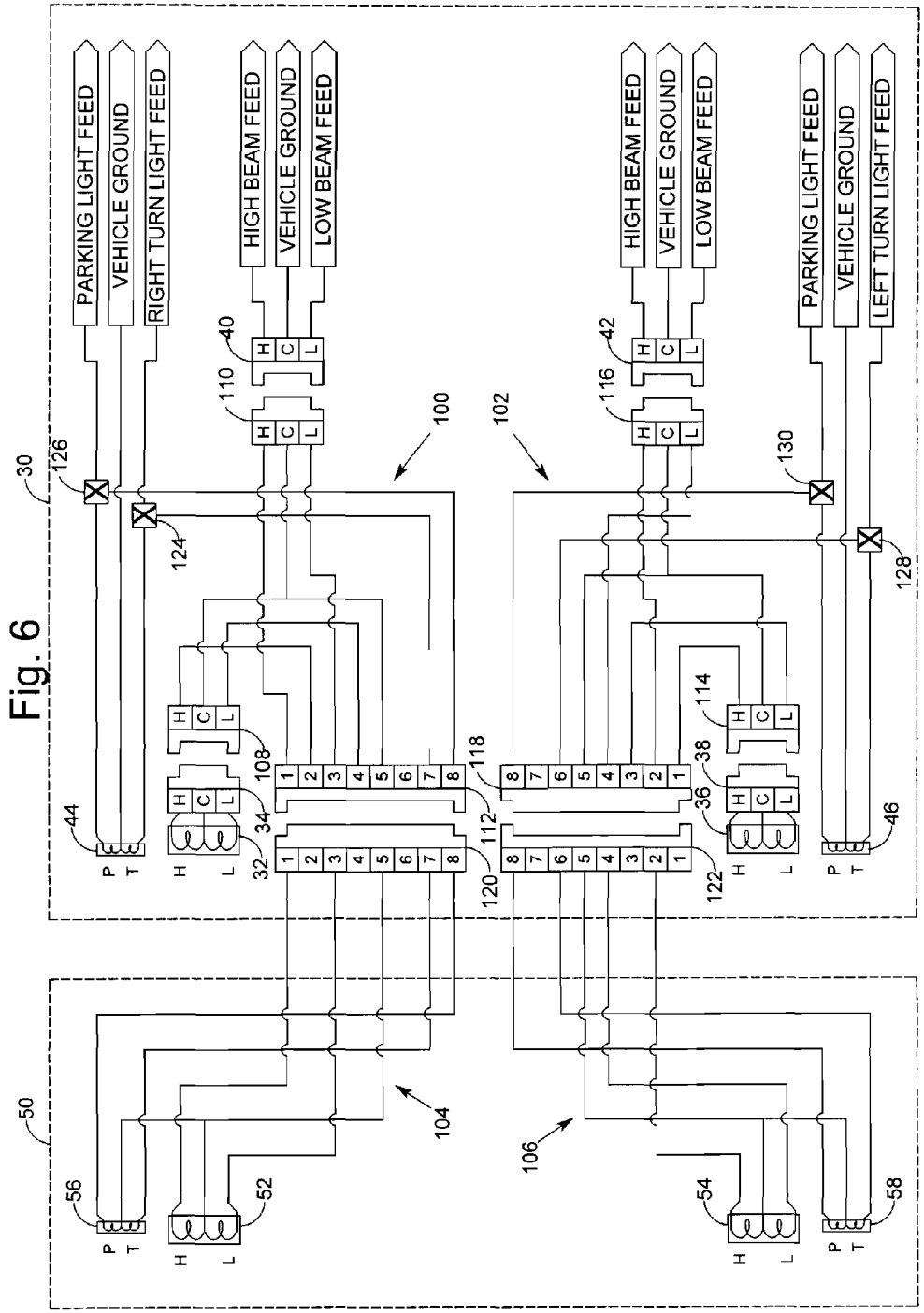
FIG. 6 is a schematic depiction of the second embodiment independent lighting system illustrated in FIG. 5, but with the auxiliary lights connected to the vehicle lighting system.

The right side second harness portion 104 has a right side second harness connector 120, and the left side second harness portion 106 has a left side second harness connector 122. The right side first harness connector 112 will mate with the left side first harness connector 118 or with the right side second harness connector 120, but not with the left side second harness connector 122. The left side first harness connector 118 will mate with the right side first harness connector 112 or with the left side second harness connector 122, but not with the right side second harness connector 120. The right side second harness connector 120 and the left side second harness connector 122 will also mate with each other. In FIGS. 5 and 6, the right side first harness connector 112 and the left side second harness connector 122 are female connectors, and the left side first harness connector 118 and the right side second harness connector 120 are male connectors, but this configuration could be reversed.

In the second version of the independent lighting system shown in FIGS. 5 and 6, the right side first harness connector 112, the left side first harness connector 118, the right side second harness connector 120, and the left side second harness connector 122 are all eight-pin connectors. With regard to the right side first harness connector 112, pins 1 and 3 are respectively connected to the headlight power connector 110 as the high beam feed and the low beam feed. Pins 2 and 4 of the right side first harness connector 112 are respectively connected to the headlight connector 108 as the high beam lead and the low beam lead. Pin 5 of the right side first harness connector 112 is connected to both the headlight connector 108 as the common (ground) lead and to the headlight power connector 110 as the vehicle ground. Pin 7 of the right side first harness connector 112 is connected to the right turn signal feed using a right turn signal feed tap 124, and pin 8 of the right side first harness connector 112 is connected to the parking light feed using a parking light feed tap 126.

With regard to the left side first harness connector 118, pins 1 and 3 are respectively connected to the headlight connector 114 as the high beam lead and the low beam lead. Pins 2 and 4 of the left side first harness connector 118 are respectively connected to the headlight power connector 116 as the high beam feed and the low beam feed. Pin 5 of the left side first harness connector 118 is connected to both the headlight connector 114 as the common (ground) lead and to the headlight power connector 116 as the vehicle ground. Pin 6 of the left side first harness connector 118 is connected to the left turn signal feed using a left turn signal feed tap 128, and pin 8 of the left side first harness connector 118 is connected to the parking light feed using a parking light feed tap 130.

With regard to the right side second harness connector 120, pin 1 is connected to the high beam lead of the headlight 52, pin 3 is connected to the low beam lead of the headlight 52, pin 5 is connected to the common (ground) leads of both the headlight 52 and the parking/turn light 56, pin 7 is connected to the right turn signal lead of the parking/turn light 56, and pin 8 is connected to the parking light feed of the parking/turn light 56. With regard to the left side second harness connector 122, pin 2 is connected to the high beam lead of the headlight 54, pin 4 is connected to the low beam lead of the headlight 54, pin 5 is connected to the common (ground) leads of both the headlight 54 and the parking/turn light 58, pin 6 is connected to the left turn signal lead of the parking/turn light 58, and pin 8 is connected to the parking light feed of the parking/turn light 58.

It will be appreciated by those skilled in the art that the second version of the independent lighting system illustrated in FIGS. 5 and 6 switches only the hot leads from the headlights 32 and 36 of the vehicle 30 to the headlights 52 and 54 of the vehicle accessory 50. When the right side first harness connector 112 and the left side first harness connector 118 are connected together as shown in FIG. 5, the headlights 32 and 36 of the vehicle 30 will be operative. If the right side first harness connector 112 and the left side first harness connector 118 are not connected to each other, the headlights 32 and 36 of the vehicle 30 will be inoperative.

Referring now to FIG. 6, the second version of the independent lighting system is shown in the second configuration (which is used when the vehicle accessory 50 is connected to the vehicle 30). When the right side first harness connector 112 is connected to the right side second harness connector 120 and the left side first harness connector 118 is connected to the left side second harness connector 122, the headlights 52 and 54 of the vehicle accessory 50 will be operative, and the headlights 32 and 36 of the vehicle 30 will not be operative.

Figure 7:
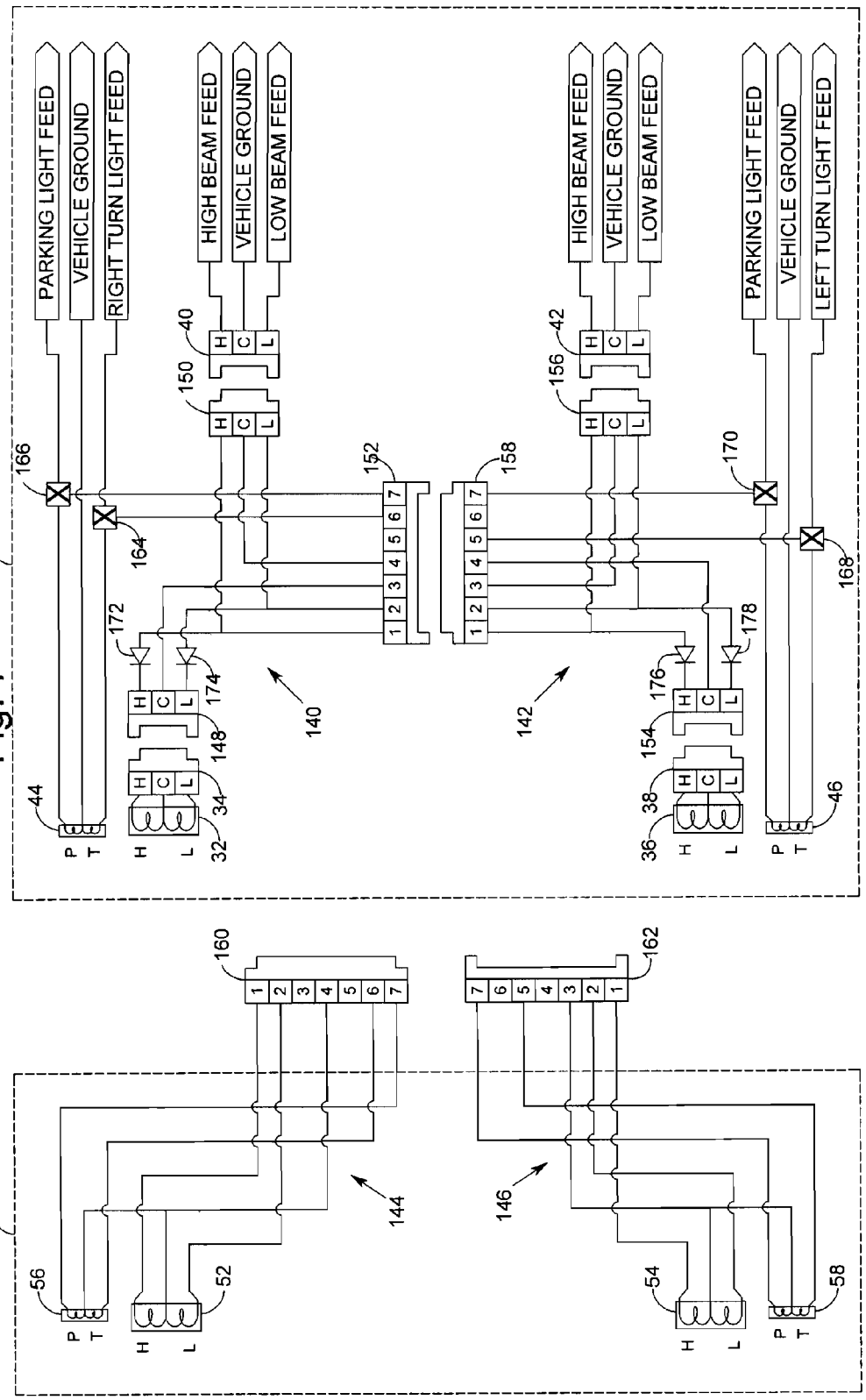
FIG. 7 is a schematic depiction of a third embodiment of an independent lighting system which is constructed to connect and operate the auxiliary lights located on a vehicle accessory shown in FIG. 2 to the vehicle lighting system shown in FIG. 1, with the auxiliary lights not connected to the vehicle lighting system.

Referring next to FIG. 7, a third version of the independent lighting system is shown in the first configuration (which is used when the vehicle accessory 50 is not connected to the vehicle 30). The first harness portion consists of a right side first harness portion 140 and a left side first harness portion 142, and the second harness portion consists of a right side second harness portion 144 and a left side second harness portion 146. The right side first harness portion 140 includes a headlight connector 148 which is connected to the connector element 34 of the headlight 32, a headlight power connector 150 which is connected to the headlight plug 40, and a right side first harness connector 152. The left side first harness portion 142 includes a headlight connector 154 which is connected to the connector element 38 of the headlight 36, a headlight power connector 156 which is connected to the headlight plug 42, and a left side first harness connector 158.

Figure 8:
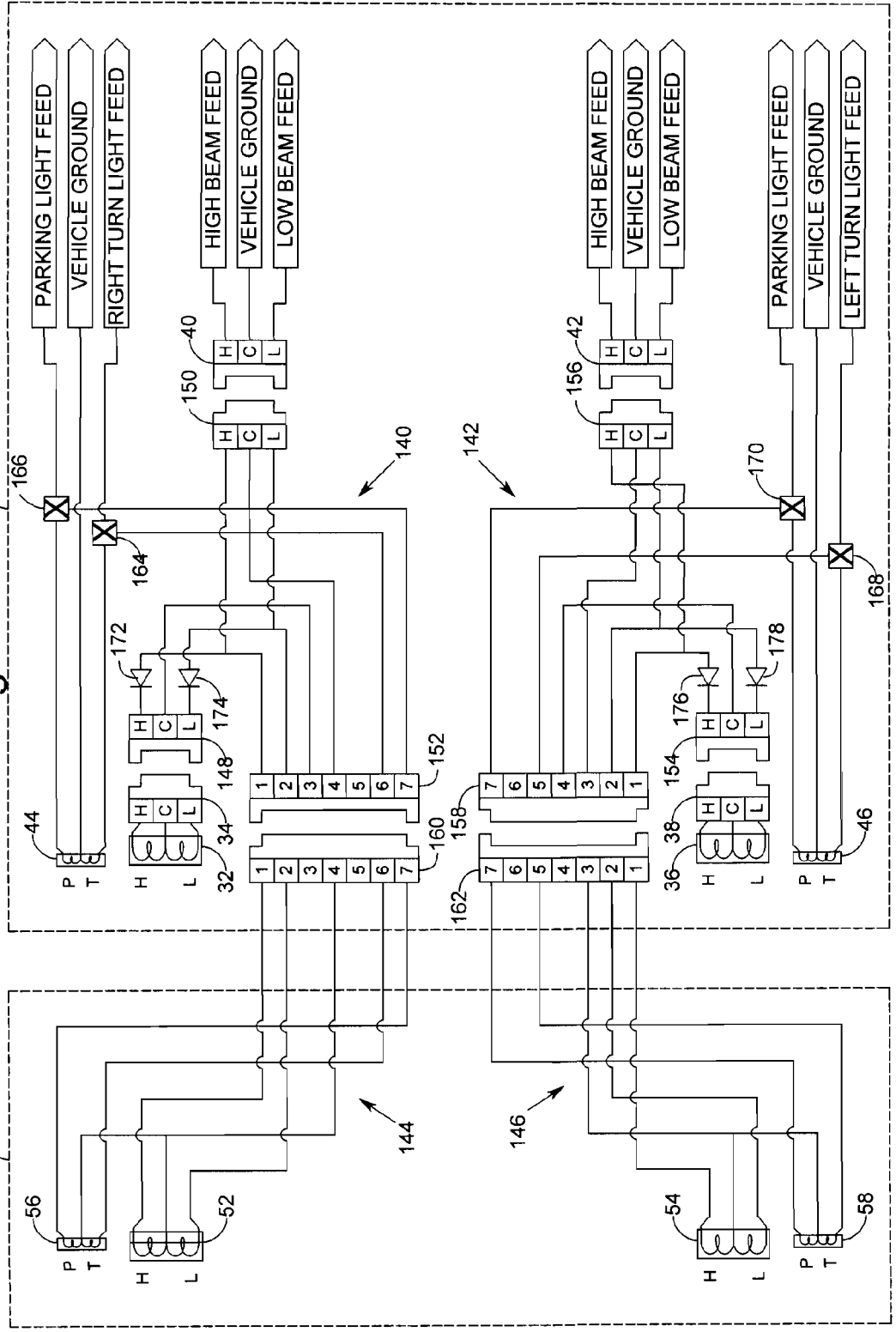
FIG. 8 is a schematic depiction of the third embodiment independent lighting system illustrated in FIG. 7, but with the auxiliary lights connected to the vehicle lighting system.

The right side second harness portion 144 has a right side second harness connector 160, and the left side second harness portion 146 has a left side second harness connector 162. The right side first harness connector 152 will mate with the left side first harness connector 158 or with the right side second harness connector 160, but not with the left side second harness connector 162. The left side first harness connector 158 will mate with the right side first harness connector 152 or with the left side second harness connector 162, but not with the right side second harness connector 160. The right side second harness connector 160 and the left side second harness connector 162 will also mate with each other. In FIGS. 7 and 8, the right side first harness connector 152 and the left side second harness connector 162 are female connectors, and the left side first harness connector 158 and the right side second harness connector 160 are male connectors, but this configuration could be reversed.

In the third version of the independent lighting system shown in FIGS. 7 and 8, the right side first harness connector 152, the left side first harness connector 158, the right side second harness connector 160, and the left side second harness connector 162 are all seven-pin connectors. With regard to the right side first harness connector 152, pin 3 is connected to the headlight connector 148 as the common (ground) lead, and pin 4 is connected to the headlight power connector 150 as the vehicle ground. Pin 1 is connected both to the headlight connector 148 as the high beam lead and to the headlight power connector 150 as the high beam feed. Pin 2 is connected both to the headlight connector 148 as the low beam lead and to the headlight power connector 150 as the low beam feed. Pin 6 of the right side first harness connector 152 is connected to the right turn signal feed using a right turn signal feed tap 164, and pin 7 of the right side first harness connector 152 is connected to the parking light feed using a parking light feed tap 166.

With regard to the left side first harness connector 158, pin 3 is connected to the headlight power connector 156 as the vehicle ground, and pin 4 is connected to the headlight connector 154 as the common (ground) lead. Pin 1 is connected both to the headlight connector 154 as the high beam lead and to the headlight power connector 156 as the high beam feed.

Pin 2 is connected both to the headlight connector 154 as the low beam lead and to the headlight power connector 156 as the low beam feed. Pin 5 of the left side first harness connector 158 is connected to the left turn signal feed using a left turn signal feed tap 168, and pin 7 of the left side first harness connector 158 is connected to the parking light feed using a parking light feed tap 170.

It will be noted that there are also four diodes 172, 174, 176, and 178 which are used in the version of the independent lighting system shown in FIGS. 7 and 8. The diode 172 is located with its cathode connected to the high beam lead of the headlight connector 148 and its anode connected to the high beam feed of the headlight power connector 150. The diode 174 is located with its cathode connected to the low beam lead of the headlight connector 148 and its anode connected to the low beam feed of the headlight power connector 150. The diode 176 is located with its cathode connected to the high beam lead of the headlight connector 154 and its anode connected to the high beam feed of the headlight power connector 156. The diode 178 is located with its cathode connected to the low beam lead of the headlight connector 154 and its anode connected to the low beam feed of the headlight power connector 156.

With regard to the right side second harness connector 160, pin 1 is connected to the high beam lead of the headlight 52, pin 2 is connected to the low beam lead of the headlight 52, pin 4 is connected to the common (ground) leads of both the headlight 52 and the parking/turn light 56, pin 6 is connected to the right turn signal lead of the parking/turn light 56, and pin 7 is connected to the parking light feed of the parking/turn light 56. With regard to the left side second harness connector 162, pin 1 is connected to the high beam lead of the headlight 54, pin 2 is connected to the low beam lead of the headlight 54, pin 3 is connected to the common (ground) leads of both the headlight 54 and the parking/turn light 58, pin 5 is connected to is connected to the left turn signal lead of the parking/turn light 58, pin 7 is connected to the parking light feed of the parking/turn light 58.

It will be appreciated by those skilled in the art that the third version of the independent lighting system illustrated in FIGS. 7 and 8 switches only the common leads from the headlights 32 and 36 of the vehicle 30 to the headlights 52 and 54 of the vehicle accessory 50. When the right side first harness connector 152 and the left side first harness connector 158 are connected together as shown in FIG. 7, the headlights 32 and 36 of the vehicle 30 will be operative. If the right side first harness connector 152 and the left side first harness connector 158 are not connected to each other, the headlights 32 and 36 of the vehicle 30 will be inoperative.

The diodes 172, 174, 176, and 178 act to prevent reverse current paths through the high and low beams of the headlights 32 and 36 of the vehicle 30 and the nonoperated one of the high and low beam bulbs in each of the headlights 52 and 54 of the vehicle accessory 50. Without the diodes 172, 174, 176, and 178, the high and low beams of the headlights 32 and 36 of the vehicle 30 and the nonoperated one of the high and low beam bulbs in each of the headlights 52 and 54 of the vehicle accessory 50 will all be dimly illuminated whenever the other one of headlights 52 and 54 of the vehicle accessory 50, resulting in a higher level of current drain.

Referring now to FIG. 8, the third version of the independent lighting system is shown in the second configuration (which is used when the vehicle accessory 50 is connected to the vehicle 30). When the right side first harness connector 152 is connected to the right side second harness connector 160 and the left side first harness connector 158 is connected to the left side second harness connector 162, the headlights 52 and 54 of the vehicle accessory 50 will be operative, and the headlights 32 and 36 of the vehicle 30 will not be operative.

Figure 9:
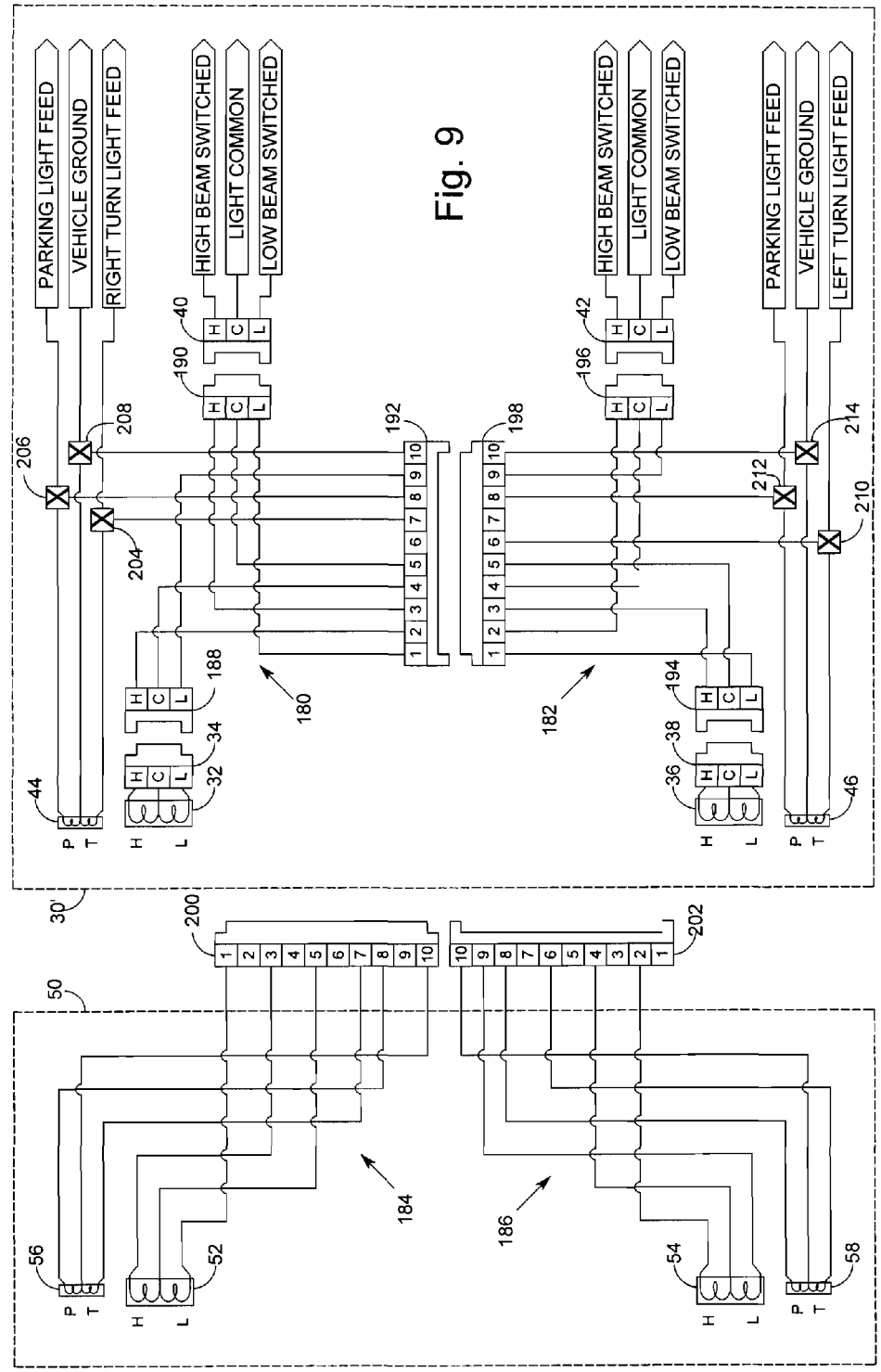
FIG. 9 is a schematic depiction of a fourth embodiment of an independent lighting system which is constructed to connect and operate the auxiliary lights located on a vehicle accessory shown in FIG. 2 to a vehicle lighting system like that shown in FIG. 1 but optionally without vehicle ground used as the common for the vehicle headlights, with the auxiliary lights not connected to the vehicle lighting system.

Referring next to FIG. 9, a fourth version of the independent lighting system is shown in the first configuration (which is used when the vehicle accessory 50 is not connected to a vehicle 30'). This version is designed to work on either the conventional vehicle 30 shown in FIG. 2, or on the vehicle 30' which (unlike the conventional vehicle 30 shown in FIG. 2) does not use the vehicle ground as the common lead for the vehicle headlights. Such vehicles may use the vehicle power as the common lead, in which case the common lead from the headlight controls and the ground lead from the parking/turn lights cannot be connected together as is the case in the first, second, and third versions respectively illustrated in FIGS. 3 and 4, FIGS. 5 and 6, and FIGS. 7 and 8.

The first harness portion consists of a right side first harness portion 180 and a left side first harness portion 182, and the second harness portion consists of a right side second harness portion 184 and a left side second harness portion 186. The right side first harness portion 180 includes a headlight connector 188 which is connected to the connector element 34 of the headlight 32, a headlight power connector 190 which is connected to the headlight plug 40, and a right side first harness connector 192. The left side first harness portion 182 includes a headlight connector 194 which is connected to the connector element 38 of the headlight 36, a headlight power connector 196 which is connected to the headlight plug 42, and a left side first harness connector 198.

Figure 10:
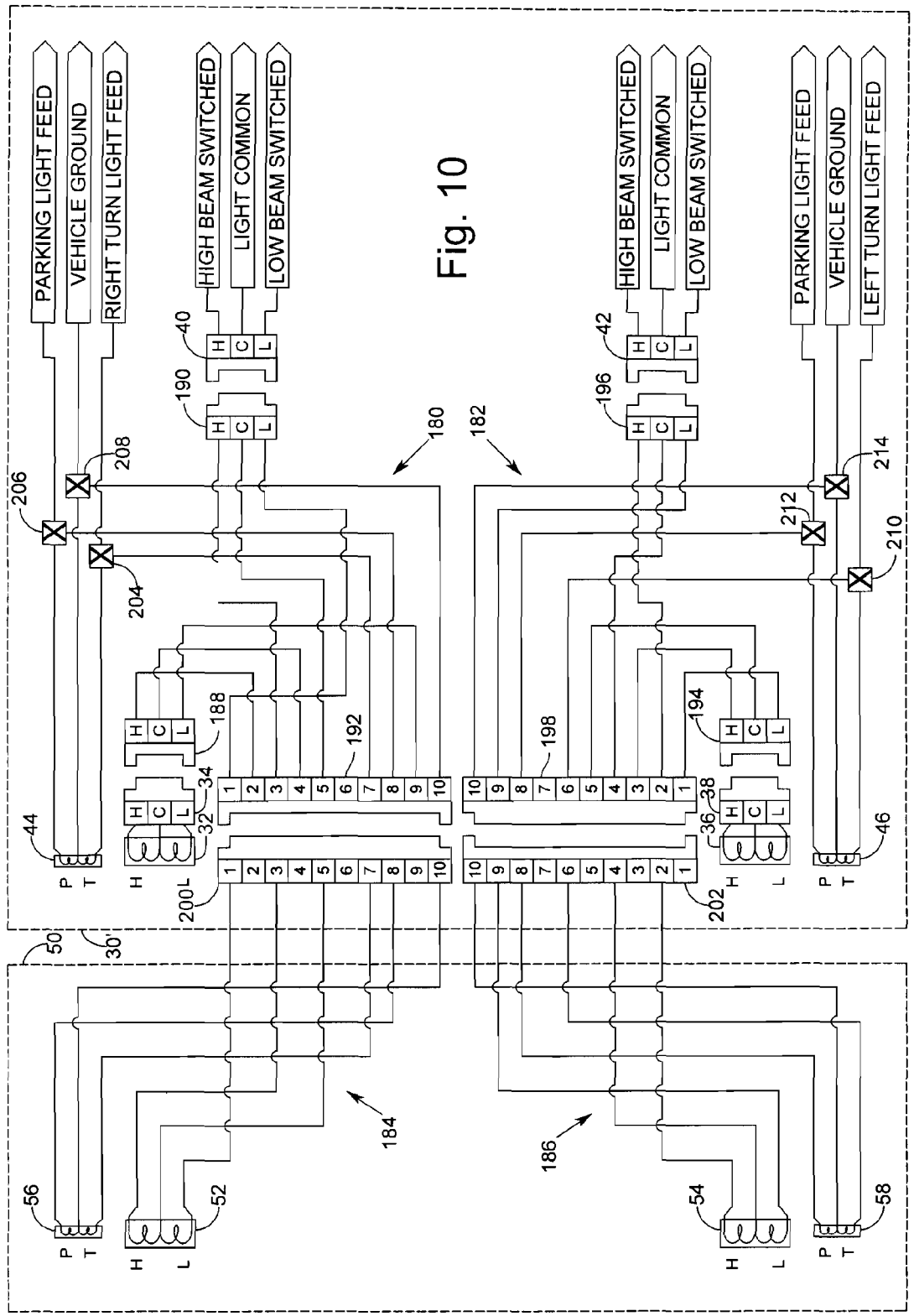
FIG. 10 is a schematic depiction of the fourth embodiment independent lighting system illustrated in FIG. 9, but with the auxiliary lights connected to the vehicle lighting system.

The right side second harness portion 184 has a right side second harness connector 200, and the left side second harness portion 186 has a left side second harness connector 202. The right side first harness connector 192 will mate with the left side first harness connector 198 or with the right side second harness connector 200, but not with the left side second harness connector 202. The left side first harness connector 198 will mate with the right side first harness connector 192 or with the left side second harness connector 202, but not with the right side second harness connector 200. The right side second harness connector 200 and the left side second harness connector 202 will also mate with each other. In FIGS. 9 and 10, the right side first harness connector 192 and the left side second harness connector 202 are female connectors, and the left side first harness connector 198 and the right side second harness connector 200 are male connectors, but this configuration could be reversed.

In the fourth embodiment of the independent lighting system shown in FIGS. 9 and 10, the right side first harness connector 192, the left side first harness connector 198, the right side second harness connector 200, and the left side second harness connector 202 are all ten-pin connectors. With regard to the right side first harness connector 192, Pin 1 is connected to the headlight power connector 190 as the low beam feed, pin 3 is connected to the headlight power connector 190 as the high beam feed, and Pin 5 is connected to the headlight power connector 190 as the common feed. Pin 2 is connected to the headlight connector 188 as the high beam lead, Pin 4 is connected to the headlight connector 188 as the common lead, and Pin 9 is connected to the headlight connector 188 as the low beam feed. Pin 7 is connected to the right turn signal feed using a right turn signal feed tap 204, Pin 8 is connected to the right parking light feed using a right parking light feed tap 206, and Pin 10 is connected to the right parking/turn light ground feed using a right parking/turn light ground feed tap 208.

With regard to the left side first harness connector 198, Pin 2 is connected to the headlight power connector 196 as the high beam feed, pin 4 is connected to the headlight power connector 196 as the common feed, and Pin 9 is connected to the headlight power connector 196 as the low beam feed. Pin 1 is connected to the headlight connector 194 as the low beam lead, Pin 3 is connected to the headlight connector 194 as the high beam lead, and Pin 5 is connected to the headlight connector 194 as the common feed. Pin 6 is connected to the left turn signal feed using a left turn signal feed tap 210, Pin 8 is connected to the left parking light feed using a left parking light feed tap 212, and Pin 10 is connected to the left parking/turn light ground feed using a left parking/turn light ground feed tap 214.

With regard to the right side second harness connector 200, Pin 1 is connected to the low beam lead of the headlight 52, Pin 3 is connected to the high beam lead of the headlight 52, Pin 5 is connected to the common lead of the headlight 52, Pin 7 is connected to the right turn signal lead of the parking/turn light 56, Pin 8 is connected to the parking light feed of the parking/turn light 56, and Pin 10 is connected to the common lead of the parking/turn light 56. With regard to the left side second harness connector 202, Pin 2 is connected to the high beam lead of the headlight 54, Pin 4 is connected to the common lead of the headlight 54, Pin 9 is connected to the low beam lead of the headlight 54, Pin 6 is connected to is connected to the left turn signal lead of the parking/turn light 58, Pin 8 is connected to the parking light feed of the parking/turn light 58, and Pin 10 is connected to the common lead of the parking/turn light 58.

It will be appreciated by those skilled in the art that the fourth version of the independent lighting system illustrated in FIGS. 9 and 10 switches both the hot leads and the common leads from the headlights 32 and 36 of the vehicle 30' to the headlights 52 and 54 of the vehicle accessory 50, and also independently connects the hot leads and the common leads from the parking/turn lights 44 and 46 of the vehicle 30' to the parking/turn lights 56 and 58 of the vehicle accessory 50. When the right side first harness connector 192 and the left side first harness connector 198 are connected together as shown in FIG. 9, the headlights 32 and 36 of the vehicle 30' will be operative. If the right side first harness connector 192 and the left side first harness connector 198 are not connected to each other, the headlights 32 and 36 of the vehicle 30' will be inoperative.

Referring now to FIG. 10, the fourth version of the independent lighting system is shown in the second configuration (which is used when the vehicle accessory 50 is connected to the vehicle 30'). When the right side first harness connector 192 is connected to the right side second harness connector 200 and the left side first harness connector 198 is connected to the left side second harness connector 202, the headlights 52 and 54 of the vehicle accessory 50 will be operative, and the headlights 32 and 36 of the vehicle 30' will not be operative.

Figure 11:
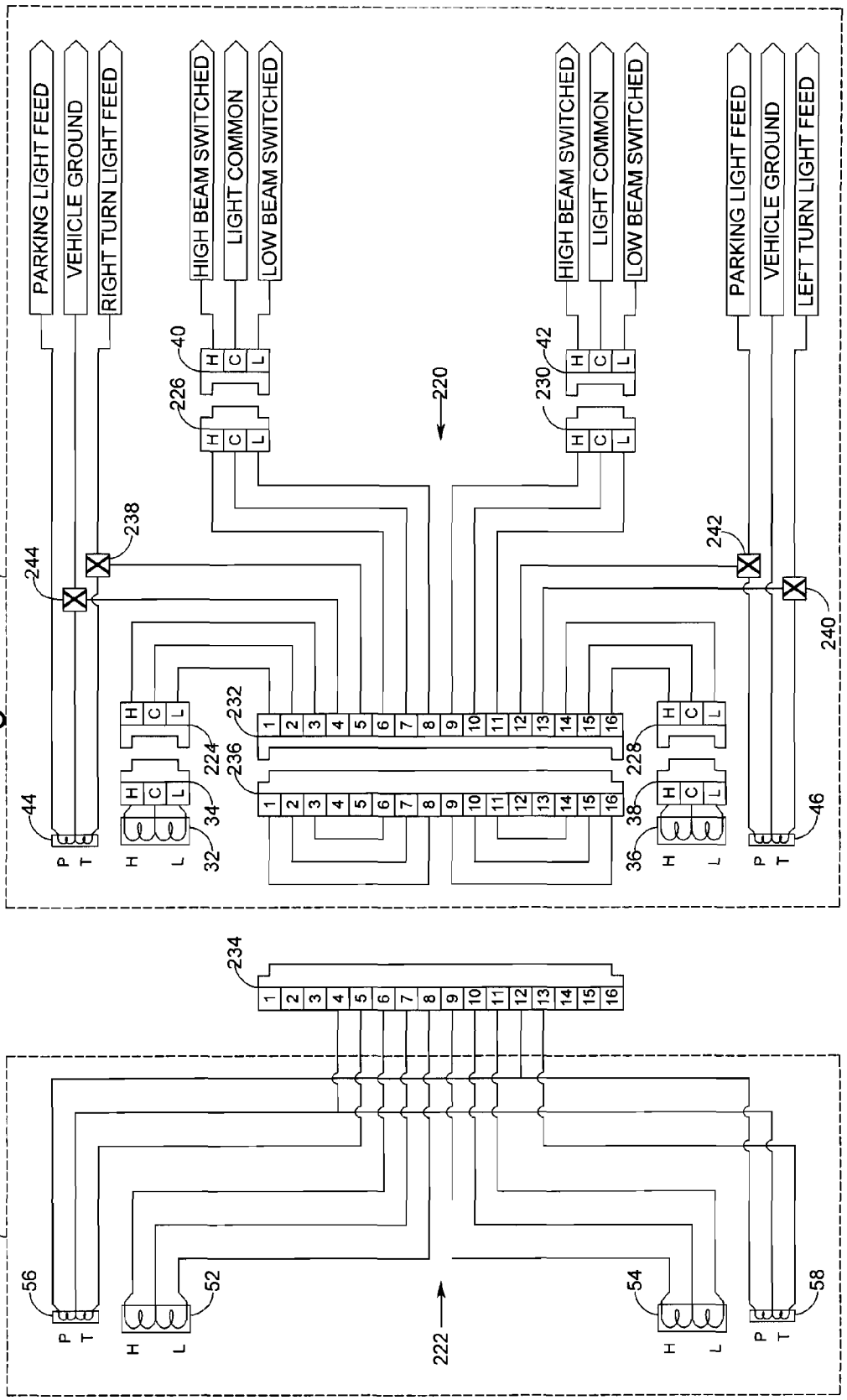
FIG. 11 is a schematic depiction of an alternate embodiment of an independent lighting system which is constructed to connect and operate the auxiliary lights located on a vehicle accessory shown in FIG. 2 to like that shown in FIG. 1 but optionally without vehicle ground used as the common for the vehicle headlights, with the auxiliary lights not connected to the vehicle lighting system.
Figure 12:
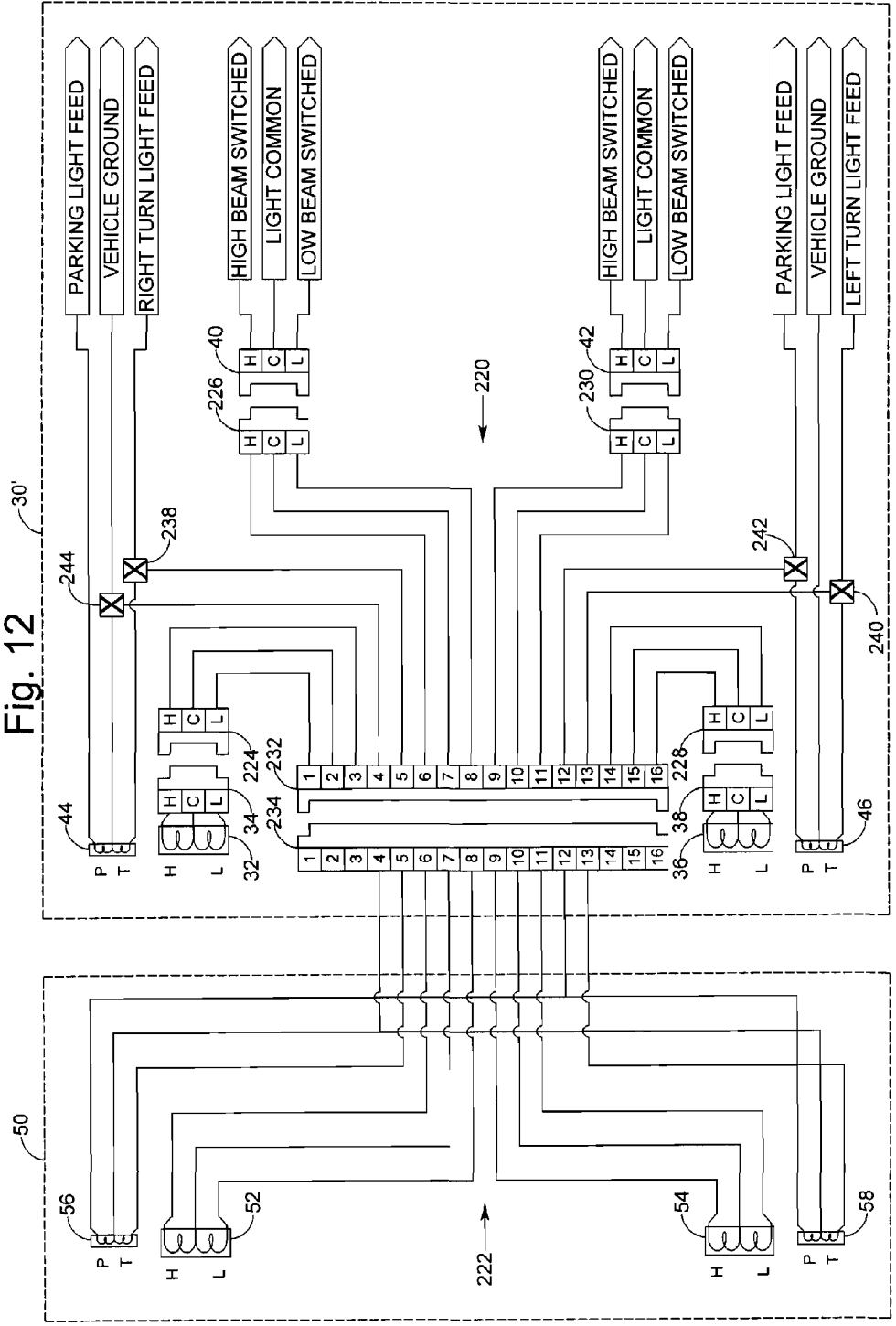
FIG. 12 is a schematic depiction of the alternate embodiment independent lighting system illustrated in FIG. 9, but with the auxiliary lights connected to the vehicle lighting system.

An alternate embodiment of the independent lighting system is shown in FIGS. 11 and 12. In this alternate embodiment, there is a single first harness portion 220 which is located in the vehicle 30' and a single second harness portion 222 which is located on the vehicle accessory 50, and each contains only a single harness connector. This version is also designed to work on either the conventional vehicle 30 shown in FIG. 2, or on the vehicle 30' which (unlike the conventional vehicle 30 shown in FIG. 2) does not use the vehicle ground as the common lead for the vehicle headlights.

The first harness portion 220 includes a headlight connector 224 which is connected to the connector element 34 of the headlight 32, a headlight power connector 226 which is connected to the headlight plug 40, a headlight connector 228 which is connected to the connector element 38 of the headlight 36, a headlight power connector 230 which is connected to the headlight plug 42, and a first harness connector 232. The second harness portion 222 has a second harness connector 234.

Also included in the alternate embodiment illustrated in FIG. 11 is a jumpered connector 236. The first harness connector 232 will mate with the jumpered connector 236 or with the second harness connector 234. In FIGS. 11 and 12, the first harness connector 232 is a female connector and the second harness connector 234 and the jumpered connector 236 are male connectors, but this configuration could be reversed.

In the embodiment shown in FIGS. 11 and 12, the first harness connector 232, the second harness connector 234, and the jumpered connector 236 are each sixteen-pin connectors. With regard to the first harness connector 232, Pin 1 is connected to the headlight connector 224 as the low beam lead, Pin 2 is connected to the headlight connector 224 as the common lead, and Pin 3 is connected to the headlight connector 224 as the high beam lead. Pin 6 is connected to the headlight power connector 226 as the high beam feed, Pin 7 is connected to the headlight power connector 226 as the common feed, and Pin 8 is connected to the headlight power connector 226 as the low beam feed.

Pin 14 is connected to the headlight connector 228 as the low beam lead, Pin 15 is connected to the headlight connector 228 as the common lead, and Pin 16 is connected to the headlight connector 228 as the high beam lead. Pin 9 is connected to the headlight power connector 230 as the high beam feed, Pin 10 is connected to the headlight power connector 230 as the common feed, and Pin 11 is connected to the headlight power connector 230 as the low beam feed.

Pin 5 is connected to the right turn signal feed using a right turn signal feed tap 238, and Pin 13 is connected to the left turn signal feed using a left turn signal feed tap 240. Pin 12 is connected to the left parking light feed using a parking light feed tap 242 (but could alternately be connected to the right parking light feed instead). Pin 4 is connected to the right parking/turn light ground feed using a parking/turn light ground feed tap 244 (but could alternately be connected to the left parking/turn light ground feed instead).

With regard to the second harness connector 234, Pin 6 is connected to the high beam lead of the headlight 52, Pin 7 is connected to the common lead of the headlight 52, and Pin 8 is connected to the low beam lead of the headlight 52. Pin 9 is connected to the high beam lead of the headlight 54, Pin 10 is connected to the common lead of the headlight 54, and Pin 11 is connected to the low beam lead of the headlight 54. Pin 5 is connected to the right turn signal lead of the parking/turn light 56, and Pin 13 is connected to the left turn signal lead of the parking/turn light 58. Pin 12 is connected to the parking light feed of the parking/turn lights 56 and 58, and Pin 4 is connected to the common lead of the parking/turn lights 56 and 58.

With regard to the jumpered connector 236, Pin 1 is jumpered to Pin 8, Pin 2 is jumpered to Pin 7, Pin 3 is jumpered to Pin 6, Pin 9 is jumpered to Pin 16, Pin 10 is jumpered to Pin 15, Pin 11 is jumpered to Pin 14.

It will be appreciated by those skilled in the art that the alternate embodiment illustrated in FIGS. 11 and 12 switches both the hot leads and the common leads from the headlights 32 and 36 of the vehicle 30' to the headlights 52 and 54 of the vehicle accessory 50, and also independently connects the hot leads and the common leads from the parking/turn lights 44 and 46 of the vehicle 30' to the parking/turn lights 56 and 58 of the vehicle accessory 50. (Those skilled in the art will appreciate that designs using single first and second harness connectors could instead be implemented with either the hot leads being switched or with only the common leads being switched and diodes being used as in the third version of the independent lighting system illustrated in FIGS. 7 and 8.) When the jumpered connector 236 is connected to the first harness connector 232 as shown in FIG. 11, the headlights 32 and 36 of the vehicle 30' will be operative. If the first harness connector 232 and the jumper connector 236 are not connected to each other, the headlights 32 and 36 of the vehicle 30' will be inoperative.

Referring now to FIG. 12, the alternate embodiment of the independent lighting system is shown in the second configuration (which is used when the vehicle accessory 50 is connected to the vehicle 30'). When the first harness connector 232 is connected to the second harness connector 234, the headlights 52 and 54 of the vehicle accessory 50 will be operative, and the headlights 32 and 36 of the vehicle 30' will not be operative.

Figure 13:
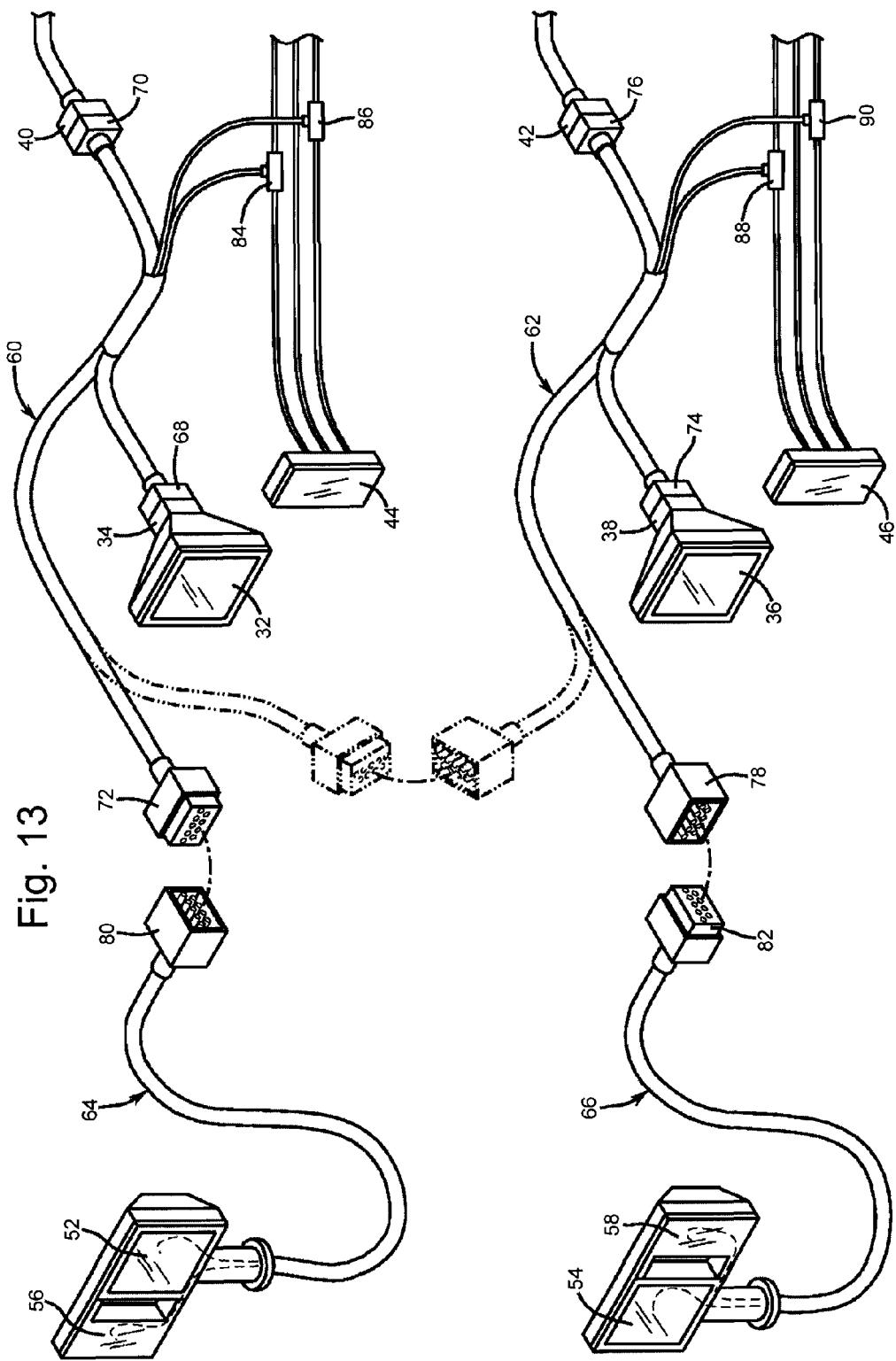
FIG. 13 is an isometric view showing the independent lighting system installed intermediate the lights of a conventional vehicle lighting system that are located at the front of the vehicle and the auxiliary lights of a vehicle accessory for installation onto the front of the vehicle.

Referring next to FIG. 13, the first version of the independent lighting system, which was illustrated in FIGS. 3 and 4, is illustrated is simplified form as it would likely appear, with the same reference numerals used in FIGS. 3 and 4 being used in FIG. 13. The right side first harness connector 72 is shown in position for connection to the right side second harness connector 80 to operate the headlight 52 and the parking/turn light 56 on the vehicle accessory 50 (the vehicle accessory 50 is not shown in FIG. 13), and the left side first harness connector 78 is shown in position for connection to the left side second harness connector 82 to operate the headlight 54 and the parking/turn light 58 on the vehicle accessory 50. In this position, the headlights 32 and 36 of the vehicle 30 (the vehicle 30 is not shown in FIG. 11) will be inoperative. The right side first harness connector 72 and the left side first harness connector 78 are shown in position for connection together in phantom lines to render the headlights 32 and 36 operative when the vehicle accessory 50 has been removed from the vehicle 30.

A second series of embodiments of the independent lighting system referred to as an independent lighting energy interruption system which is described in the second above-identified parent patent application is illustrated in four embodiments in FIGS. 14 and 15, FIG. 16, FIG. 17, and FIG. 18, respectively. The physical construction of the fourth of these embodiments of the independent lighting energy interruption system is shown in FIG. 19. In each of these four embodiments of the independent lighting energy interruption system, the vehicle harness portions in the vehicle 30' consist of a main vehicle harness portion and right side and left side auxiliary harness portions which are plugged into the main vehicle harness portion. In all four embodiments, the main vehicle harness portion is identical, with the right side and left side auxiliary harness portions varying from embodiment to embodiment. The accessory harness portion in the vehicle accessory 50 consists of right side and left side accessory harnesses, and is identical in all four embodiments.

The other distinction of the independent lighting energy interruption system from the independent lighting system shown in FIGS. 3 through 13 is that while the main vehicle harness portion in the independent lighting energy interruption system may be viewed as having two halves like the independent lighting system, the two halves are wired together with a number of cross-connections therebetween. The design of the independent lighting energy interruption system facilitates the use of a single main vehicle harness which will work with virtually any vehicle, with the right side and left side auxiliary harness portions being essentially adapters which are tailored for the differing electrical systems of any of a wide variety of different vehicles.

Figure 14:
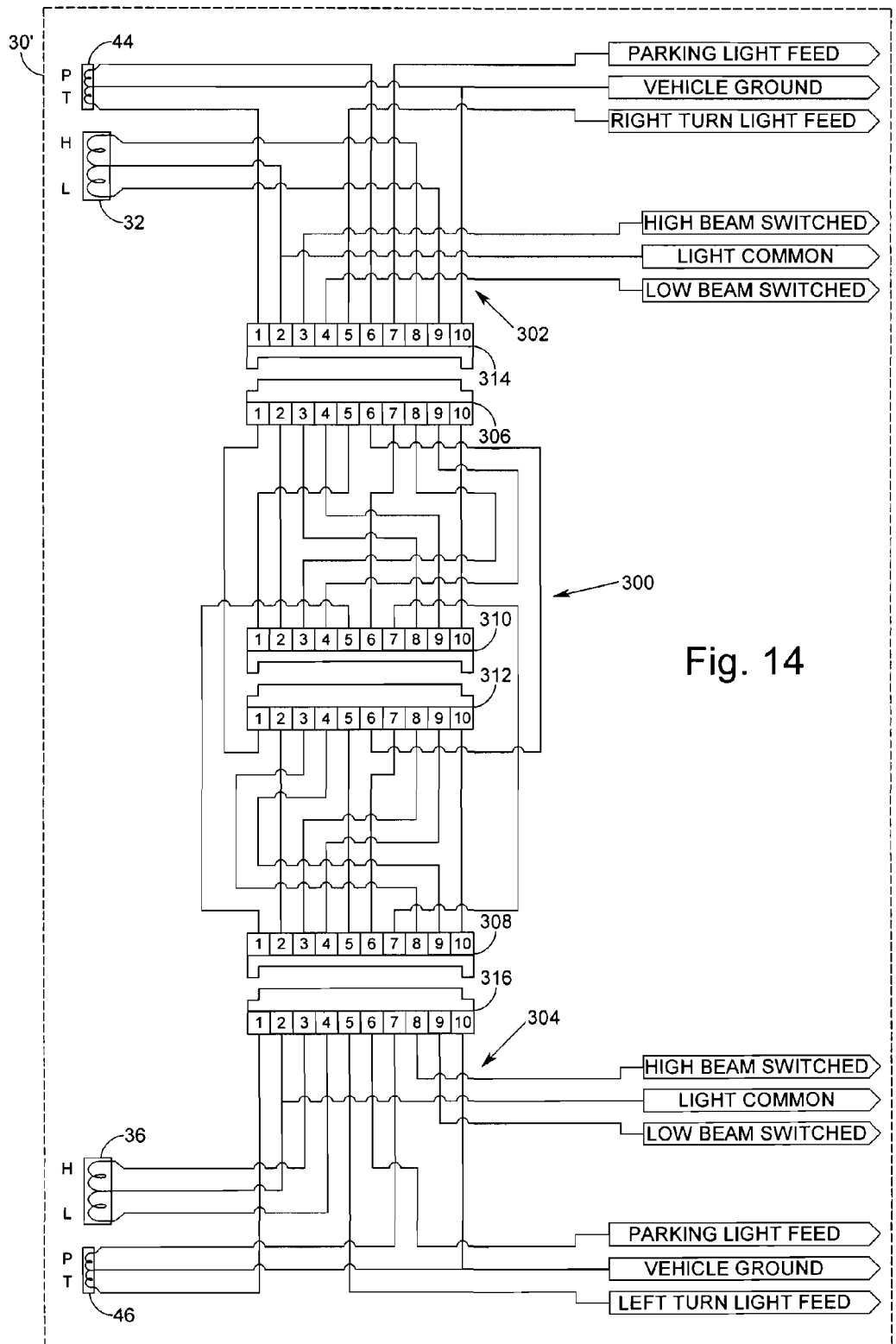
FIG. 14 is an embodiment of an independent lighting energy interruption system that will connect and operate the auxiliary lights located on a vehicle accessory shown in FIG. 2 to the vehicle lighting system shown in FIG. 1, with the auxiliary lights not connected to the vehicle lighting system.

Referring now to FIG. 14, the portion of the first embodiment of the independent lighting energy interruption system which is located in the vehicle 30' is illustrated in the first configuration (which is used when the vehicle accessory 50 is not connected to the vehicle 30'). This embodiment is suitable for use with a vehicle in which all of the electrical connections of the independent lighting energy interruption system are to be made by cutting and splicing wires. The portion of the independent lighting energy interruption system which is located in the vehicle consists of a main vehicle harness portion 300, a right side auxiliary harness portion 302, and a left side auxiliary harness portion 304.

The main vehicle harness portion 300 has a right side portion which is connected to the electrical system of the vehicle 30' with a right side main harness connector 306, and a left side portion which is connected to the electrical system of the vehicle with a left side main harness connector 308. The right side portion of the main vehicle harness portion 300 is designed to be connected to the vehicle accessory 50 (not shown in FIG. 14) with a right side vehicle harness connector 310, and the left side of the main vehicle harness portion 300 is likewise designed to be connected to the vehicle accessory 50 with a left side vehicle harness connector 312.

The right side auxiliary harness portion 302 has a right side auxiliary harness connector 314 to connect it to the right side main harness connector 306 of the main vehicle harness portion 300. The left side auxiliary harness portion 304 has a left side auxiliary harness connector 316 to connect it to the left side main harness connector 308 of the main vehicle harness portion 300.

Figure 15:
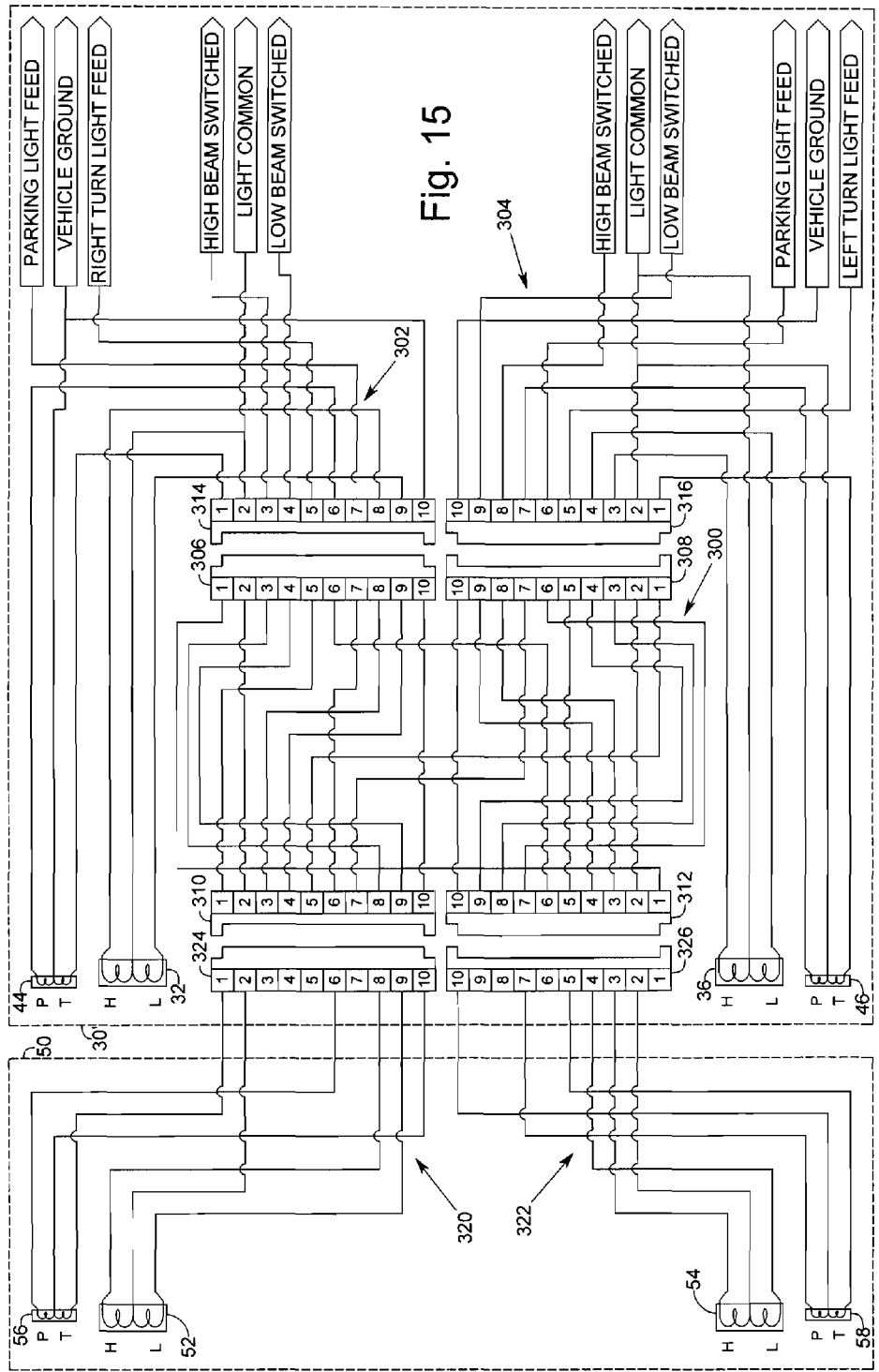
FIG. 15 is a schematic depiction of the embodiment of the independent lighting energy interruption system illustrated in FIG. 14, but with the auxiliary lights connected to the vehicle lighting system.

Referring for the moment to FIG. 15, the first embodiment of the entire independent lighting energy interruption system, including the portion which is located in the vehicle accessory 50, is illustrated in the second configuration (which is used when the vehicle accessory 50 is connected to the vehicle 30'). The portion of the independent lighting energy interruption system located in the vehicle accessory 50 includes a right side accessory harness 320 and a left side accessory harness 322. The right side accessory harness 320 has a right side accessory connector 324 and the left side accessory harness 322 has a left side accessory connector 326.

The right side vehicle harness connector 310 will mate with the left side vehicle harness connector 312 (as shown in FIG. 14) or with the right side accessory connector 324 (as shown in FIG. 15), but not with the left side accessory connector 326. The left side vehicle harness connector 312 will mate with the right side vehicle harness connector 310 or with the left side accessory connector 326, but not with the right side accessory connector 324. The right side accessory connector 324 and the left side accessory connector 326 will also mate with each other. In FIGS. 14 and 15, the right side vehicle harness connector 310 and the left side accessory connector 326 are female connectors, and the left side vehicle harness connector 312 and the right side accessory connector 324 are male connectors, but this configuration could be reversed. Preferably, the right side vehicle harness connector 310, the left side vehicle harness connector 312, the right side accessory connector 324, and the left side accessory connector 326 are color coded in a first color (such as black).

In the first embodiment of the independent lighting energy interruption system shown in FIGS. 14 and 15, the right side vehicle harness connector 310, the left side vehicle harness connector 312, the right side auxiliary harness connector 314, and the left side auxiliary harness connector 316 are all ten-pin connectors. Referring now solely to FIG. 14, Pins 1, 2, 3, 4, 6, 8, 9, and 10 of the right side vehicle harness connector 310 are respectively connected to pins 5, 2, 8, 9, 7, 3, 4, and 10 of the right side main harness connector 306. Pins 2, 3, 4, 5, 7, 8, 9, and 10 of the left side vehicle harness connector 312 are respectively connected to pins 2, 8, 9, 5, 6, 3, 4, and 10 of the left side main harness connector 308.

In addition, there are four connections between the right and left halves of the right side vehicle harness connector 310. Pins 5 and 7 of the right side vehicle harness connector 310 are respectively connected to pins 1 and 7 of the left side main harness connector 308. Pins 1 and 6 of the left side vehicle harness connector 312 are respectively connected to pins 1 and 6 of the right side main harness connector 306. The main vehicle harness portion 300 with this wiring schematic will be used in all four of the embodiments of the independent lighting energy interruption system discussed herein with reference to FIGS. 14 and 15, FIG. 16, FIG. 17, and FIGS. 18 and 19.

The right side main harness connector 306 will mate with the right side auxiliary harness connector 314, but not with the left side auxiliary harness connector 316. The left side main harness connector 308 will mate with the left side auxiliary harness connector 316, but not with the right side auxiliary harness connector 314. The left side main harness connector 308 and the right side auxiliary harness connector 314 are female connectors, and the right side main harness connector 306 and the left side auxiliary harness connector 316 are male connectors, but this configuration could be reversed. Preferably, the right side main harness connector 306, the left side main harness connector 308, the right side auxiliary harness connector 314, and the left side auxiliary harness connector 316 are color coded in a second color (such as green). In the first embodiment of the independent lighting energy interruption system shown in FIGS. 14 and 15, the right side main harness connector 306, the left side main harness connector 308, the right side auxiliary harness connector 314, and the left side auxiliary harness connector 316 are all ten-pin connectors.

The right side auxiliary harness portion 302 and the left side auxiliary harness portion 304 used in the first embodiment of the independent lighting energy interruption system shown in FIGS. 14 and 15 are hard-wired embodiments in which the wires of the right side auxiliary harness portion 302 and the left side auxiliary harness portion 304 are directly connected to the vehicle lighting electrical wiring.

Referring first to the right side vehicle lighting electrical wiring, it may be seen that the electrical connection between the high beam switched feed and the high beam lead to the headlight 32 is cut, and the electrical connection between the low beam switched feed and the low beam lead to the headlight 32 is cut. Likewise, the electrical connection between the parking light feed and the parking light lead to the parking/turn light 44 is cut, and the electrical connection between the right turn light feed and the right turn light lead to the parking/turn light 44 is cut. However, the electrical connection between the light common feed and the light common lead to the headlight 32 is not cut, and the electrical connection between the vehicle ground feed and the vehicle ground lead to the parking/turn light 44 is not cut.

Pins 3 and 4 of the right side auxiliary harness connector 314 are respectively connected to the high beam switched feed and the low beam switched feed. Pins 8 and 9 of the right side auxiliary harness connector 314 are respectively connected to the high beam lead of the headlight 32 and the low beam lead of the headlight 32. Pin 2 of the right side auxiliary harness connector 314 is connected to the light common lead.

Pins 7 and 5 of the right side auxiliary harness connector 314 are respectively connected to the parking light feed and the right turn signal feed. Pins 6 and 1 of the right side auxiliary harness connector 314 are respectively connected to the parking light lead of the parking/turn light 44 and the right turn signal lead of the parking/turn light 44. Pin 10 of the right side auxiliary harness connector 314 is connected to the vehicle ground lead.

Referring now to the left side vehicle lighting electrical wiring, it may be seen that the electrical connection between the high beam switched feed and the high beam lead to the headlight 36 is cut, and the electrical connection between the low beam switched feed and the low beam lead to the headlight 36 is cut. Likewise, the electrical connection between the parking light feed and the parking light lead to the parking/turn light 46 is cut, and the electrical connection between the right turn light feed and the right turn light lead to the parking/turn light 46 is cut. However, the electrical connection between the light common feed and the light common lead to the headlight 36 is not cut, and the electrical connection between the vehicle ground feed and the vehicle ground lead to the parking/turn light 46 is not cut.

Pins 8 and 9 of the left side auxiliary harness connector 316 are respectively connected to the high beam switched feed and the low beam switched feed. Pins 3 and 4 of the left side auxiliary harness connector 316 are respectively connected to the high beam lead of the headlight 36 and the low beam lead of the headlight 36. Pin 2 of the left side auxiliary harness connector 316 is connected to the light common lead.

Pins 6 and 5 of the left side auxiliary harness connector 316 are respectively connected to the parking light feed and the left turn signal feed. Pins 7 and 1 of the left side auxiliary harness connector 316 are respectively connected to the parking light lead of the parking/turn light 46 and the left turn signal lead of the parking/turn light 46. Pin 10 of the left side auxiliary harness connector 316 is connected to the vehicle ground lead.

Turning now to FIG. 15, with regard to the right side accessory harness 320, Pin 1 is connected to the right turn signal lead of the parking/turn light 56, Pin 2 is connected to the common lead of the headlight 52, Pin 6 is connected to the parking light feed of the parking/turn light 56, Pin 8 is connected to the high beam lead of the headlight 52, Pin 9 is connected to the low beam lead of the headlight 52, and Pin 10 is connected to the ground lead of the parking/turn light 56. With regard to the left side accessory harness 322, Pin 2 is connected to the common lead of the headlight 54, Pin 3 is connected to the high beam lead of the headlight 54, Pin 4 is connected to the low beam lead of the headlight 54, Pin 5 is connected to the left turn signal lead of the parking/turn light 58, Pin 7 is connected to the parking light feed of the parking/turn light 58, and Pin 10 is connected to the ground lead of the parking/turn light 58. The right side accessory harness 320 and the left side accessory harness 322 with these wiring schematics will be used in all four of the embodiments of the independent lighting energy interruption system discussed herein with reference to FIGS. 14 and 15, FIG. 16, FIG. 17, and FIGS. 18 and 19.

It will be appreciated by those skilled in the art that the first embodiment of the independent lighting energy interruption system illustrated in FIGS. 14 and 15 switches the hot leads from the high and low beams in the headlights 32 and 36 of the vehicle 30' to the high and low beams in the headlights 52 and 54 of the vehicle accessory 50. It also switches the hot leads from the parking lights and turn signals in the parking/turn lights 44 and 46 of the vehicle 30' to the parking lights and turn signals in the parking/turn lights 56 and 58 of the vehicle accessory 50. When the right side vehicle harness connector 310 and the left side vehicle harness connector 312 of the right side vehicle harness connector 310 are connected together as shown in FIG. 14, the headlights 32 and 36 and the parking/turn light 44 and 46 of the vehicle 30' will be operative. If the right side vehicle harness connector 310 and the left side vehicle harness connector 312 are not connected to each other, the headlights 32 and 36 and the parking/turn light 44 and 46 of the vehicle 30' will be inoperative.

Referring again to FIG. 15, the first embodiment of the independent lighting energy interruption system is shown in the second configuration (which is used when the vehicle accessory 50 is connected to the vehicle 30'). When the right side vehicle harness connector 310 is connected to the right side accessory connector 324 and the left side vehicle harness connector 312 is connected to the left side accessory connector 326, the headlights 52 and 54 and the parking/turn lights 56 and 58 of the vehicle accessory 50 will be operative, and the headlights 32 and 36 of the vehicle 30' and the parking/turn light 44 and 46 will not be operative.

Figure 16:
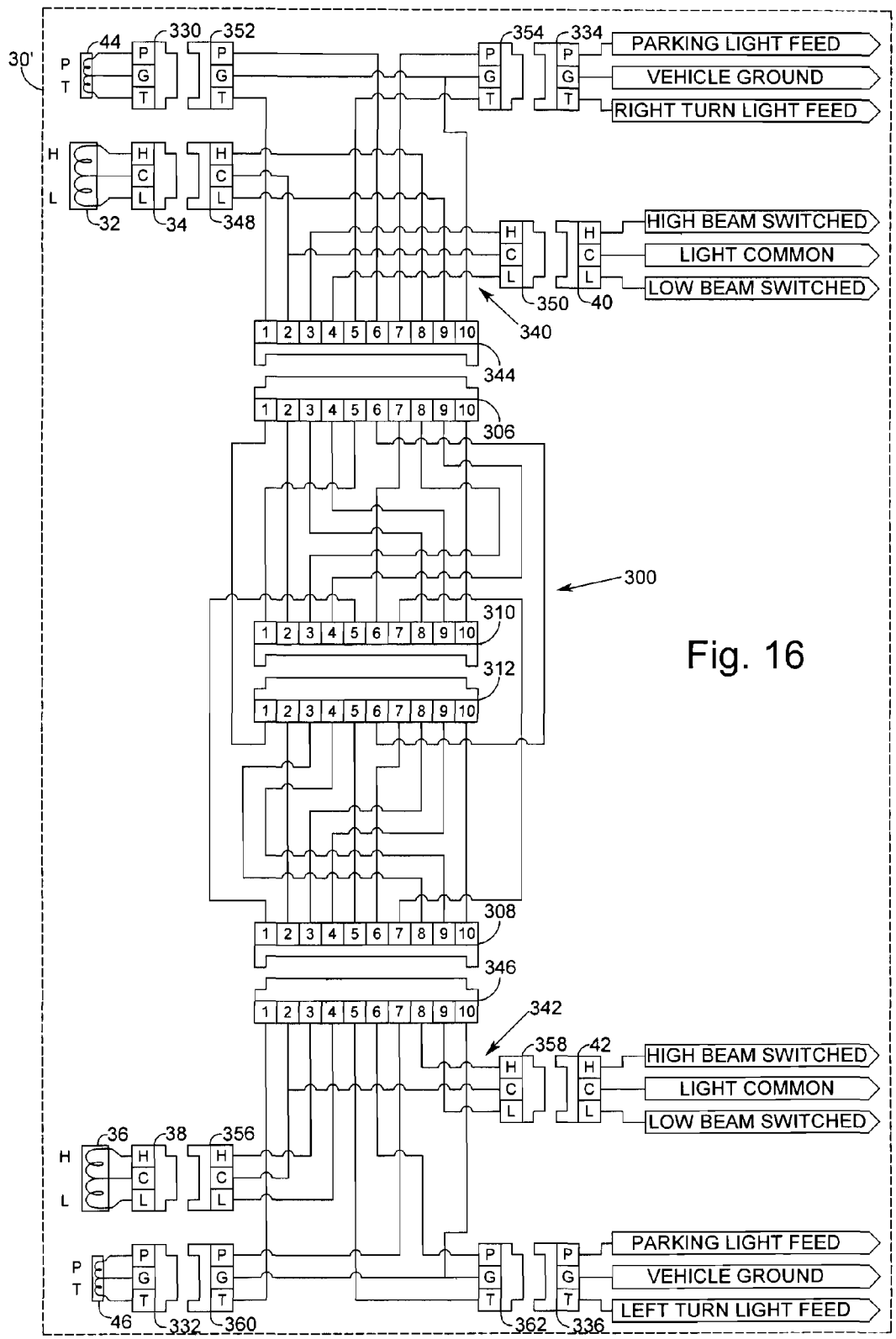
FIG. 16 is another embodiment of an independent lighting energy interruption system that will connect and operate the auxiliary lights located on a vehicle accessory shown in FIG. 2 to a vehicle lighting system having modular connectors used with combined high beam/low beam headlights, with the auxiliary lights not connected to the vehicle lighting system.

Referring next to FIG. 16, a second embodiment of the independent lighting energy interruption system is illustrated which will be used with a vehicle 30' which has connectors used to make the lighting connections in the vehicle the vehicle 30'. The vehicle 30' is shown as having the headlight plug 40 which would be connected to the connector element 34 of the headlight 32 and the headlight plug 42 which would be connected to the connector element 38 of the headlight 36. In addition, the parking/turn light 44 is associated with a connector element 330 located on the right side of the vehicle 30' and the parking/turn light 46 is associated with a connector element 332 located on the left side of the vehicle 30'. A parking/turn plug 334 is shown for connection to the connector element 330 on the parking/turn light 44, and a parking/turn plug 336 is shown for connection to the connector element 332 on the parking/turn light 46.

Instead of using the right side auxiliary harness portion 302 (shown in FIGS. 14 and 15) and the left side auxiliary harness portion 304 (also shown in FIGS. 14 and 15), a right side auxiliary harness portion 340 and a left side auxiliary harness portion 342 are used. The right side auxiliary harness portion 340 has a right side auxiliary harness connector 344 to connect it to the right side main harness connector 306 of the main vehicle harness portion 300. The left side auxiliary harness portion 342 has a left side auxiliary harness connector 346 to connect it to the left side main harness connector 308 of the main vehicle harness portion 300. The right side auxiliary harness portion 340 and the left side auxiliary harness portion 342 are color coded in the second color (green in the example used herein), and are ten-pin connectors.

Referring now to the right side auxiliary harness portion 340, it may be seen that it also includes a headlight connector 348 which is connected to the connector element 34 of the headlight 32, a headlight power connector 350 which is connected to the headlight plug 40, a parking/turn light connector 352 which is connected to the connector element 330, and a parking/turn light power connector 354 which is connected to the parking/turn plug 334. With regard to the left side auxiliary harness portion 342, it may be seen that it also includes a headlight connector 356 which is connected to the connector element 38 of the headlight 36, a headlight power connector 358 which is connected to the headlight plug 42, a parking/turn light connector 360 which is connected to the connector element 332, and a parking/turn light power connector 362 which is connected to the parking/turn plug 336.

It will be appreciated by those skilled in the art that the second embodiment of the independent lighting energy interruption system illustrated in FIG. 16 includes the right side auxiliary harness portion 340 and the left side auxiliary harness portion 342 which may be installed by simply plugging the connectors of the right side auxiliary harness portion 340 and the left side auxiliary harness portion 342 into the existing connectors of the electrical wiring of the illumination system of the vehicle 30'. Like the first embodiment, the second embodiment operates by switching the hot leads from the high and low beams in the headlights 32 and 36 of the vehicle 30' to the high and low beams in the headlights 52 and 54 of the vehicle accessory 50 (shown in FIG. 15), and switching the hot leads from the parking lights and turn signals in the parking/turn lights 44 and 46 of the vehicle 30' to the parking lights and turn signals in the parking/turn lights 56 and 58 of the vehicle accessory 50

When the right side vehicle harness connector 310 and the left side vehicle harness connector 312 of the right side vehicle harness connector 310 are connected together as shown in FIG. 16, the headlights 32 and 36 and the parking/turn light 44 and 46 of the vehicle 30' will be operative. If the right side vehicle harness connector 310 and the left side vehicle harness connector 312 are not connected to each other, the headlights 32 and 36 and the parking/turn lights 44 and 46 of the vehicle 30' will be inoperative. When the right side vehicle harness connector 310 is connected to the right side accessory connector 324 (shown in FIG. 15) and the left side vehicle harness connector 312 is connected to the left side accessory connector 326 (shown in FIG. 15), the headlights 52 and 54 and the parking/turn lights 56 and 58 of the vehicle accessory 50 will be operative, and the headlights 32 and 36 and the parking/turn lights 44 and 46 of the vehicle 30' will not be operative.

Figure 17:
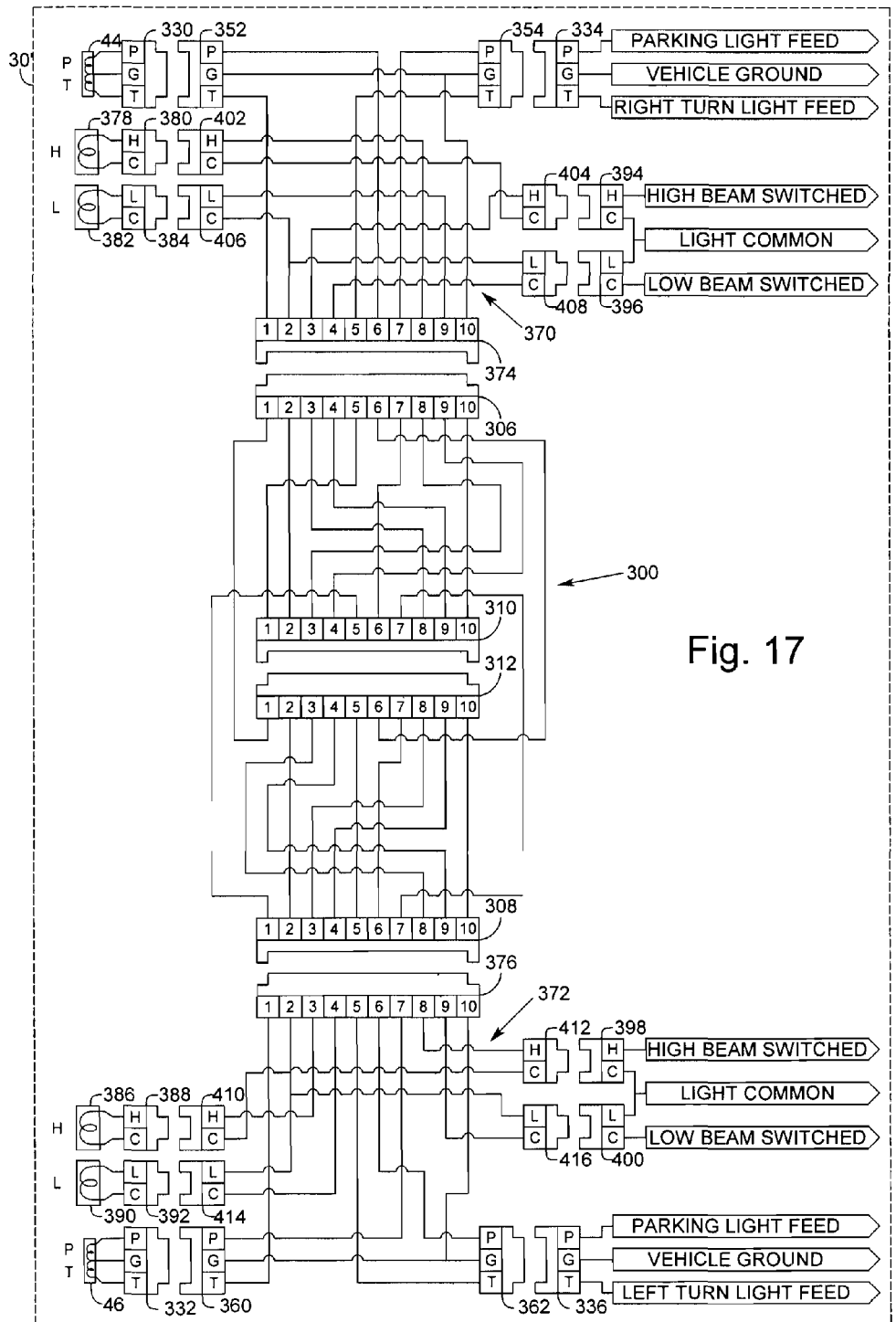
FIG. 17 is still another embodiment of an independent lighting energy interruption system that will connect and operate the auxiliary lights located on a vehicle accessory shown in FIG. 2 to a vehicle lighting system having separate headlight bulbs and separate modular connectors for high and low beams, with the auxiliary lights not connected to the vehicle lighting system.

Referring now to FIG. 17, a third embodiment of the independent lighting energy interruption system is illustrated which will be used with a vehicle 30' which has a different type of connector used to make the lighting connections for the headlights in the vehicle 30'. The vehicle 30' is shown as having the parking/turn plug 334 which would be connected to the connector element 330 of the parking/turn light 44 and the parking/turn plug 336 which would be connected to the connector element 332 of the parking/turn light 46.

In this particular vehicle 30', the high and low beams are two discrete lights rather than both being included in a single unit. Thus, a high beam headlight 378 having a connector element 380 (typically prongs extending from the back side thereof) and a low beam headlight 382 having a connector element 384 (typically prongs extending from the back side thereof) are located on the right side of the vehicle 30', and a high beam headlight 386 having a connector element 388 (typically prongs extending from the back side thereof) and a low beam headlight 390 having a connector element 392 (typically prongs extending from the back side thereof) are located on the left side of the vehicle 30'.

Referring now to the right side auxiliary harness portion 370, it may be seen that it includes the parking/turn light connector 352 which is connected to the connector element 330 of the parking/turn light 44, and the parking/turn light power connector 354 which is connected to the parking/turn plug 334. The right side auxiliary harness portion 370 also includes a high beam headlight connector 402 which is connected to the connector 380 of the high beam headlight 378, a high beam headlight power connector 404 which is connected to the high beam headlight plug 394, a low beam headlight connector 406 which is connected to the connector 384 of the low beam headlight 382, and a low beam headlight power connector 408 which is connected to the low beam headlight plug 396.

Referring now to the left side auxiliary harness portion 372, it may be seen that it includes the parking/turn light connector 360 which is connected to the connector element 332 of the parking/turn light 46, and the parking/turn light power connector 362 which is connected to the parking/turn plug 336. The left side auxiliary harness portion 372 also includes a high beam headlight connector 410 which is connected to the connector 388 of the high beam headlight 386, a high beam headlight power connector 412 which is connected to the high beam headlight plug 398, a low beam headlight connector 414 which is connected to the connector 392 of the low beam headlight 390, and a low beam headlight power connector 416 which is connected to the low beam headlight plug 400.

It will be appreciated by those skilled in the art that the third embodiment of the independent lighting energy interruption system illustrated in FIG. 17 includes the right side auxiliary harness portion 370 and the left side auxiliary harness portion 372 which may be installed by simply plugging the connectors of the right side auxiliary harness portion 370 and the left side auxiliary harness portion 372 into the existing connectors of the electrical wiring of the illumination system of the vehicle 30'. Like the first and second embodiments, the third embodiment operates by switching the hot leads from the high beam headlight 378, the low beam headlight 382, the high beam headlight 386, and the low beam headlight 390 of the vehicle 30' to the high beam in the headlight 52, the low beam in the headlight 52, the high beam in the headlight 54, the low beam in the headlight 54, respectively, of the vehicle accessory 50 (shown in FIG. 15), and switching the hot leads from the parking lights and turn signals in the parking/turn lights 44 and 46 of the vehicle 30' to the parking lights and turn signals in the parking/turn lights 56 and 58 of the vehicle accessory 50.

When the right side vehicle harness connector 310 and the left side vehicle harness connector 312 of the right side vehicle harness connector 310 are connected together as shown in FIG. 17, the high beam headlight 378, the low beam headlight 382, the high beam headlight 386, and the low beam headlight 390 and the parking/turn lights 44 and 46 of the vehicle 30' will be operative. If the right side vehicle harness connector 310 and the left side vehicle harness connector 312 are not connected to each other, the high beam headlight 378, the low beam headlight 382, the high beam headlight 386, and the low beam headlight 390 and the parking/turn lights 44 and 46 of the vehicle 30' will be inoperative. When the right side vehicle harness connector 310 is connected to the right side accessory connector 324 (shown in FIG. 15) and the left side vehicle harness connector 312 is connected to the left side accessory connector 326 (shown in FIG. 15), the headlights 52 and 54 and the parking/turn lights 56 and 58 of the vehicle accessory 50 will be operative, and the high beam headlight 378, the low beam headlight 382, the high beam headlight 386, and the low beam headlight 390 and the parking/turn lights 44 and 46 of the vehicle 30' will not be operative.

Figure 18:
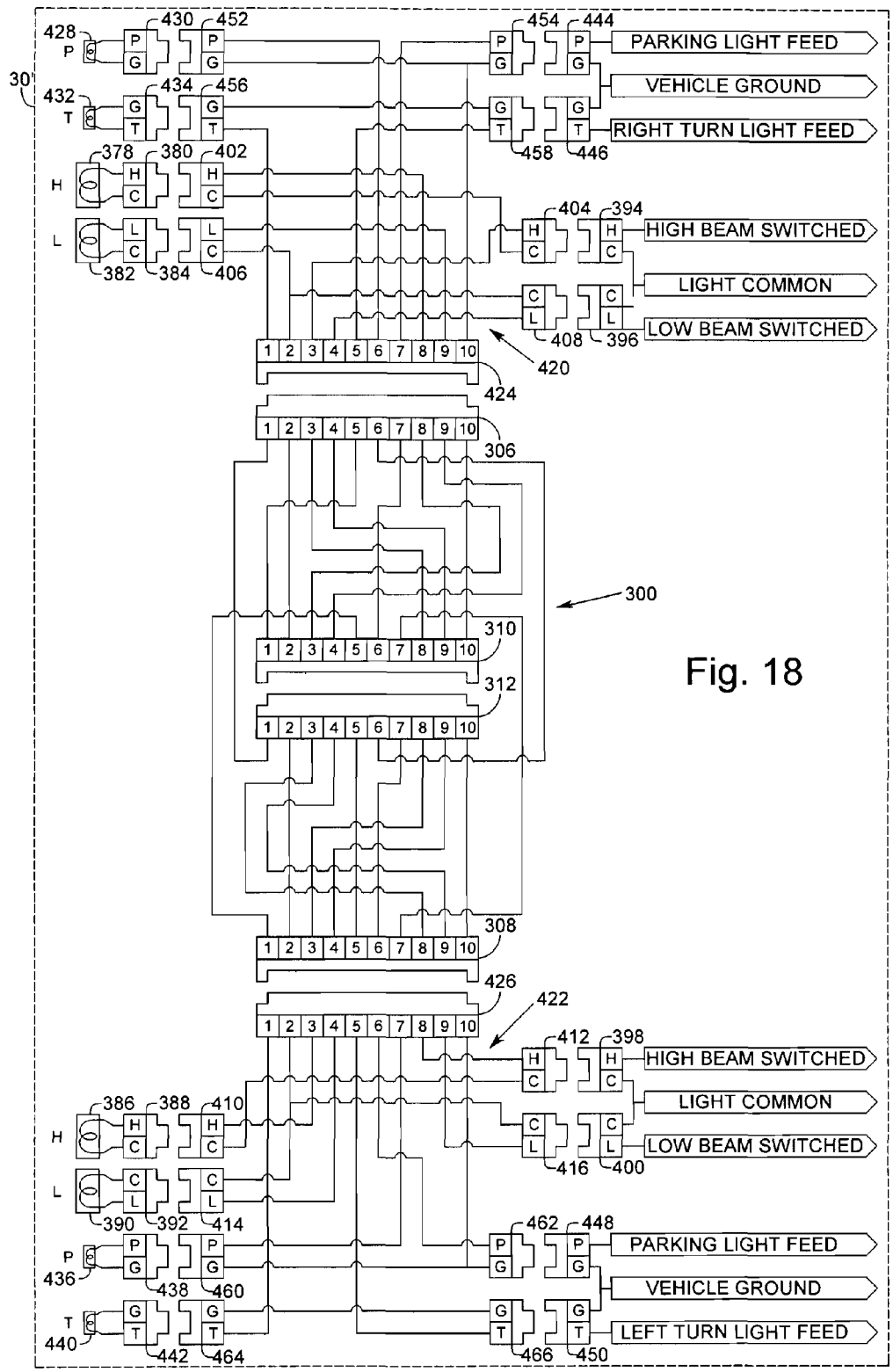
FIG. 18 is yet another embodiment of an independent lighting energy interruption system that will connect and operate the auxiliary lights located on a vehicle accessory shown in FIG. 2 to the vehicle lighting system having separate headlight bulbs and separate modular connectors for high and low beams as well as having separate marker bulbs and turn signal bulbs and separate modular connectors for the marker bulbs and the turn signal bulbs, with the auxiliary lights not connected to the vehicle lighting system.
Figure 19:
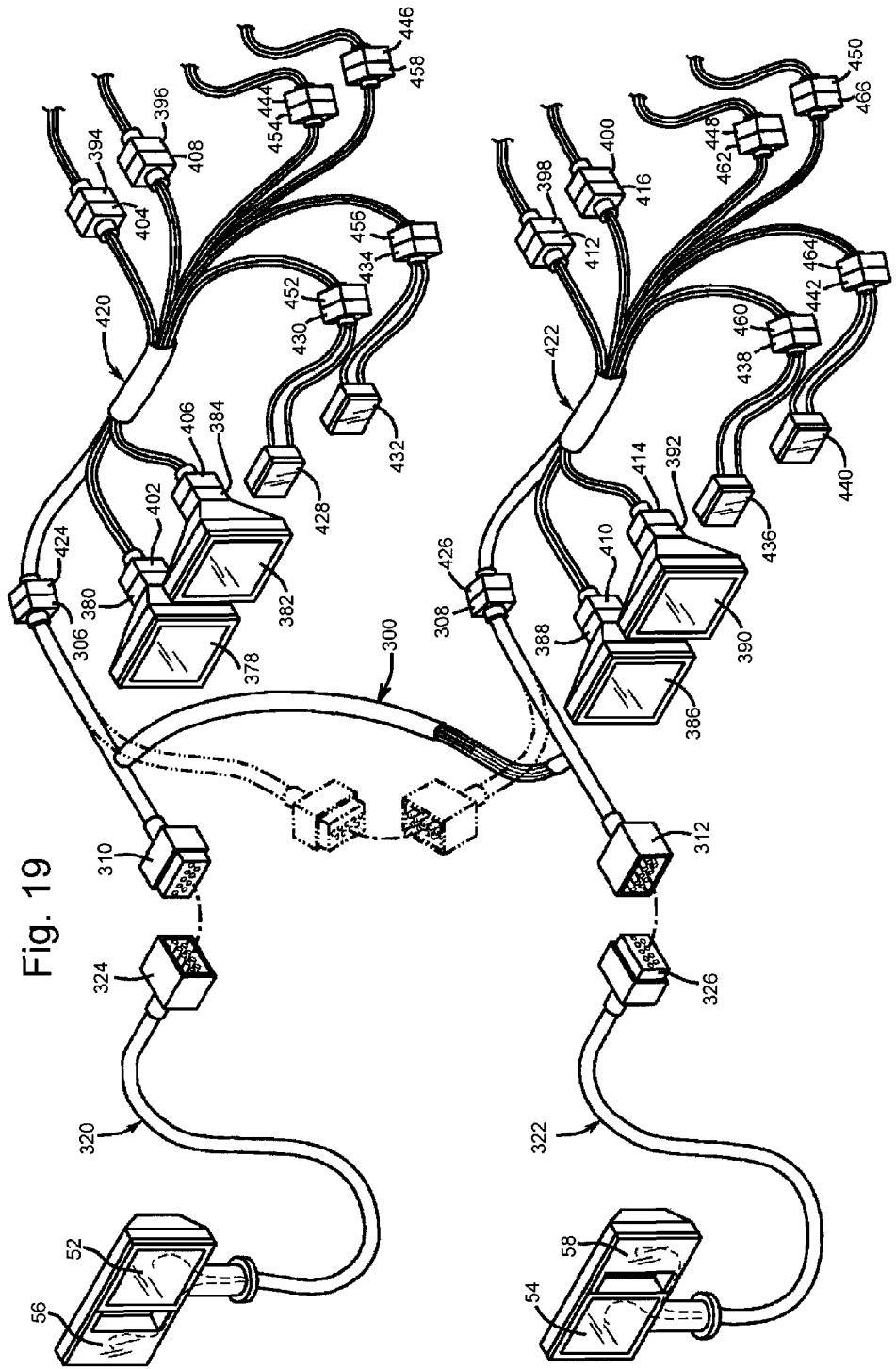
FIG. 19 is an isometric view showing the independent lighting energy interruption system as illustrated in FIG. 18 installed intermediate the lights of a conventional vehicle lighting system that are located at the front of the vehicle and the auxiliary lights of a vehicle accessory for installation onto the front of the vehicle.

Referring next to FIG. 18, a fourth embodiment of the independent lighting energy interruption system is illustrated which will be used with a vehicle 30' which has a different type of connectors used to make the lighting connections for the parking and marker lights in the vehicle. The vehicle 30' is shown as having the connector 380 of the high beam headlight 378, the connector 384 of the low beam headlight 382, the connector 388 of the high beam headlight 386, and the connector 392 of the low beam headlight 390, which would be respectively connected to the high beam headlight plug 394, the low beam headlight plug 396, the high beam headlight plug 398, and the low beam headlight plug 400.

In this particular vehicle 30', the parking lights and the turn signals are two discrete lights rather than both being included in a single unit. Thus, a parking light 428 having a connector element 430 and a right turn light 432 having a connector element 434 are located on the right side of the vehicle 30', and a parking light 436 having a connector element 438 and a left turn light 440 having a connector element 442 are located on the left side of the vehicle 30'.

Referring now to the right side auxiliary harness portion 420, it may be seen that it includes the high beam headlight connector 402 which is connected to the connector 380 of the high beam headlight 378, the high beam headlight power connector 404 which is connected to the high beam headlight plug 394, the low beam headlight connector 406 which is connected to the connector 384 of the low beam headlight 382, and the low beam headlight power connector 408 which is connected to the low beam headlight plug 396. The right side auxiliary harness portion 420 also includes a parking light connector 452 which is connected to the connector 430 of the parking light 428, a parking light power connector 454 which is connected to the parking light plug 444, a right turn light connector 456 which is connected to the connector 434 of the right turn light 432, and a right turn light power connector 458 which is connected to the right turn light plug 446.

Referring now to the left side auxiliary harness portion 422, it may be seen that it includes the high beam headlight connector 410 which is connected to the connector 388 of the high beam headlight 386, the high beam headlight power connector 412 which is connected to the high beam headlight plug 398, the low beam headlight connector 414 which is connected to which is connected to the connector 392 of the low beam headlight 390, and the low beam headlight power connector 416 which is connected to the low beam headlight plug 400. The left side auxiliary harness portion 422 also includes a parking light connector 460 which is connected to the connector 438 of the parking light 436, a parking light power connector 462 which is connected to the parking light plug 448, a left turn light connector 464 which is connected to the connector 442 of the left turn light 440, and a left turn light power connector 466 which is connected to the left turn light plug 450.

It will be appreciated by those skilled in the art that the fourth embodiment of the independent lighting energy interruption system illustrated in FIG. 18 includes the right side auxiliary harness portion 420 and the left side auxiliary harness portion 422 which may be installed by simply plugging the connectors of the right side auxiliary harness portion 420 and the left side auxiliary harness portion 422 into the existing connectors of the electrical wiring of the illumination system of the vehicle 30'. Like the first three embodiments, the fourth embodiment operates by switching the hot leads from the high beam headlight 378, the low beam headlight 382, the high beam headlight 386, and the low beam headlight 390 of the vehicle 30' to the high beam in the headlight 52, the low beam in the headlight 52, the high beam in the headlight 54, the low beam in the headlight 54, respectively, of the vehicle accessory 50 (shown in FIG. 15), and switching the hot leads from the parking light 428, the right turn light 432, the parking light 436, and the left turn light 440 of the vehicle 30' to the parking lights and turn signals in the parking/turn lights 56 and 58 of the vehicle accessory 50.

When the right side vehicle harness connector 310 and the left side vehicle harness connector 312 of the right side vehicle harness connector 310 are connected together as shown in FIG. 18, the high beam headlight 378, the low beam headlight 382, the high beam headlight 386, the low beam headlight 390, the parking light 428, the right turn light 432, the parking light 436, and the left turn light 440 of the vehicle 30' will be operative. If the right side vehicle harness connector 310 and the left side vehicle harness connector 312 are not connected to each other, the high beam headlight 378, the low beam headlight 382, the high beam headlight 386, the low beam headlight 390, the parking light 428, the right turn light 432, the parking light 436, and the left turn light 440 of the vehicle 30' will be inoperative.

When the right side vehicle harness connector 310 is connected to the right side accessory connector 324 (shown in FIG. 15) and the left side vehicle harness connector 312 is connected to the left side accessory connector 326 (shown in FIG. 15), the headlights 52 and 54 and the parking/turn lights 56 and 58 of the vehicle accessory 50 will be operative, and the high beam headlight 378, the low beam headlight 382, the high beam headlight 386, the low beam headlight 390, the parking light 428, the right turn light 432, the parking light 436, and the left turn light 440 of the vehicle 30' will not be operative.

Referring next to FIG. 19, the fourth embodiment of the independent lighting energy interruption system, which was illustrated in FIG. 18, is illustrated in simplified form as it would likely appear, with the same reference numerals used in FIG. 18 being used in FIG. 19. The right side vehicle harness connector 310 is shown in position for connection to the right side accessory connector 324 to operate the headlight 52 and the parking/turn light 56 on the vehicle accessory 50 (the vehicle accessory 50 is not shown in FIG. 19), and the left side vehicle harness connector 312 is shown in position for connection to the left side accessory connector 326 to operate the headlight 54 and the parking/turn light 58 on the vehicle accessory 50. In this position, the high beam headlight 378, the low beam headlight 382, the high beam headlight 386, the low beam headlight 390, the parking light 428, the right turn light 432, the parking light 436, and the left turn light 440 of the vehicle 30' (the vehicle 30' is not shown in FIG. 19) will be inoperative. The right side vehicle harness connector 310 and the left side vehicle harness connector 312 are shown in position for connection together in phantom lines to render the high beam headlight 378, the low beam headlight 382, the high beam headlight 386, the low beam headlight 390, the parking light 428, the right turn light 432, the parking light 436, and the left turn light 440 operative when the vehicle accessory 50 has been removed from the vehicle 30'.

Figure 22:
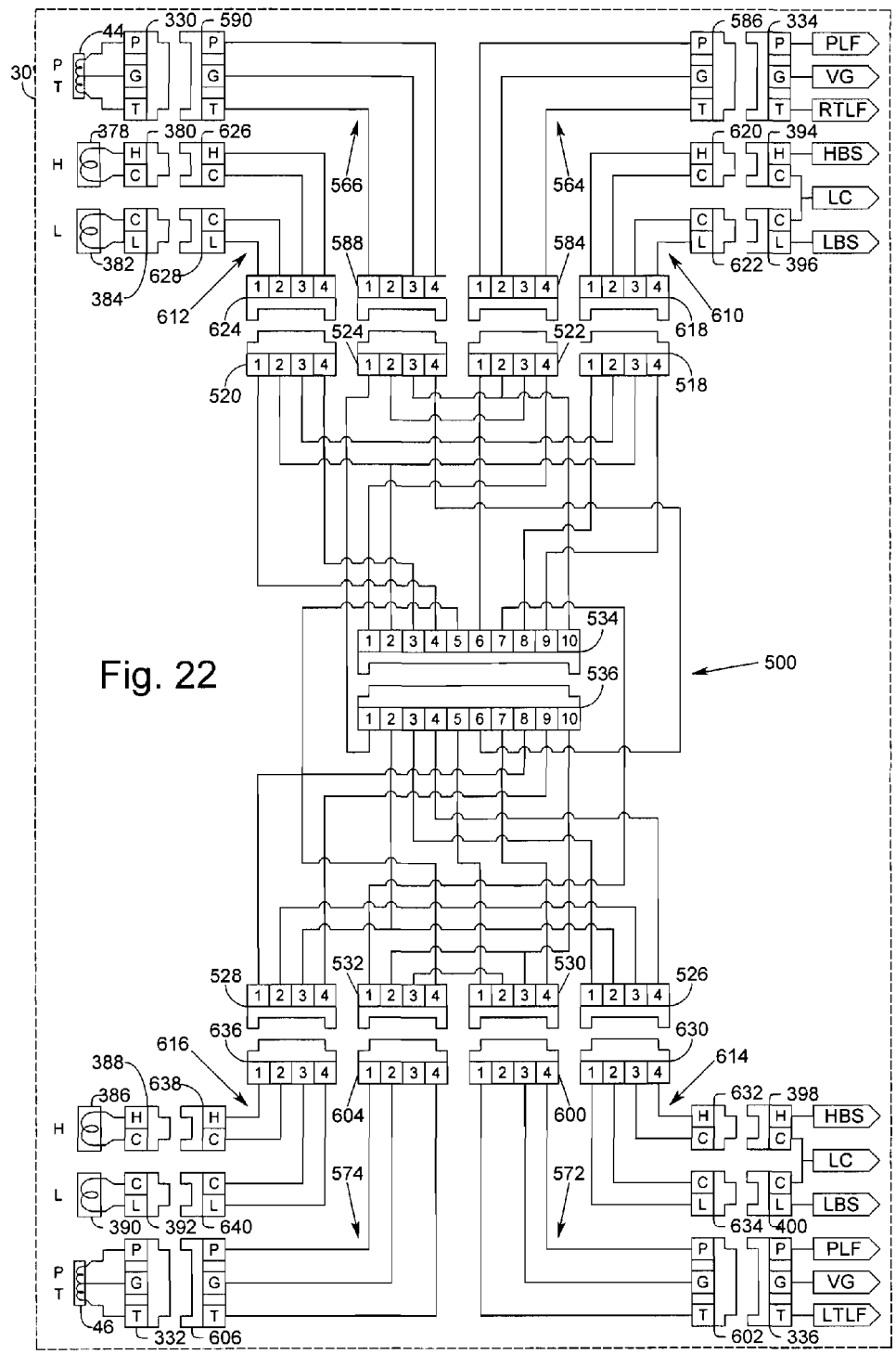
FIG. 22 is still another embodiment of a reconfigurable independent lighting energy interruption system that will connect and operate the auxiliary lights located on a vehicle accessory shown in FIG. 2 to a vehicle lighting system having separate headlight bulbs and separate modular connectors for high and low beams, with the auxiliary lights not connected to the vehicle lighting system.
Figure 23:
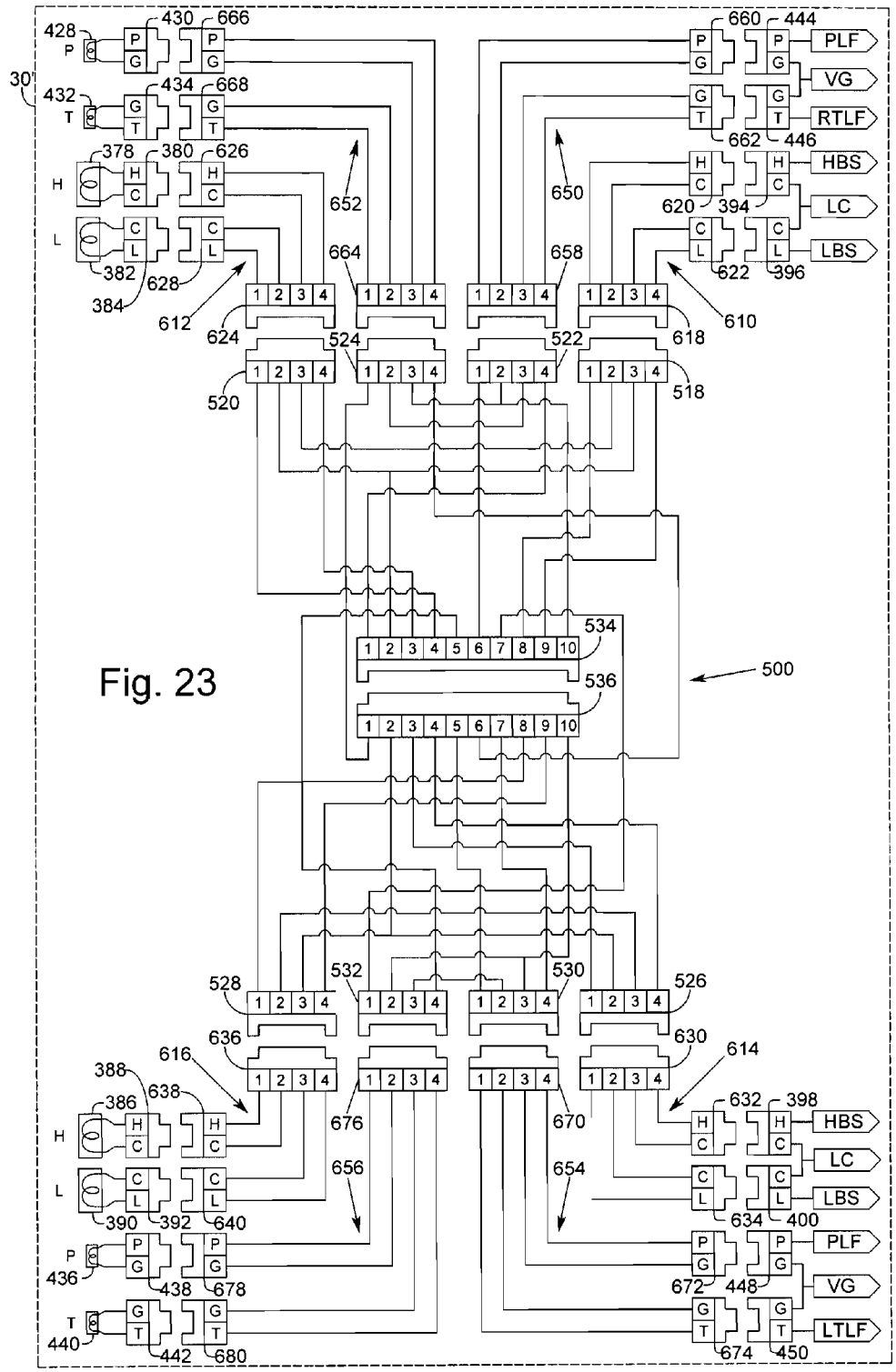
FIG. 23 is yet another embodiment of a reconfigurable independent lighting energy interruption system that will connect and operate the auxiliary lights located on a vehicle accessory shown in FIG. 2 to the vehicle lighting system having separate headlight bulbs and separate modular connectors for high and low beams as well as having separate marker bulbs and turn signal bulbs and separate modular connectors for the marker bulbs and the turn signal bulbs, with the auxiliary lights not connected to the vehicle lighting system.
Figure 24:
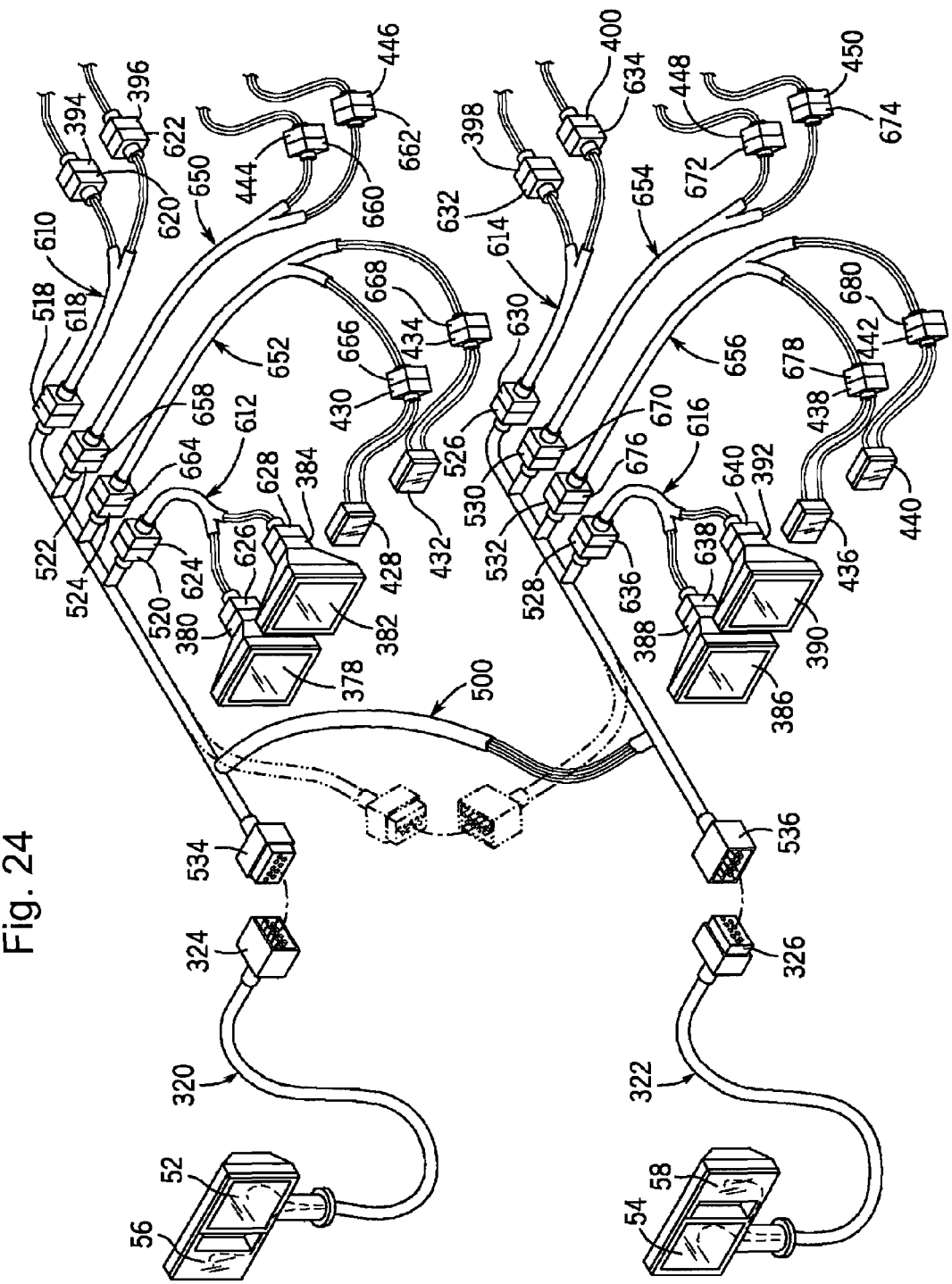
FIG. 24 is an isometric view showing the reconfigurable independent lighting energy interruption system as illustrated in FIG. 23 installed intermediate the lights of a conventional vehicle lighting system that are located at the front of the vehicle and the auxiliary lights of a vehicle accessory for installation onto the front of the vehicle.
Figure 25:
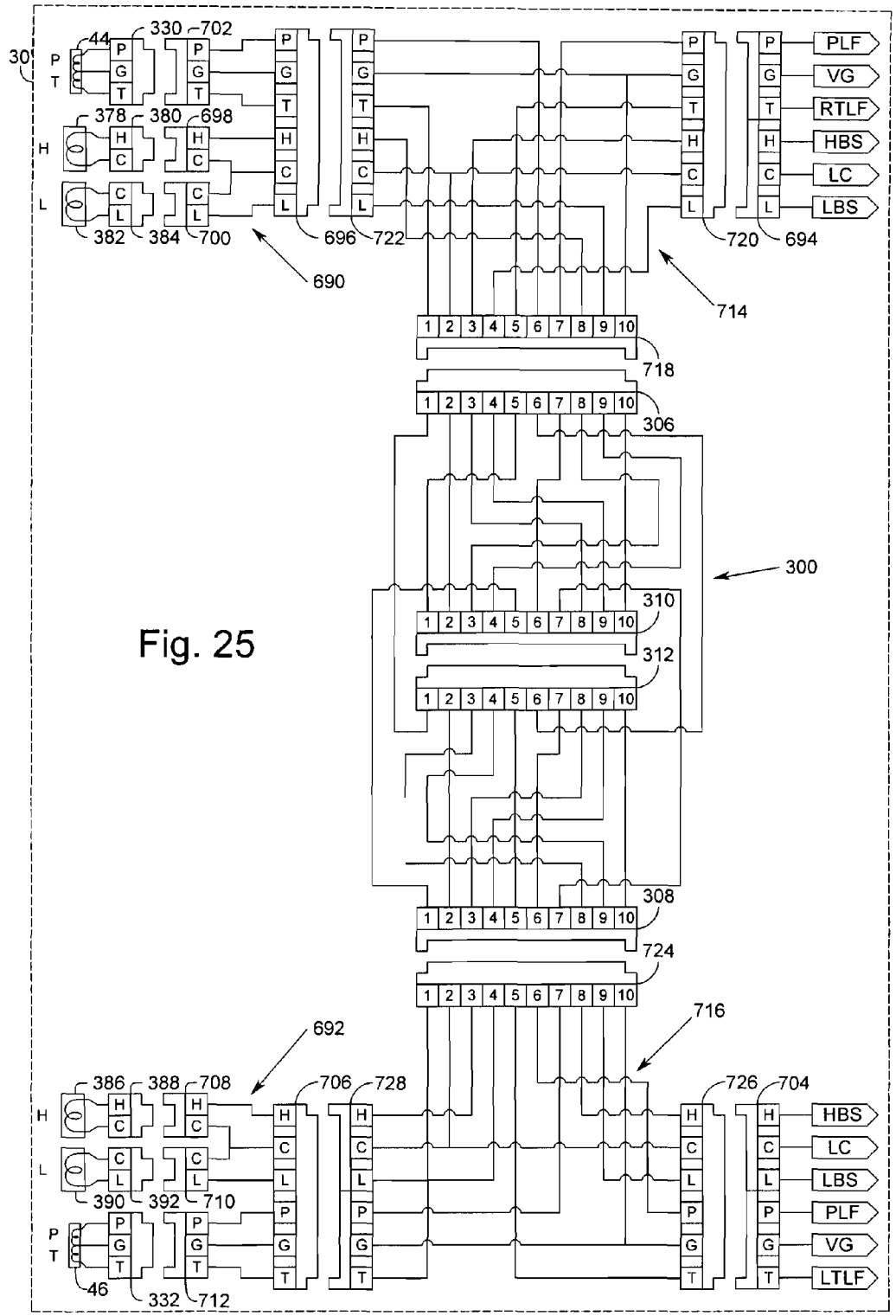
FIG. 25 is an alternate embodiment reconfigurable independent lighting energy interruption system for use in certain late-model trucks having direct interface light wiring harnesses, which is constructed to connect and operate the auxiliary lights located on a vehicle accessory shown in FIG. 2 to a vehicle lighting system having separate headlight bulbs and separate modular connectors for high and low beams, with the auxiliary lights not connected to the vehicle lighting system.
Figure 26:
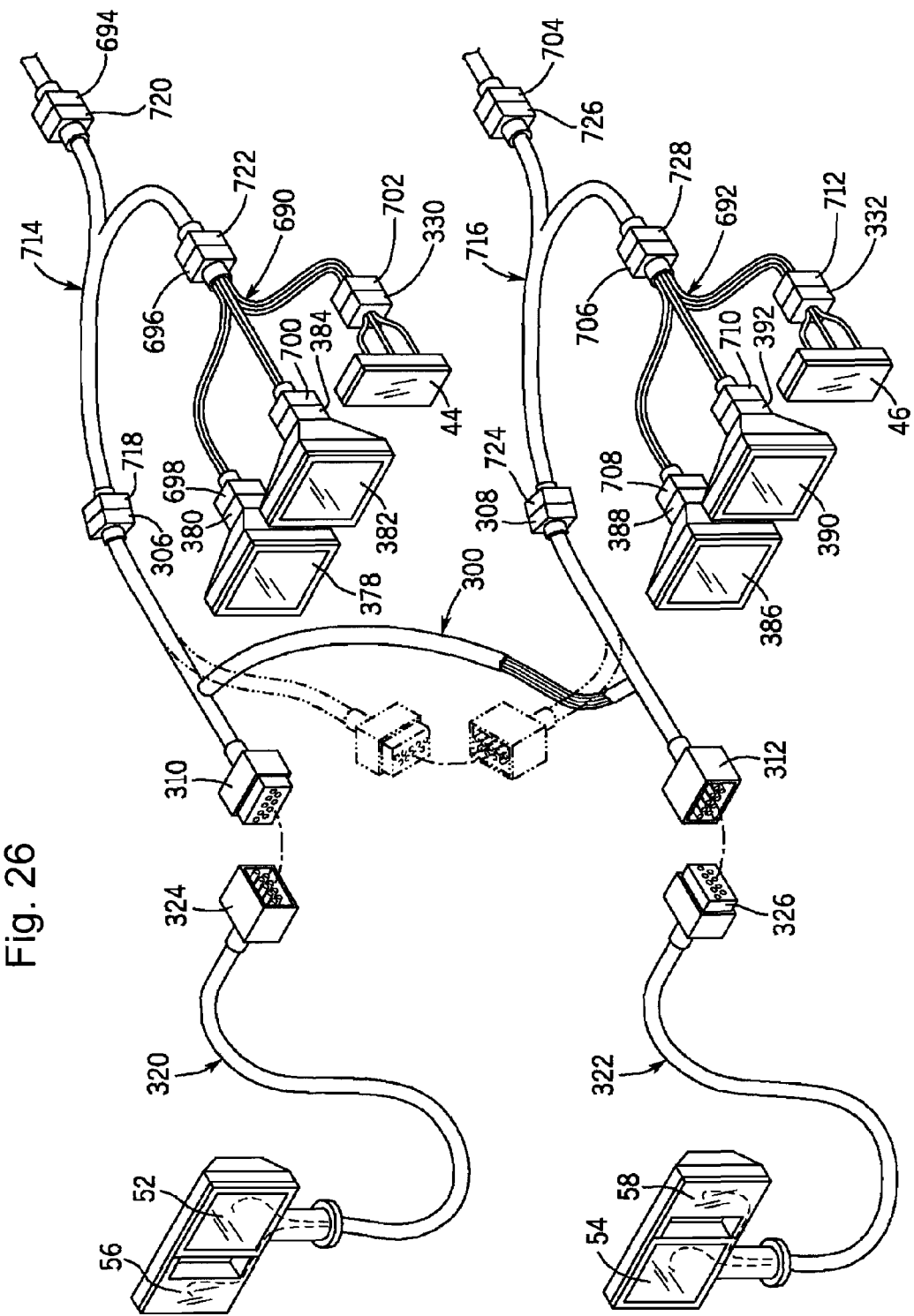
FIG. 26 is an isometric view showing a reconfigurable independent lighting energy interruption system as illustrated in FIG. 25 installed intermediate the lights of a conventional vehicle lighting system that are located at the front of the vehicle and the auxiliary lights of a vehicle accessory for installation onto the front of the vehicle.

A third series of embodiments of the independent lighting system referred to as a reconfigurable independent lighting energy interruption system is illustrated in five embodiments in FIG. 20, FIG. 21, FIG. 22, FIGS. 23 and 24, and FIGS. 25 and 26, respectively. The physical constructions of the fourth and fifth of these embodiments of the reconfigurable independent lighting energy interruption system are shown in FIGS. 24 and 26, respectively. In each of these five embodiments of the reconfigurable independent lighting energy interruption system, the vehicle harness portions in the vehicle 30' consist of a single main vehicle harness portion and right side and left side reconfiguration harness sets which are plugged into the main vehicle harness portion. In all five embodiments, the main vehicle harness portion is identical, with the right side and left side reconfiguration harness sets varying from embodiment to embodiment. The accessory harness portion in the vehicle accessory 50 consists of right side and left side accessory harnesses identical to those used with the independent lighting energy interruption system embodiments illustrated in FIGS. 14 through 19 (shown in FIGS. 15 and 19), and is identical in all five embodiments.

The distinction of the reconfigurable independent lighting energy interruption system from the independent lighting energy interruption system shown in FIGS. 14 through 19 is that while a single main vehicle harness portion is used, instead of customized auxiliary harness portions for each vehicle application, sets of reconfiguration harnesses are used which have common elements from vehicle to vehicle. The design of the independent lighting energy interruption system facilitates the use of a single main vehicle harness which will work with virtually any vehicle, with the right side and left side auxiliary harness sets being mixed and matched from common auxiliary harnesses to accommodate the differing electrical systems of any of a wide variety of different vehicles.

The reconfigurable independent lighting energy interruption system is illustrated in five embodiments in FIG. 20, FIG. 21, FIG. 22, FIGS. 23 and 24, and FIGS. 25 and 26, respectively. In each of these five embodiments of the reconfigurable independent lighting energy interruption system, the vehicle harness portions in the vehicle 30' consist of a standard main vehicle harness portion and right side and left side auxiliary harnesses which are plugged into the main vehicle harness portion. In the first four of these additional embodiments, the main vehicle harness portion is identical for all vehicles, with the right side and left side auxiliary harnesses varying from embodiment to embodiment to fit different vehicles. The accessory harness portion in the vehicle accessory 50, which is not shown in FIGS. 20 through 25, is identical to the right side accessory harness 320 and the left side accessory harness 322 illustrated in FIG. 15.

Figure 20:
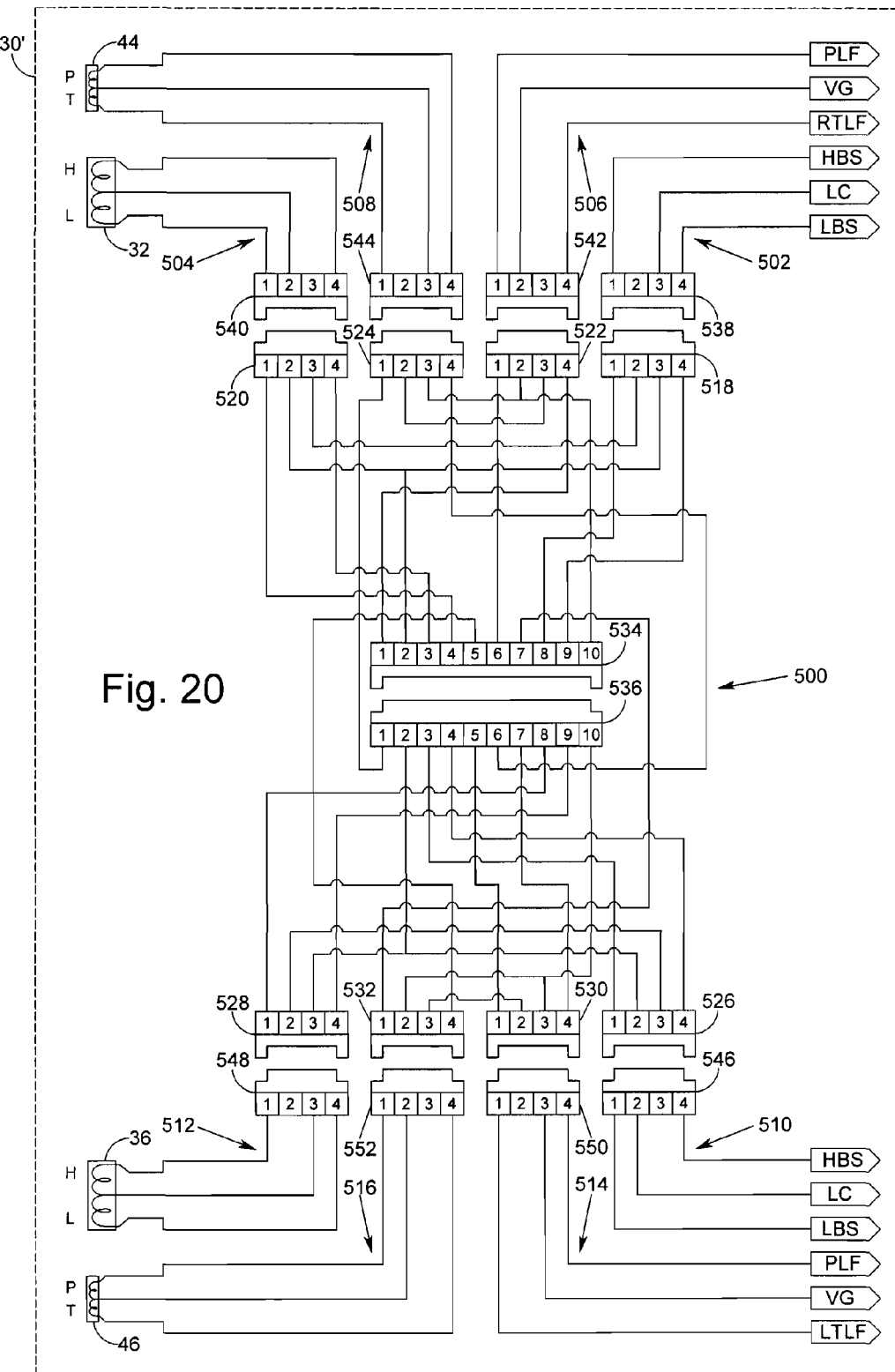
FIG. 20 is an embodiment of a reconfigurable independent lighting energy interruption system that will connect and operate the auxiliary lights located on a vehicle accessory shown in FIG. 2 to the vehicle lighting system shown in FIG. 1, with the auxiliary lights not connected to the vehicle lighting system.

Referring now to FIG. 20, the portion of the first embodiment of the reconfigurable independent lighting energy interruption system which is located in the vehicle 30' is illustrated in the first configuration (which is used when the vehicle accessory 50 is not connected to the vehicle 30'). This embodiment is suitable for use with a vehicle in which all of the electrical connections of the reconfigurable independent lighting energy interruption system are to be made by cutting and splicing wires. The portion of the reconfigurable independent lighting energy interruption system which is located in the vehicle consists of a main vehicle harness portion 500, first through fourth right side auxiliary harnesses 502, 504, 506, and 508, respectively, and first through fourth left side auxiliary harnesses 510, 512, 514, and 516, respectively. The first through fourth right side auxiliary harnesses 502, 504, 506, and 508 act as interfaces between the main vehicle harness portion 500, the electrical system of the vehicle, and the right side lights of the vehicle, and the first through fourth left side auxiliary harnesses 510, 512, 514, and 516 act as interfaces between the main vehicle harness portion 500, the electrical system of the vehicle, and the left side lights of the vehicle.

The main vehicle harness portion 500 has a right side portion which is connected to the first through fourth right side auxiliary harnesses 502, 504, 506, and 508 with first through fourth right side main harness connectors 518, 520, 522, and 524, respectively, and a left side portion which is connected to the first through fourth left side auxiliary harnesses 510, 512, 514, and 516 with first through fourth left side main harness connectors 526, 528, 530, and 532, respectively. The right side portion of the main vehicle harness portion 500 is designed to be connected to the vehicle accessory 50 (shown in FIG. 15) with a right side vehicle harness connector 534, and the left side of the main vehicle harness portion 300 is likewise designed to be connected to the vehicle accessory 50 with a left side vehicle harness connector 536.

In operation with the vehicle accessory 50, the right side vehicle harness connector 534 will be plugged into the right side accessory connector 324 (shown in FIG. 15), and the left side vehicle harness connector 536 will be plugged into the left side accessory connector 326 (also shown in FIG. 15). When the vehicle accessory 50 is not mounted on the vehicle, the right side vehicle harness connector 534 and the left side vehicle harness connector 536 will be connected together. Both the right side vehicle harness connector 534 and the left side vehicle harness connector 536 are ten-pin connectors, with the right side vehicle harness connector 534 being a female connector and the left side vehicle harness connector 536 being a male connector. The first through fourth right side main harness connectors 518, 520, 522, and 524 are four-pin male connectors. The first through fourth left side main harness connectors 526, 528, 530, and 532 are four-pin female connectors.

Pins 1 and 4 of the first right main harness connector 518 are respectively connected to Pins 8 and 9 of the right side vehicle harness connector 534. Pin 2 of the first right main harness connector 518 is connected to Pin 3 of the second right main harness connector 520. Pin 3 of the first right main harness connector 518 is connected both to Pin 2 of the right side vehicle harness connector 534 and to Pin 2 of the second right main harness connector 520. Pins 1 and 4 of the second right main harness connector 520 are respectively connected to pins 4 and 3 of the right side vehicle harness connector 534.

Pins 1 and 4 of the third right main harness connector 522 are respectively connected to Pins 6 and 1 of the right side vehicle harness connector 534. Pin 3 of the third right main harness connector 522 is connected to Pin 2 of the fourth right main harness connector 524. Pin 2 of the third right main harness connector 522 is connected both to Pin 10 of the right side vehicle harness connector 534 and to Pin 3 of the fourth right main harness connector 524. Pins 1 and 4 of the fourth right main harness connector 524 are respectively connected to Pins 1 and 6 of the left side vehicle harness connector 536.

Pins 1 and 4 of the first left main harness connector 526 are respectively connected to Pins 3 and 4 of the left side vehicle harness connector 536. Pin 3 of the first left main harness connector 526 is connected to Pin 2 of the second left main harness connector 528. Pin 2 of the first left main harness connector 526 is connected both to Pin 2 of the left side vehicle harness connector 536 and to Pin 3 of the second left main harness connector 528. Pins 1 and 4 of the second left main harness connector 528 are respectively connected to Pins 8 and 9 of the left side vehicle harness connector 536.

Pins 1 and 4 of the third left main harness connector 530 are respectively connected to Pins 5 and 7 of the left side vehicle harness connector 536. Pin of the third left main harness connector 530 is connected to Pin 3 of the fourth left main harness connector 532. Pin 3 of the third left main harness connector 530 is connected both to Pin 10 of the left side vehicle harness connector 536 and to Pin 2 of the fourth left main harness connector 532. Pins 1 and 4 of the fourth left main harness connector 532 are respectively connected to Pins 7 and 5 of the right side vehicle harness connector 534. The main vehicle harness portion 500 with this wiring schematic will be used in the first four of the embodiments of the reconfigurable independent lighting energy interruption system discussed herein with reference to FIG. 20, FIG. 21, FIG. 22, and FIGS. 23 and 24.

The first embodiment of the reconfigurable independent lighting energy interruption system shown in FIG. 20 is a hard-wired embodiment in which the wires of the first through fourth right side auxiliary harnesses 502, 504, 506, and 508 and the first through fourth left side auxiliary harnesses 510, 512, 514, and 516 are directly connected to the vehicle lighting electrical wiring.

Referring first to the right side vehicle lighting electrical wiring, it may be seen that the electrical connection between the high beam switched feed and the high beam lead to the headlight 32 is cut, the electrical connection between the light common feed and the light common lead to the headlight 32 is cut, and the electrical connection between the low beam switched feed and the low beam lead to the headlight 32 is cut. Likewise, the electrical connection between the parking light feed and the parking light lead to the parking/turn light 44 is cut, the electrical connection between the vehicle ground feed and the vehicle ground lead to the parking/turn light 44 is cut, and the electrical connection between the right turn light feed and the right turn light lead to the parking/turn light 44 is cut.

The first right auxiliary harness 502 has a first right auxiliary harness connector 538 which is a four-pin female connector which will plug into the first right main harness connector 518 of the main vehicle harness portion 500. The first right main harness connector 518 and the first right auxiliary harness connector 538 may be color coded in a first color. Pins 1, 3, and 4 of the first right auxiliary harness connector 538 are respectively connected to the high beam switched feed, the light common lead, and the low beam switched feed.

The second right auxiliary harness 504 has a second right auxiliary harness connector 540 which is a four-pin female connector which will plug into the second right main harness connector 520 of the main vehicle harness portion 500. The second right main harness connector 520 and the second right auxiliary harness connector 540 may be color coded in a second color. Pins 1, 2, and 4 of the second right auxiliary harness connector 540 are respectively connected to the low beam lead of the headlight 32, the light common lead of the headlight 32, and the high beam lead of the headlight 32.

The third right auxiliary harness 506 has a third right auxiliary harness connector 542 which is a four-pin female connector which will plug into the third right main harness connector 522 of the main vehicle harness portion 500. The third right main harness connector 522 and the third right auxiliary harness connector 542 may be color coded in a third color. Pins 1, 2, and 4 of the third right auxiliary harness connector 542 are respectively connected to the parking light feed, the vehicle ground feed, and the right turn light lead.

The fourth right auxiliary harness 508 has a fourth right auxiliary harness connector 544 which is a four-pin female connector which will plug into the fourth right main harness connector 524 of the main vehicle harness portion 500. The fourth right main harness connector 524 and the fourth right auxiliary harness connector 544 may be color coded in a fourth color. Pins 1, 3, and 4 of the fourth right auxiliary harness connector 544 are respectively connected to the right turn light lead to the parking/turn light 44, the vehicle ground lead to the parking/turn light 44, and the parking light lead to the parking/turn light 44.

Referring now to the left side vehicle lighting electrical wiring, it may be seen that the electrical connection between the high beam switched feed and the high beam lead to the headlight 36 is cut, the electrical connection between the light common feed and the light common lead to the headlight 36 is cut, and the electrical connection between the low beam switched feed and the low beam lead to the headlight 36 is cut. Likewise, the electrical connection between the parking light feed and the parking light lead to the parking/turn light 46 is cut, the electrical connection between the vehicle ground feed and the vehicle ground lead to the parking/turn light 46 is cut, and the electrical connection between the right turn light feed and the right turn light lead to the parking/turn light 46 is cut.

The first left auxiliary harness 510 has a first left auxiliary harness connector 546 which is a four-pin male connector which will plug into the first left main harness connector 526 of the main vehicle harness portion 500. The first left main harness connector 526 and the first left auxiliary harness connector 546 may be color coded in a first color. Pins 1, 2, and 4 of the first left auxiliary harness connector 546 are respectively connected to the low beam switched feed, the light common lead, and the high beam switched feed.

The second left auxiliary harness 512 has a second left auxiliary harness connector 548 which is a four-pin male connector which will plug into the second left main harness connector 528 of the main vehicle harness portion 500. The second left main harness connector 528 and the second left auxiliary harness connector 548 may be color coded in a second color. Pins 1, 3, and 4 of the second left auxiliary harness connector 548 are respectively connected to the high beam lead of the headlight 36, the light common lead of the headlight 36, and the low beam lead of the headlight 36.

The third left auxiliary harness 514 has a third left auxiliary harness connector 550 which is a four-pin male connector which will plug into the third left main harness connector 530 of the main vehicle harness portion 500. The third left main harness connector 530 and the third left auxiliary harness connector 550 may be color coded in a third color. Pins 1, 3, and 4 of the third left auxiliary harness connector 550 are respectively connected to the left turn light lead, the vehicle ground feed, and the parking light feed.

The fourth left auxiliary harness 516 has a fourth left auxiliary harness connector 552 which is a four-pin female connector which will plug into the fourth left main harness connector 532 of the main vehicle harness portion 500. The fourth left main harness connector 532 and the fourth left auxiliary harness connector 552 may be color coded in a fourth color. Pins 1, 2, and 4 of the fourth left auxiliary harness connector 552 are respectively connected to the parking light lead to the parking/turn light 44, the vehicle ground lead to the parking/turn light 44, and the left turn light lead to the parking/turn light 44.

It will be appreciated by those skilled in the art that the first embodiment of the reconfigurable independent lighting energy interruption system illustrated in FIG. 20 switches the hot leads from the high and low beams in the headlights 32 and 36 of the vehicle 30' to the high and low beams in the headlights 52 and 54 of the vehicle accessory 50. It also switches the hot leads from the parking lights and turn signals in the parking/turn lights 44 and 46 of the vehicle 30' to the parking lights and turn signals in the parking/turn lights 56 and 58 of the vehicle accessory 50. When the right side vehicle harness connector 534 and the left side vehicle harness connector 536 of are connected together as shown in FIG. 20, the headlights 32 and 36 and the parking/turn lights 44 and 46 of the vehicle 30' will be operative. If the right side vehicle harness connector 534 and the left side vehicle harness connector 536 are not connected to each other, the headlights 32 and 36 and the parking/turn light 44 and 46 of the vehicle 30' will be inoperative.

The first embodiment of the reconfigurable independent lighting energy interruption system may be put into a second configuration (which is used when the vehicle accessory 50 is connected to the vehicle 30'). When right side vehicle harness connector 534 is connected to the right side accessory connector 324 (shown in FIG. 15) and the left side vehicle harness connector 536 is connected to the left side accessory connector 326 (also shown in FIG. 15), the headlights 52 and 54 and the parking/turn lights 56 and 58 of the vehicle accessory 50 will be operative, and the headlights 32 and 36 of the vehicle 30' and the parking/turn light 44 and 46 will not be operative.

Figure 21:
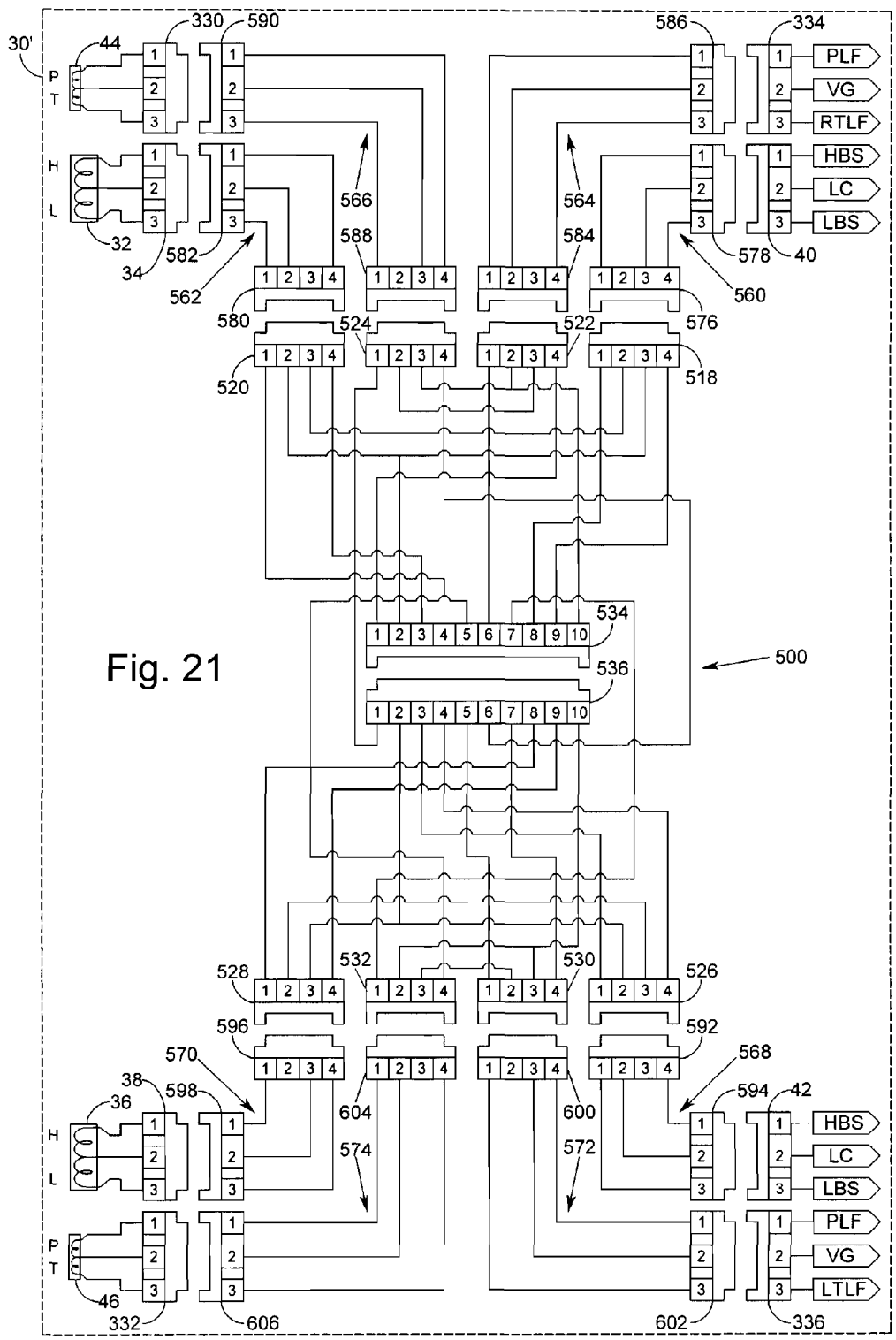
FIG. 21 is another embodiment of a reconfigurable independent lighting energy interruption system that will connect and operate the auxiliary lights located on a vehicle accessory shown in FIG. 2 to a vehicle lighting system having modular connectors used with combined high beam/low beam headlights, with the auxiliary lights not connected to the vehicle lighting system.

Referring next to FIG. 21, a second embodiment of the reconfigurable independent lighting energy interruption system is illustrated which will be used with a vehicle 30' which has connectors used to make the lighting connections in the vehicle the vehicle 30'. The vehicle 30' is shown as having the headlight plug 40 which would be connected to the connector element 34 of the headlight 32 and the headlight plug 42 which would be connected to the connector element 38 of the headlight 36. In addition, the vehicle 30' has the parking/turn plug 334 which would be connected to the connector element 330 of the parking/turn light 44 and the parking/turn plug 336 which would be connected to the connector element 332 of the parking/turn light 46.

The embodiment of the reconfigurable independent lighting energy interruption system shown in FIG. 21 again uses the main vehicle harness portion 500, but instead of having eight auxiliary harnesses which are wired into the vehicle electrical system by cutting and splicing wires, eight auxiliary harnesses having connectors at both ends thereof are used. This embodiment consists of the main vehicle harness portion 500, first through fourth right side auxiliary harnesses 560, 562, 564, and 566, respectively, and first through fourth left side auxiliary harnesses 568, 570, 572, and 574, respectively. The first through fourth right side auxiliary harnesses 560, 562, 564, and 566 act as interfaces between the main vehicle harness portion 500, the electrical system of the vehicle, and the right side lights of the vehicle, and the first through fourth left side auxiliary harnesses 568, 570, 572, and 574 act as interfaces between the main vehicle harness portion 500, the electrical system of the vehicle, and the left side lights of the vehicle.

The construction and operation of the main vehicle harness portion 500 with the vehicle accessory 50 is the same as described in conjunction with the embodiment of FIG. 20. The first through fourth right side main harness connectors 518, 520, 522, and 524 are the same four-pin male connectors. The first through fourth left side main harness connectors 526, 528, 530, and 532 are the same four-pin female connectors.

The first right auxiliary harness 560 has a first right auxiliary harness connector 576 which is a four-pin female connector which will plug into the first right main harness connector 518 of the main vehicle harness portion 500. The first right main harness connector 518 and the first right auxiliary harness connector 576 may be color coded in a first color. The first right auxiliary harness 560 also has a headlight power connector 578 at the end opposite the first right auxiliary harness connector 576. Pins 1, 3, and 4 of the first right auxiliary harness connector 576 are respectively connected to Pins 1, 2, and 3 of the headlight power connector 578. The headlight power connector 578 is then plugged into the headlight plug 40.

The second right auxiliary harness 562 has a second right auxiliary harness connector 580 which is a four-pin female connector which will plug into the second right main harness connector 520 of the main vehicle harness portion 500. The second right main harness connector 520 and the second right auxiliary harness connector 580 may be color coded in a second color. The second right auxiliary harness 562 also has a headlight connector 582 at the end opposite the second right auxiliary harness connector 580. Pins 1, 2, and 4 of the second right auxiliary harness connector 580 are respectively connected to Pins 3, 2, and 1 of the headlight connector 582. The headlight connector 582 is then plugged into the connector element 34 of the headlight 32.

The third right auxiliary harness 564 has a third right auxiliary harness connector 584 which is a four-pin female connector which will plug into the third right main harness connector 522 of the main vehicle harness portion 500. The third right main harness connector 522 and the third right auxiliary harness connector 584 may be color coded in a third color. The third right auxiliary harness 564 also has a parking/turn light power connector 586 at the end opposite the third right auxiliary harness connector 584. Pins 1, 2, and 4 of the third right auxiliary harness connector 584 are respectively connected to Pins 1, 2, and 3 of the parking/turn light power connector 586. The parking/turn light power connector 586 is then plugged into the parking/turn plug 334.

The fourth right auxiliary harness 566 has a fourth right auxiliary harness connector 588 which is a four-pin female connector which will plug into the fourth right main harness connector 524 of the main vehicle harness portion 500. The fourth right main harness connector 524 and the fourth right auxiliary harness connector 588 may be color coded in a fourth color. The fourth right auxiliary harness 566 also has a parking/turn light connector 590 at the end opposite the fourth right auxiliary harness connector 588. Pins 1, 3, and 4 of the fourth right auxiliary harness connector 588 are respectively connected to Pins 3, 2, and 1 of the parking/turn light connector 590. The parking/turn light connector 590 is then plugged into the connector element 330 of the parking/turn light 44.

The first left auxiliary harness 568 has a first left auxiliary harness connector 592 which is a four-pin female connector which will plug into the first left main harness connector 526 of the main vehicle harness portion 500. The first left main harness connector 526 and the first left auxiliary harness connector 592 may be color coded in a first color. The first left auxiliary harness 568 also has a headlight power connector 594 at the end opposite the first left auxiliary harness connector 592. Pins 1, 2, and 4 of the first left auxiliary harness connector 592 are respectively connected to Pins 3, 2, and 1 of the headlight power connector 594. The headlight power connector 594 is then plugged into the headlight plug 42.

The second left auxiliary harness 570 has a second left auxiliary harness connector 596 which is a four-pin female connector which will plug into the second left main harness connector 528 of the main vehicle harness portion 500. The second left main harness connector 528 and the second left auxiliary harness connector 596 may be color coded in a second color. The second left auxiliary harness 570 also has a headlight connector 598 at the end opposite the second left auxiliary harness connector 596. Pins 1, 3, and 4 of the second left auxiliary harness connector 596 are respectively connected to Pins 1, 2, and 3 of the headlight connector 598. The headlight connector 598 is then plugged into the connector element 38 of the headlight 36.

The third left auxiliary harness 572 has a third left auxiliary harness connector 600 which is a four-pin female connector which will plug into the third left main harness connector 530 of the main vehicle harness portion 500. The third left main harness connector 530 and the third left auxiliary harness connector 600 may be color coded in a third color. The third left auxiliary harness 572 also has a parking/turn light power connector 602 at the end opposite the third left auxiliary harness connector 600. Pins 1, 3, and 4 the third left auxiliary harness connector 600 are respectively connected to Pins 3, 2, and 1 of the parking/turn light power connector 602. The parking/turn light power connector 602 is then plugged into the parking/turn plug 336.

The fourth left auxiliary harness 574 has a fourth left auxiliary harness connector 604 which is a four-pin female connector which will plug into the fourth left main harness connector 532 of the main vehicle harness portion 500. The fourth left main harness connector 532 and the fourth left auxiliary harness connector 604 may be color coded in a fourth color. The fourth left auxiliary harness 574 also has a parking/turn light connector 606 at the end opposite the fourth left auxiliary harness connector 604. Pins 1, 2, and 4 of the fourth left auxiliary harness connector 604 are respectively connected to Pins 1, 2, and 3 of the parking/turn light connector 606. The parking/turn light connector 606 is then plugged into the connector element 332 of the parking/turn light 46.

It will be appreciated by those skilled in the art that the second embodiment of the reconfigurable independent lighting energy interruption system illustrated in FIG. 21 includes the first through fourth right side auxiliary harnesses 560, 562, 564, and 566 and the first through fourth left side auxiliary harnesses 568, 570, 572, and 574 which may be installed by simply plugging the connectors of the first through fourth right side auxiliary harnesses 560, 562, 564, and 566 and the first through fourth left side auxiliary harnesses 568, 570, 572, and 574 into the existing connectors of the electrical wiring of the illumination system of the vehicle 30'. Like the first embodiment, the second embodiment operates by switching the hot leads from the high and low beams in the headlights 32 and 36 of the vehicle 30' to the high and low beams in the headlights 52 and 54 of the vehicle accessory 50 (shown in FIG. 15), and switching the hot leads from the parking lights and turn signals in the parking/turn lights 44 and 46 of the vehicle 30' to the parking lights and turn signals in the parking/turn lights 56 and 58 of the vehicle accessory 50.

The second embodiment of the reconfigurable independent lighting energy interruption system may be put into a second configuration (which is used when the vehicle accessory 50 is connected to the vehicle 30'). When right side vehicle harness connector 534 is connected to the right side accessory connector 324 (shown in FIG. 15) and the left side vehicle harness connector 536 is connected to the left side accessory connector 326 (also shown in FIG. 15), the headlights 52 and 54 and the parking/turn lights 56 and 58 of the vehicle accessory 50 will be operative, and the headlights 32 and 36 of the vehicle 30' and the parking/turn light 44 and 46 will not be operative.

Referring now to FIG. 22, a third embodiment of the reconfigurable independent lighting energy interruption system is illustrated which will be used with a vehicle 30' which has a different type of connector used to make the lighting connections for the headlights in the vehicle 30'. The vehicle 30' is shown as having the parking/turn plug 334 which would be connected to the connector element 330 of the parking/turn light 44 and the parking/turn plug 336 which would be connected to the connector element 332 of the parking/turn light 46.

In this particular vehicle 30', the high and low beams are two discrete lights rather than both being included in a single unit. The vehicle 30' is shown as having the high beam headlight plug 394 which would be connected to the connector element 380 of the high beam headlight 378 and the low beam headlight plug 396 which would be connected to the connector element 384 of the low beam headlight 382 on the right side of the vehicle 30', and the high beam headlight plug 398 which would be connected to the connector element 388 of the high beam headlight 386 and the low beam headlight plug 400 which would be connected to the connector element 392 of the low beam headlight 390 on the left side of the vehicle 30'.

The embodiment of the reconfigurable independent lighting energy interruption system shown in FIG. 22 consists of the main vehicle harness portion 500, the third and fourth right side auxiliary harnesses 564 and 566 and the third and fourth left auxiliary harnesses 572 and 574 used in the embodiment of FIG. 21, and first and second right side auxiliary harnesses 610 and 612, respectively, and first and second left side auxiliary harnesses 614 and 616, respectively. The first through fourth right side auxiliary harnesses 610, 612, 564, and 566 act as interfaces between the main vehicle harness portion 500, the electrical system of the vehicle, and the right side lights of the vehicle, and the first through fourth left side auxiliary harnesses 614, 616, 572, and 574 act as interfaces between the main vehicle harness portion 500, the electrical system of the vehicle, and the left side lights of the vehicle.

The construction and operation of the main vehicle harness portion 500 with the vehicle accessory 50 is the same as described in conjunction with the embodiments of FIGS. 20 and 21. The first through fourth right side main harness connectors 518, 520, 522, and 524 are the same four-pin male connectors. The first through fourth left side main harness connectors 526, 528, 530, and 532 are the same four-pin female connectors.

The first right auxiliary harness 610 has a first right auxiliary harness connector 618 which is a four-pin female connector which will plug into the first right main harness connector 518 of the main vehicle harness portion 500. The first right main harness connector 518 and the first right auxiliary harness connector 618 may be color coded in a first color. The first right auxiliary harness 610 also has a high beam headlight power connector 620 and a low beam headlight power connector 622 at ends opposite the first right auxiliary harness connector 618. Pins 1 and 2 of the first right auxiliary harness connector 618 are respectively connected to Pins H and C of the high beam headlight power connector 620, and Pins 3 and 4 of the first right auxiliary harness connector 618 are respectively connected to Pins C and L of the low beam headlight power connector 622. The high beam headlight power connector 620 is then plugged into the high beam headlight plug 394, and the low beam headlight power connector 622 is then plugged into the low beam headlight plug 396.

The second right auxiliary harness 612 has a second right auxiliary harness connector 624 which is a four-pin female connector which will plug into the second right main harness connector 520 of the main vehicle harness portion 500. The second right main harness connector 520 and the second right auxiliary harness connector 624 may be color coded in a second color. The second right auxiliary harness 612 also has a high beam headlight connector 626 and a low beam headlight connector 628 at ends opposite the second right auxiliary harness connector 624. Pins 1 and 2 of the second right auxiliary harness connector 624 are respectively connected to Pins L and C of the low beam headlight connector 628, and Pins 3 and 4 of the second right auxiliary harness connector 624 are respectively connected to Pins C and H of the high beam headlight connector 626. The high beam headlight connector 626 is then plugged into the connector 380 of the high beam headlight 378, and the low beam headlight connector 628 is then plugged into the connector 384 of the low beam headlight 382.

The first left auxiliary harness 614 has a first left auxiliary harness connector 630 which is a four-pin female connector which will plug into the first left main harness connector 526 of the main vehicle harness portion 500. The first left main harness connector 526 and the first left auxiliary harness connector 630 may be color coded in a first color. The first left auxiliary harness 614 also has a high beam headlight power connector 632 and a low beam headlight power connector 634 at ends opposite the first left auxiliary harness connector 630. Pins 1 and 2 of the first left auxiliary harness connector 630 are respectively connected to Pins L and C of the low beam headlight power connector 634, and Pins 3 and 4 of the first left auxiliary harness connector 630 are respectively connected to Pins C and H of the high beam headlight power connector 632. The high beam headlight power connector 632 is then plugged into the high beam headlight plug 398, and the low beam headlight power connector 634 is then plugged into the low beam headlight plug 400.

The second left auxiliary harness 616 has a second left auxiliary harness connector 636 which is a four-pin female connector which will plug into the second left main harness connector 528 of the main vehicle harness portion 500. The second left main harness connector 528 and the second left auxiliary harness connector 636 may be color coded in a second color. The second left auxiliary harness 616 also has a high beam headlight connector 638 and a low beam headlight connector 640 at ends opposite the second left auxiliary harness connector 636. Pins 1 and 2 of the second left auxiliary harness connector 636 are respectively connected to Pins H and C of the high beam headlight connector 638, and Pins 3 and 4 of the second left auxiliary harness connector 636 are respectively connected to Pins C and L of the low beam headlight connector 640. The high beam headlight connector 638 is then plugged into the connector 388 of the high beam headlight 386, and the low beam headlight connector 640 is then plugged into the connector 392 of the low beam headlight 390.

The third and fourth right auxiliary harnesses 564 and 566 and the third and fourth left auxiliary harnesses 572 and 574 have the same construction and installation as described in conjunction with the embodiment of FIG. 21.

It will be appreciated by those skilled in the art that the third embodiment of the reconfigurable independent lighting energy interruption system illustrated in FIG. 22 includes the first through fourth right side auxiliary harnesses 610, 612, 564, and 566 and the first through fourth left side auxiliary harnesses 614, 616, 572, and 574 which may be installed by simply plugging the connectors of the first through fourth right side auxiliary harnesses 610, 612, 564, and 566 and the first through fourth left side auxiliary harnesses 614, 616, 572, and 574 into the existing connectors of the electrical wiring of the illumination system of the vehicle 30'. Like the first and second embodiments, the third embodiment operates by switching the hot leads from the high and low beams in the headlights 378, 382, 386, and 390 of the vehicle 30' to the high and low beams in the headlights 52 and 54 of the vehicle accessory 50 (shown in FIG. 15), and switching the hot leads from the parking lights and turn signals in the parking/turn lights 44 and 46 of the vehicle 30' to the parking lights and turn signals in the parking/turn lights 56 and 58 of the vehicle accessory 50.

The third embodiment of the reconfigurable independent lighting energy interruption system may be put into a second configuration (which is used when the vehicle accessory 50 is connected to the vehicle 30'). When right side vehicle harness connector 534 is connected to the right side accessory connector 324 (shown in FIG. 15) and the left side vehicle harness connector 536 is connected to the left side accessory connector 326 (also shown in FIG. 15), the headlights 52 and 54 and the parking/turn lights 56 and 58 of the vehicle accessory 50 will be operative, and the headlights 378, 382, 386, and 390 of the vehicle 30' and the parking/turn lights 44 and 46 will not be operative.

Referring now to FIG. 23, a fourth embodiment of the reconfigurable independent lighting energy interruption system is illustrated which will be used with a vehicle 30' which has a different type of connector used to make the lighting connections for the headlights in the vehicle 30'. The vehicle 30' being shown as having the high beam headlight plug 394 which would be connected to the connector element 380 of the high beam headlight 378 and the low beam headlight plug 396 which would be connected to the connector element 384 of the low beam headlight 382 on the right side of the vehicle 30', and the high beam headlight plug 398 which would be connected to the connector element 388 of the high beam headlight 386 and the low beam headlight plug 400 which would be connected to the connector element 392 of the low beam headlight 390 on the left side of the vehicle 30'.

In this particular vehicle 30', the parking and turn lights are two discrete lights rather than both being included in a single unit. The vehicle 30' is shown as having the parking light plug 444 which would be connected to the connector 430 of the parking light 428 and the right turn light plug 446 which would be connected to the connector 434 of the right turn light 432 on the right side of the vehicle 30', and the parking light plug 448 which would be connected to the connector 438 of the parking light 436 and the left turn light plug 450 which would be connected to the connector 442 of the left turn light 440 on the left side of the vehicle 30'.

The embodiment of the reconfigurable independent lighting energy interruption system shown in FIG. 23 consists of the main vehicle harness portion 500, the first and second right side auxiliary harnesses 610 and 612 and the first and second left auxiliary harnesses 614 and 616 used in the embodiment of FIG. 22, and third and fourth right side auxiliary harnesses 650 and 652, respectively, and third and fourth left side auxiliary harnesses 654 and 656, respectively. The first through fourth right side auxiliary harnesses 610, 612, 650, and 652 act as interfaces between the main vehicle harness portion 500, the electrical system of the vehicle, and the right side lights of the vehicle, and the first through fourth left side auxiliary harnesses 614, 616, 654, and 656 act as interfaces between the main vehicle harness portion 500, the electrical system of the vehicle, and the left side lights of the vehicle.

The construction and operation of the main vehicle harness portion 500 with the vehicle accessory 50 is the same as described in conjunction with the embodiments of FIGS. 20 through 22. The first through fourth right side main harness connectors 518, 520, 522, and 524 are the same four-pin male connectors. The first through fourth left side main harness connectors 526, 528, 530, and 532 are the same four-pin female connectors.

The third right auxiliary harness 650 has a third right auxiliary harness connector 658 which is a four-pin female connector which will plug into the third right main harness connector 522 of the main vehicle harness portion 500. The third right main harness connector 522 and the third right auxiliary harness connector 658 may be color coded in a third color. The third right auxiliary harness 650 also has a parking light power connector 660 and a right turn light power connector 662 at ends opposite the third right auxiliary harness connector 658. Pins 1 and 2 of the third right auxiliary harness connector 658 are respectively connected to Pins P and G of the parking light power connector 660, and Pins 3 and 4 of the third right auxiliary harness connector 658 are respectively connected to Pins G and T of the right turn light power connector 662. The parking light power connector 660 is then plugged into the parking light plug 444, and the right turn light power connector 662 is then plugged into the right turn light plug 446.

The fourth right auxiliary harness 652 has a fourth right auxiliary harness connector 664 which is a four-pin female connector which will plug into the fourth right main harness connector 524 of the main vehicle harness portion 500. The fourth right main harness connector 524 and the fourth right auxiliary harness connector 664 may be color coded in a fourth color. The fourth right auxiliary harness 652 also has a parking light connector 666 and a right turn light connector 668 at ends opposite the fourth right auxiliary harness connector 664. Pins 1 and 2 of the fourth right auxiliary harness connector 664 are respectively connected to Pins T and G of the right turn light connector 668, and Pins 3 and 4 of the fourth right auxiliary harness connector 664 are respectively connected to Pins G and P of the parking light connector 666. The parking light connector 666 is then plugged into the connector 430 of the parking light 428, and the right turn light connector 668 is then plugged into the connector 434 of the right turn light 432.

The third left auxiliary harness 654 has a third left auxiliary harness connector 670 which is a four-pin female connector which will plug into the third left main harness connector 530 of the main vehicle harness portion 500. The third left main harness connector 530 and the third left auxiliary harness connector 670 may be color coded in a third color. The third left auxiliary harness 654 also has a parking light power connector 672 and a left turn light power connector 674 at ends opposite the third left auxiliary harness connector 670. Pins 1 and 2 of the third left auxiliary harness connector 670 are respectively connected to Pins T and G of the left turn light power connector 674, and Pins 3 and 4 of the third left auxiliary harness connector 670 are respectively connected to Pins G and P of the parking light power connector 672. The parking light power connector 672 is then plugged into the parking light plug 448, and the left turn light power connector 674 is then plugged into the left turn light plug 450.

The fourth left auxiliary harness 656 has a fourth left auxiliary harness connector 676 which is a four-pin female connector which will plug into the fourth left main harness connector 532 of the main vehicle harness portion 500. The fourth left main harness connector 532 and the fourth left auxiliary harness connector 676 may be color coded in a fourth color. The fourth left auxiliary harness 656 also has a parking light connector 678 and a left turn light connector 680 at ends opposite the fourth left auxiliary harness connector 676. Pins 1 and 2 of the fourth left auxiliary harness connector 676 are respectively connected to Pins P and G of the parking light connector 678, and Pins 3 and 4 of the fourth left auxiliary harness connector 676 are respectively connected to Pins G and T of the left turn light connector 680. The parking light connector 678 is then plugged into the connector 438 of the parking light 436, and the left turn light connector 680 is then plugged into the connector 442 of the left turn light 440.

The first and second right auxiliary harnesses 610 and 612 and the first and second left auxiliary harnesses 614 and 616 have the same construction and installation as described in conjunction with the embodiment of FIG. 22.

It will be appreciated by those skilled in the art that the fourth embodiment of the reconfigurable independent lighting energy interruption system illustrated in FIG. 23 includes the first through fourth right side auxiliary harnesses 610, 612, 650, and 652 and the first through fourth left side auxiliary harnesses 614, 616, 654, and 656 which may be installed by simply plugging the connectors of the first through fourth right side auxiliary harnesses 610, 612, 650, and 652 and the first through fourth left side auxiliary harnesses 614, 616, 654, and 656 into the existing connectors of the electrical wiring of the illumination system of the vehicle 30'. Like the first three embodiments, the fourth embodiment operates by switching the hot leads from the high and low beams in the headlights 378, 382, 386, and 390 of the vehicle 30' to the high and low beams in the headlights 52 and 54 of the vehicle accessory 50 (shown in FIG. 15), and switching the hot leads from the parking lights and turn signals in the parking lights 428 and 436 and the turn lights 432 and 440 of the vehicle 30' to the parking lights and turn signals in the parking/turn lights 56 and 58 of the vehicle accessory 50.

The fourth embodiment of the reconfigurable independent lighting energy interruption system may be put into a second configuration (which is used when the vehicle accessory 50 is connected to the vehicle 30'). When right side vehicle harness connector 534 is connected to the right side accessory connector 324 (shown in FIG. 15) and the left side vehicle harness connector 536 is connected to the left side accessory connector 326 (also shown in FIG. 15), the headlights 52 and 54 and the parking/turn lights 56 and 58 of the vehicle accessory 50 will be operative, and the headlights 378, 382, 386, and 390 of the vehicle 30' and the parking lights 428 and 436 and the turn lights 432 and 440 will not be operative.

Referring now to FIG. 24, the fourth embodiment of the reconfigurable independent lighting energy interruption system, which was illustrated in FIG. 23, is illustrated in simplified form as it would likely appear, with the same reference numerals used in FIG. 23 being used in FIG. 24. The right side vehicle harness connector 534 is shown in position for connection to the right side accessory connector 324 to operate the headlight 52 and the parking/turn light 56 on the vehicle accessory 50 (the vehicle accessory 50 is not shown in FIG. 24), and the left side vehicle harness connector 536 is shown in position for connection to the left side accessory connector 326 to operate the headlight 54 and the parking/turn light 58 on the vehicle accessory 50.

In this position, the high beam headlight 378, the low beam headlight 382, the high beam headlight 386, the low beam headlight 390, the parking light 428, the right turn light 432, the parking light 436, and the left turn light 440 of the vehicle 30'(the vehicle 30' is not shown in FIG. 24) will be inoperative. The right side vehicle harness connector 534 and the left side vehicle harness connector 536 are shown in position for connection together in phantom lines to render the high beam headlight 378, the low beam headlight 382, the high beam headlight 386, the low beam headlight 390, the parking light 428, the right turn light 432, the parking light 436, and the left turn light 440 operative when the vehicle accessory 50 has been removed from the vehicle 30'.

Referring next to FIG. 25, an alternate embodiment of the reconfigurable independent lighting energy interruption system is illustrated which will be used with a vehicle 30' which has direct interface light wiring harnesses used in its lighting system. Some late model pickup trucks (such as late model Chevrolet Colorado trucks, GMS canyon trucks, and Nissan Titan trucks) use right and left direct interface light wiring harnesses 690 and 692, respectively, each being a single wiring harness that is used for one side of the front lighting system of the truck.

The right direct interface light wiring harness 690 would be connected to a right light plug 694 supplying electrical power to the right front lighting system of the truck. The right direct interface light wiring harness 690 has a right light power connector 696 which would be connected to the right light plug 694 at one end thereof. The right light plug 694 is a six-pin female connector and the right light power connector 696 is a six-pin male connector. The right direct interface light wiring harness 690 also has a high beam headlight connector 698, a low beam headlight connector 700, and a parking/turn light connector 702 at ends of the right direct interface light wiring harness 690 opposite the right light power connector 696. Pins P, G, and T of the right light power connector 696 are respectively connected to Pins P, G, and T of the parking/turn light connector 702. Pins H and C of the right light power connector 696 are respectively connected to Pins H and C of the high beam headlight connector 698, and Pins C and L of the right light power connector 696 are respectively connected to Pins C and L of the low beam headlight connector 700.

The left direct interface light wiring harness 692 would be connected to a left light plug 704 supplying electrical power to the left front lighting system of the truck. The left direct interface light wiring harness 692 has a left light power connector 706 which would be connected to the left light plug 704 at one end thereof. The left light plug 704 is a six-pin female connector and the left light power connector 706 is a six-pin male connector. The left direct interface light wiring harness 692 also has a high beam headlight connector 708, a low beam headlight connector 710, and a parking/turn light connector 712 at ends of the left direct interface light wiring harness 692 opposite the left light power connector 706. Pins H and C of the left light power connector 706 are respectively connected to Pins H and C of the high beam headlight connector 708, and Pins C and L of the left light power connector 706 are respectively connected to Pins C and L of the low beam headlight connector 710. Pins P, G, and T of the left light power connector 706 are respectively connected to Pins P, G, and T of the parking/turn light connector 712.

The embodiment of the reconfigurable independent lighting energy interruption system shown in FIG. 25 consists of the main vehicle harness portion 300 (which was used in the embodiments of FIGS. 14 through 19), a right auxiliary harness 714, and a left auxiliary harness 716. The right auxiliary harness 714 acts as an interface between the main vehicle harness portion 300, the electrical system of the vehicle, and the right side lights of the vehicle, and the left auxiliary harness 716 acts as an interface between the main vehicle harness portion 300, the electrical system of the vehicle, and the left side lights of the vehicle.

The construction and operation of the main vehicle harness portion 300 with the vehicle accessory 50 is the same as described in conjunction with the embodiment of FIGS. 14 through 19. The right side main harness connector 306 is the same ten-pin male connector. The left side main harness connector 308 is the same ten-pin female connector.

The right auxiliary harness connector 718 has a right light connector 722 which is a ten-pin female connector which will plug into the right side main harness connector 306 of the main vehicle harness portion 300. The right auxiliary harness 714 also has a right light power connector 720 and a right light connector 722 at ends opposite the right auxiliary harness connector 718. The right light power connector 720 is a six-pin male connector and the right light connector 722 is a six-pin female connector.

Pins 3, 4, 5, and 7 of the right auxiliary harness connector 718 are respectively connected to Pins H, L, T, and P of the right light power connector 720, and Pins 1, 6, 8, and 9 of the right auxiliary harness connector 718 are respectively connected to Pins T, P, H, and L of the right light connector 722. Pin 2 of the right auxiliary harness connector 718 is connected both to Pin C of the right light power connector 720 and Pin C of the right light connector 722, and Pin 10 of the right auxiliary harness connector 718 is connected both to Pin G of the right light power connector 720 and Pin G of the right light connector 722. The right light power connector 720 is then plugged into the right light plug 694, and the right light connector 722 is then plugged into the right light power connector 696.

The left auxiliary harness 716 has a left auxiliary harness connector 724 which is a ten-pin female connector which will plug into 308 of the main vehicle harness portion 300. The left auxiliary harness 716 also has a the light power connector 726 and a left light connector 728 at ends opposite the left auxiliary harness connector 724. The left light power connector 726 is a six-pin male connector and the left light connector 728 is a six-pin female connector.

Pins 5, 6, 8, and 9 of the left auxiliary harness connector 724 are respectively connected to Pins T, P, H, and L of the left light power connector 726, and Pins 1, 3, 4, and 7 of the left auxiliary harness connector 724 are respectively connected to Pins T, H, L, and P of the left light connector 728. Pin 2 of the left auxiliary harness connector 724 is connected both to Pin C of the left light power connector 726 and Pin C of the left light connector 728, and Pin 10 of the left auxiliary harness connector 724 is connected both to Pin G of the left light power connector 726 and Pin G of the left light connector 728. The left light power connector 726 is then plugged into the left light plug 704, and the left light connector 728 is then plugged into the left light power connector 706.

It will be appreciated by those skilled in the art that the alternate embodiment of the reconfigurable independent lighting energy interruption system illustrated in FIG. 25 includes the right auxiliary harness 714 and the left auxiliary harness 716 which may be installed by simply plugging the connectors of the right auxiliary harness 714 and the left auxiliary harness 716 into the existing connectors of the electrical wiring of the illumination system of the vehicle 30'. Like the first four embodiments of FIGS. 20 through 24, the alternate embodiment operates by switching the hot leads from the high and low beams in the headlights 378, 382, 386, and 390 of the vehicle 30' to the high and low beams in the headlights 52 and 54 of the vehicle accessory 50 (shown in FIG. 15), and switching the hot leads from the parking lights and turn signals in the parking/turn lights 44 and 46 of the vehicle 30' to the parking lights and turn signals in the parking/turn lights 56 and 58 of the vehicle accessory 50

The alternate embodiment of the reconfigurable independent lighting energy interruption system may be put into a second configuration (which is used when the vehicle accessory 50 is connected to the vehicle 30'). When the right side vehicle harness connector 310 is connected to the right side accessory connector 324 (shown in FIG. 15) and the left side vehicle harness connector 312 is connected to the left side accessory connector 326 (also shown in FIG. 15), the headlights 52 and 54 and the parking/turn lights 56 and 58 of the vehicle accessory 50 will be operative, and the headlights 378, 382, 386, and 390 of the vehicle 30' and the parking/turn lights 44 and 46 will not be operative.

Referring now to FIG. 26, the alternate embodiment of the reconfigurable independent lighting energy interruption system, which was illustrated in FIG. 25, is illustrated in simplified form as it would likely appear, with the same reference numerals used in FIG. 25 being used in FIG. 26. The right side vehicle harness connector 310 is shown in position for connection to the right side accessory connector 324 to operate the headlight 52 and the parking/turn light 56 on the vehicle accessory 50 (the vehicle accessory 50 is not shown in FIG. 26), and the left side vehicle harness connector 312 is shown in position for connection to the left side accessory connector 326 to operate the headlight 54 and the parking/turn light 58 on the vehicle accessory 50.

In this position, the high beam headlight 378, the low beam headlight 382, the high beam headlight 386, the low beam headlight 390, the parking/turn light 44, and the parking/turn light 46 of the vehicle 30' (the vehicle 30' is not shown in FIG. 24) will be inoperative. The right side vehicle harness connector 310 and the left side vehicle harness connector 312 are shown in position for connection together in phantom lines to render the high beam headlight 378, the low beam headlight 382, the high beam headlight 386, the low beam headlight 390, the parking/turn light 44, and the parking/turn light 46 operative when the vehicle accessory 50 has been removed from the vehicle 30'.

Figure 27:
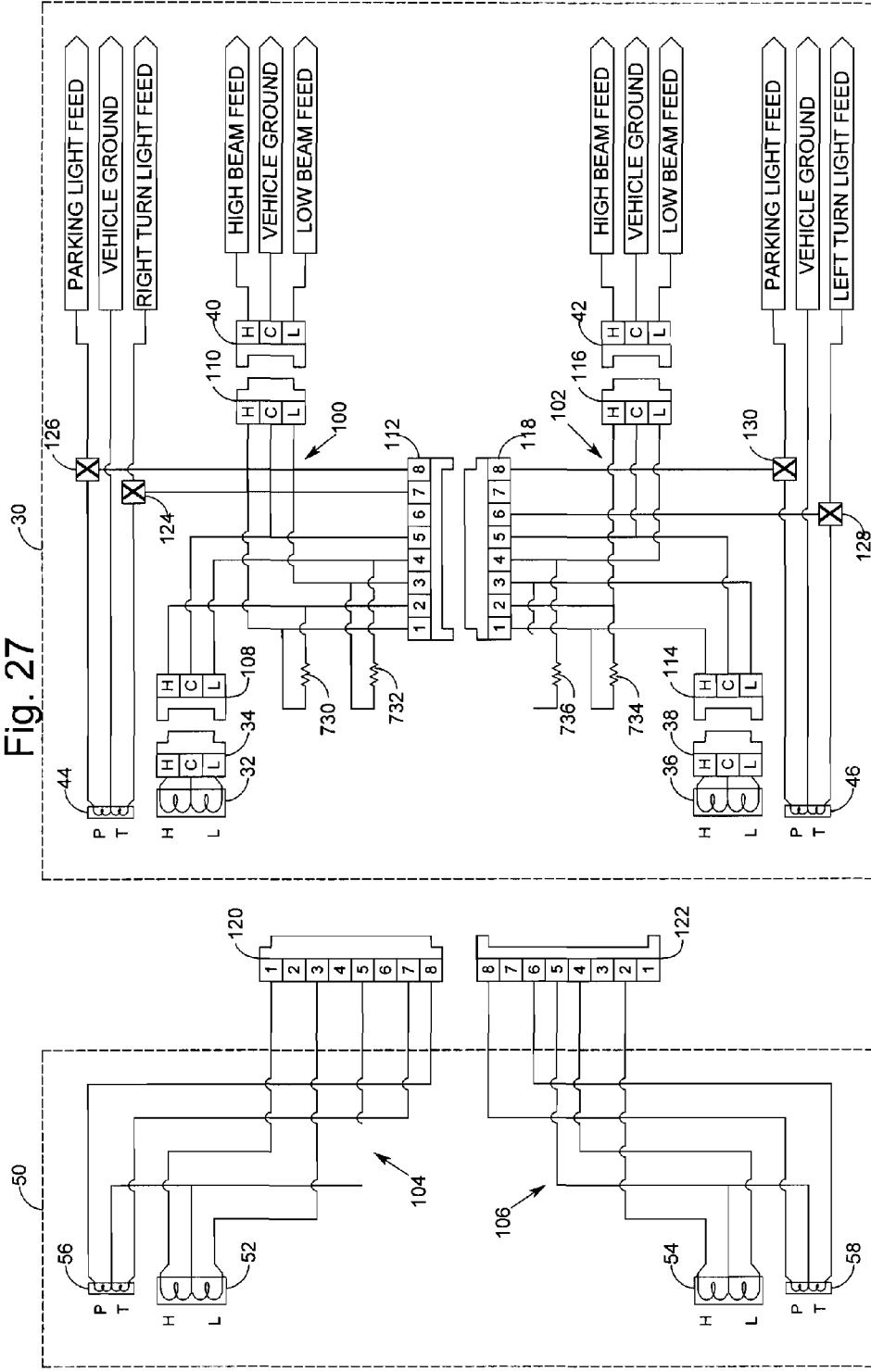
FIG. 27 is a schematic depiction of the independent lighting system shown in FIG. 5, with resistors added to prevent a computer malfunction from occurring.

Referring next to FIG. 27, the schematic depiction of the independent lighting system shown in FIG. 5 has been modified to prevent the occurrence of a vehicle malfunction in the event that the right side first harness portion 100 and the left side first harness portion 102 are disconnected with the vehicle lights on. A right high beam resistor 730 is connected between the high beam feed of the headlight power connector 110 and the high beam lead of the headlight connector 108. A right low beam resistor 732 is connected between the low beam feed of the headlight power connector 110 and the low beam lead of the headlight connector 108.

The resistors 730 and 732 are typically each between approximately 500 Ohms and approximately 2,000 Ohms, and may preferably each be approximately 1,000 Ohms. The resistors 730 and 732 operate to permanently keep the high and low beams of the headlight 32 in the lighting circuit, although the resistors 730 and 732 are too high to allow the high and low beams of the headlight 32 to be fully illuminated when the right side first harness portion 100 and the left side first harness portion 102 are disconnected from each other.

Figure 28:
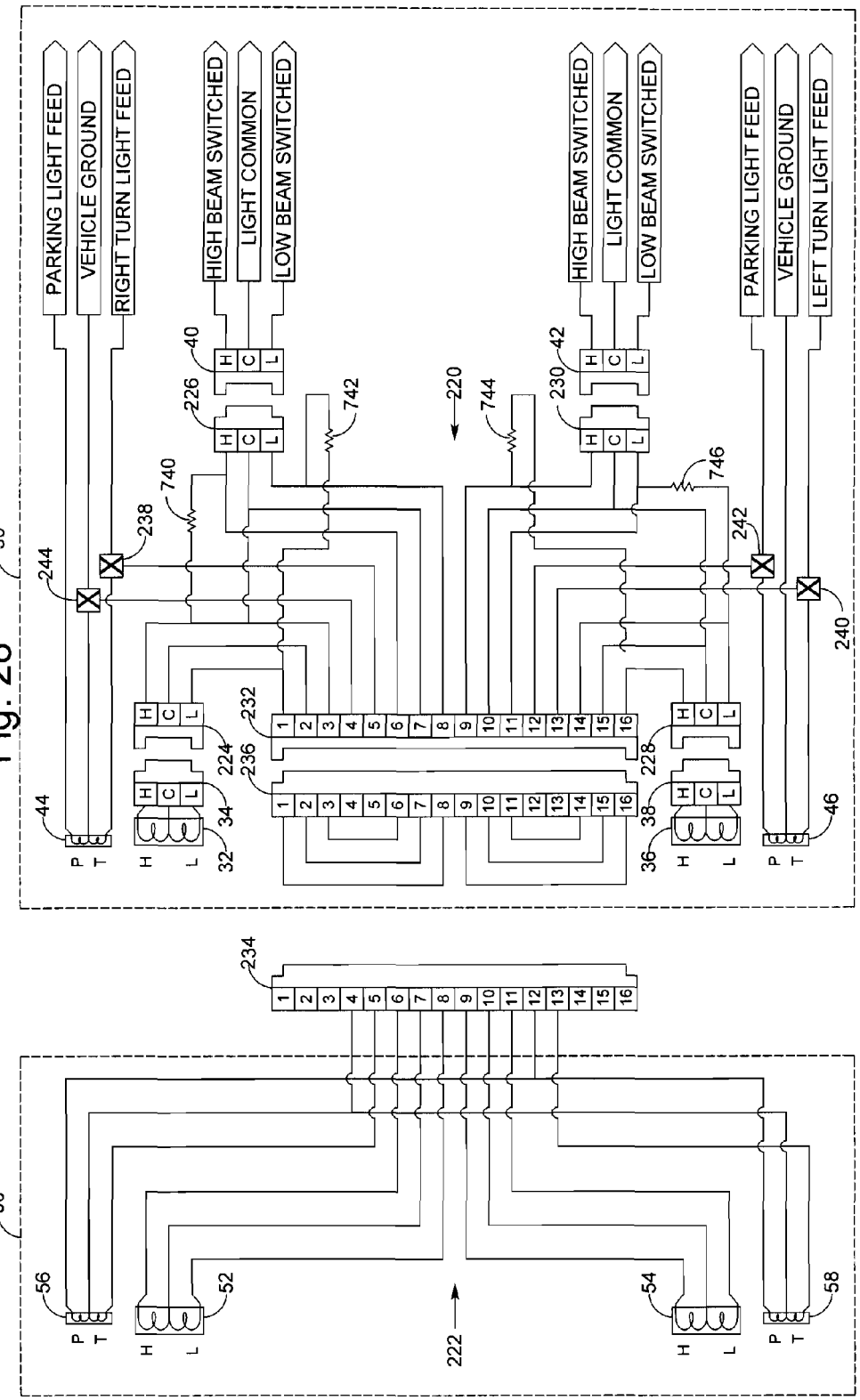
FIG. 28 is a schematic depiction of the independent lighting system shown in FIG. 11, with resistors added to prevent a computer malfunction from occurring.

Referring now to FIG. 28, the schematic depiction of the independent lighting system shown in FIG. 11 has been modified to prevent the occurrence of a vehicle malfunction in the event that the jumpered connector 236 is disconnected from the first harness portion 220 with the vehicle lights on. A right high beam resistor 740 is connected between the high beam feed of the headlight power connector 226 and the high beam lead of the headlight connector 224. A right low beam resistor 742 is connected between the low beam feed of the headlight power connector 226 and the low beam lead of the headlight connector 224. A jumper is installed between the common feed of the headlight power connector 226 and the common lead of the headlight connector 224.

A left high beam resistor 744 is connected between the high beam feed of the headlight power connector 230 and the high beam lead of the headlight connector 228. A left low beam resistor 746 is connected between the low beam feed of the headlight power connector 230 and the low beam lead of the headlight connector 228. A jumper is installed between the common feed of the headlight power connector 230 and the common lead of the headlight connector 228.

The resistors 740, 742, 744, and 746 are typically each between approximately 500 Ohms and approximately 2,000 Ohms, and may preferably each be approximately 1,000 Ohms. The resistors 740 and 742 operate to permanently keep the high and low beams of the headlight 32 in the lighting circuit, although the resistors 740 and 742 are too high to allow the high and low beams of the headlight 32 to be fully illuminated when the jumpered connector 236 is disconnected from the first harness portion 220. The resistors 744 and 746 operate to permanently keep the high and low beams of the headlight 36 in the lighting circuit, although the resistors 744 and 7462 are too high to allow the high and low beams of the headlight 36 to be fully illuminated when the jumpered connector 236 is disconnected from the first harness portion 220.

Figure 29:
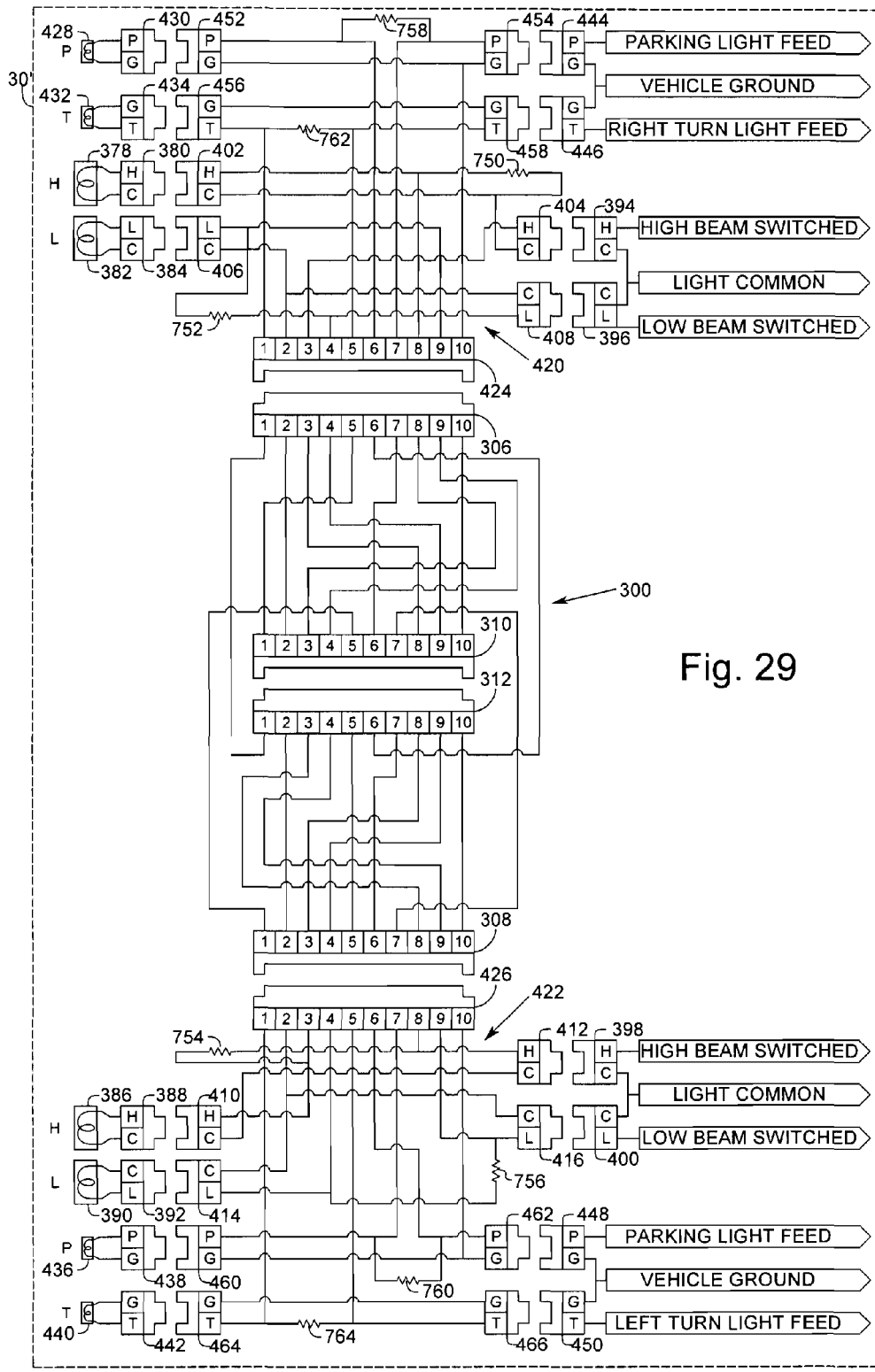
FIG. 29 is a schematic depiction of the independent lighting system shown in FIG. 18, with resistors added to prevent a computer malfunction from occurring.

Referring next to FIG. 29, the schematic depiction of the independent lighting system shown in FIG. 18 has been modified to prevent the occurrence of a vehicle malfunction in the event that the right side vehicle harness connector 310 and the left side vehicle harness connector 312 are disconnected with the vehicle lights on. A right high beam resistor 750 is connected between the high beam feed of the high beam headlight power connector 404 and the high beam lead of the high beam headlight connector 402. A right low beam resistor 752 is connected between the low beam feed of the low beam headlight power connector 408 and the low beam headlight connector 406. A left high beam resistor 754 is connected between the high beam feed of the high beam headlight power connector 412 and the high beam lead of the high beam headlight connector 410. A left low beam resistor 756 is connected between the low beam feed of the low beam headlight power connector 416 and the low beam lead of the low beam headlight connector 414.

A right parking light resistor 758 is connected between the parking light feed of the parking light power connector 454 and the parking light lead of the parking light connector 452. A left parking light resistor 760 is connected between the parking light feed of the parking light power connector 462 and the parking light lead of the parking light connector 460. A right turn signal resistor 762 is connected between the right turn light feed of the right turn light power connector 458 and the right turn light lead of the right turn light connector 456. A left turn signal light resistor 764 is connected between the left turn light feed of the left turn light power connector 466 and the left turn light lead of the left turn light connector 464.

The resistors 750, 752, 754, 756, 758, 760, 762, and 764 are typically each between approximately 500 Ohms and approximately 2,000 Ohms, and may preferably each be approximately 1,000 Ohms. The resistors 750 and 752 operate to permanently keep the high beam headlight 378 and the low beam headlight 382 in the lighting circuit, although the resistors 750 and 752 are too high to allow the high beam headlight 378 and the low beam headlight 382 to be fully illuminated when the right side vehicle harness connector 310 and the left side vehicle harness connector 312 are disconnected. The resistors 754 and 756 operate to permanently keep the high beam headlight 386 and the low beam headlight 390 in the lighting circuit, although the resistors 754 and 756 are too high to allow the high beam headlight 386 and the low beam headlight 390 to be fully illuminated when the right side vehicle harness connector 310 and the left side vehicle harness connector 312 are disconnected.

The resistors 758 and 760 operate to permanently keep the parking light 428 and the parking light 436 in the lighting circuit, although the resistors 758 and 760 are too high to allow the parking light 428 and the parking light 436 to be fully illuminated when the right side vehicle harness connector 310 and the left side vehicle harness connector 312 are disconnected. The resistors 762 and 764 operate to permanently keep the right turn light 432 and the left turn light 440 in the lighting circuit, although the resistors 762 and 764 are too high to allow the right turn light 432 and the left turn light 440 to be fully illuminated when the right side vehicle harness connector 310 and the left side vehicle harness connector 312 are disconnected.

Figure 30:
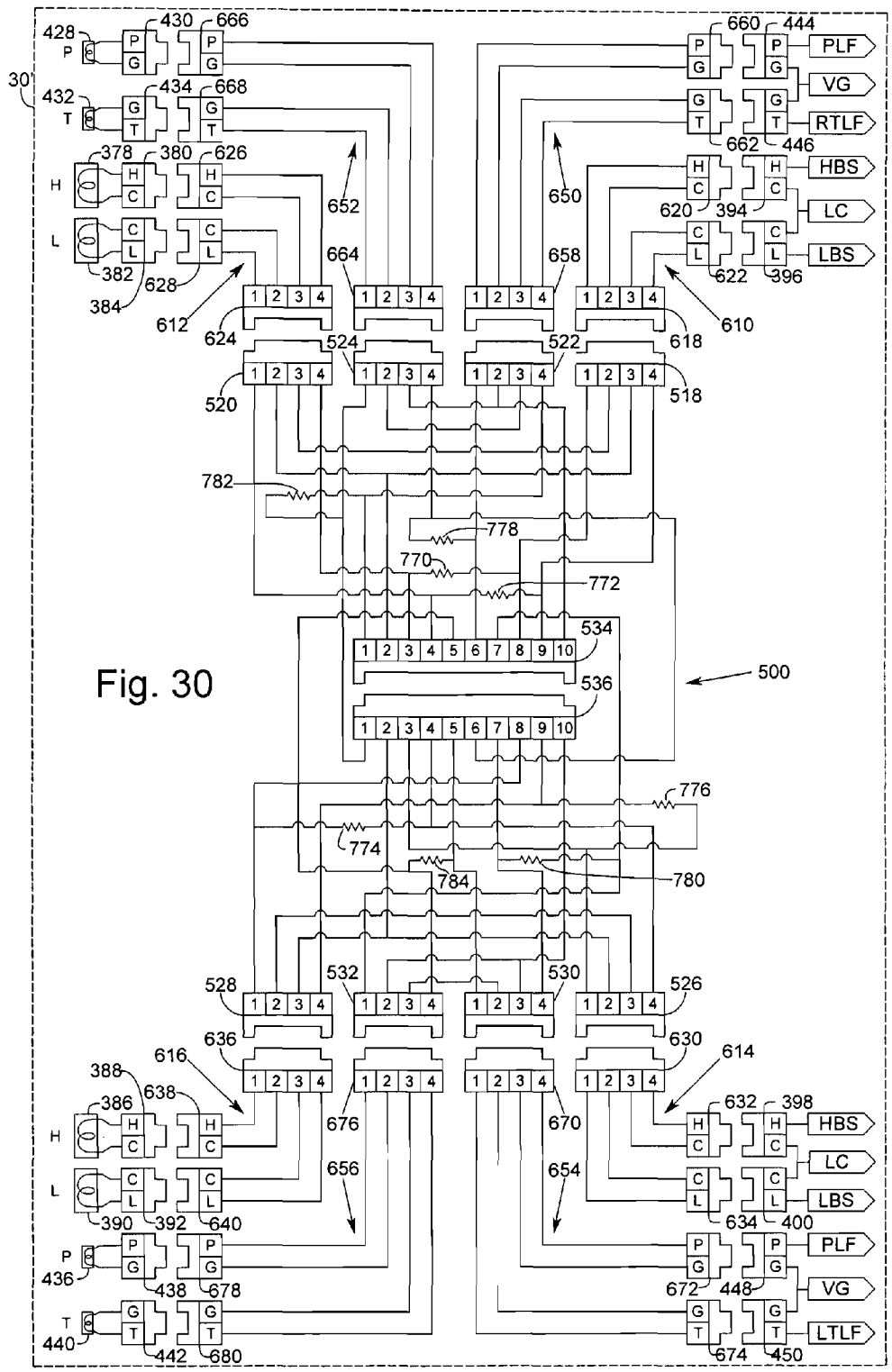
FIG. 30 is a schematic depiction of the independent lighting system shown in FIG. 23, with resistors added to prevent a computer malfunction from occurring.

Referring now to FIG. 30, the schematic depiction of the independent lighting system shown in FIG. 23 has been modified to prevent the occurrence of a vehicle malfunction in the event that the right side vehicle harness connector 534 and the left side vehicle harness connector 536 are disconnected with the vehicle lights on. In the embodiment shown in FIG. 30, all of the resistors are located in the main vehicle harness portion 500. A right high beam resistor 770 is connected between the high beam feed of the high beam headlight power connector 620 and the high beam lead of the high beam headlight connector 626. A right low beam resistor 772 is connected between the low beam feed of the low beam headlight power connector 622 and the low beam headlight connector 628. A left high beam resistor 774 is connected between the high beam feed of the high beam headlight power connector 632 and the high beam lead of the high beam headlight connector 638. A left low beam resistor 776 is connected between the low beam feed of the low beam headlight power connector 634 and the low beam lead of the low beam headlight connector 640.

A right parking light resistor 778 is connected between the parking light feed of the parking light power connector 660 and the parking light lead of the parking light connector 666. A left parking light resistor 780 is connected between the parking light feed of the parking light power connector 672 and the parking light lead of the parking light connector 678. A right turn signal resistor 782 is connected between the right turn light feed of the right turn light power connector 662 and the right turn light lead of the right turn light connector 668. A left parking light resistor 784 is connected between the left turn light feed of the left turn light power connector 674 and the left turn light lead of the left turn light connector 680.

The resistors 770, 772, 774, 776, 778, 780, 782, and 784 are typically each between approximately 500 Ohms and approximately 2,000 Ohms, and may preferably each be approximately 1,000 Ohms. The resistors 770 and 772 operate to permanently keep the high beam headlight 378 and the low beam headlight 382 in the lighting circuit, although the resistors 770 and 772 are too high to allow the high beam headlight 378 and the low beam headlight 382 to be fully illuminated when the right side vehicle harness connector 534 and the left side vehicle harness connector 536 are disconnected. The resistors 774 and 776 operate to permanently keep the high beam headlight 386 and the low beam headlight 390 in the lighting circuit, although the resistors 774 and 776 are too high to allow the high beam headlight 386 and the low beam headlight 390 to be fully illuminated when the right side vehicle harness connector 534 and the left side vehicle harness connector 536 are disconnected.

The resistors 778 and 780 operate to permanently keep the parking light 428 and the parking light 436 in the lighting circuit, although the resistors 778 and 780 are too high to allow the parking light 428 and the parking light 436 to be fully illuminated when the right side vehicle harness connector 534 and the left side vehicle harness connector 536 are disconnected. The resistors 782 and 784 operate to permanently keep the right turn light 432 and the left turn light 440 in the lighting circuit, although the resistors 782 and 784 are too high to allow the right turn light 432 and the left turn light 440 to be fully illuminated when the right side vehicle harness connector 534 and the left side vehicle harness connector 536 are disconnected.

Figure 31:
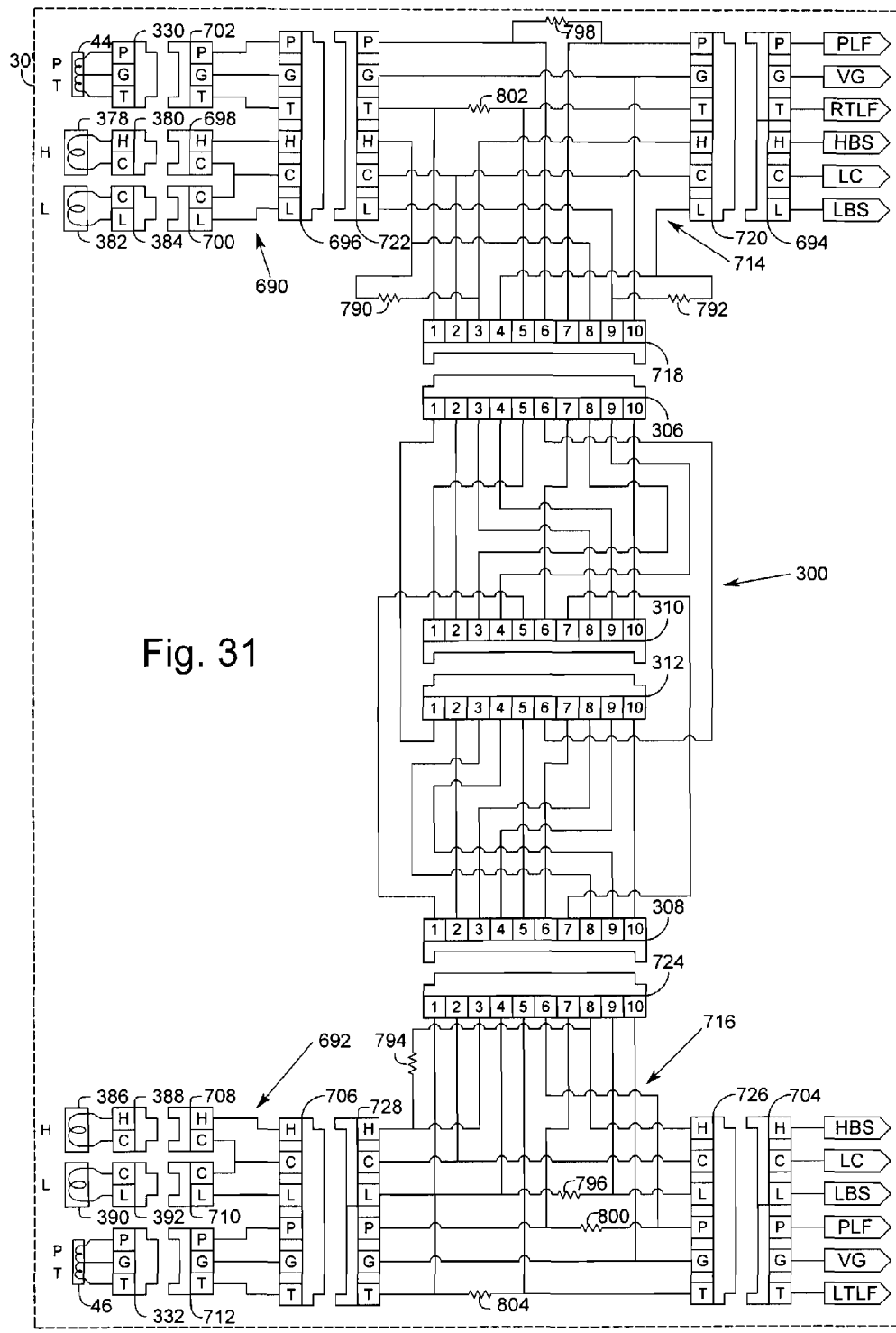
FIG. 31 is a schematic depiction of the independent lighting system shown in FIG. 25, with resistors added to prevent a computer malfunction from occurring.

Referring finally to FIG. 31, the schematic depiction of the independent lighting system shown in FIG. 25 has been modified to prevent the occurrence of a vehicle malfunction in the event that the right side vehicle harness connector 310 and the left side vehicle harness connector 312 are disconnected with the vehicle lights on. In the embodiment shown in FIG. 30, all of the resistors are located in the right auxiliary harness 714 and the left auxiliary harness 716. A right high beam resistor 790 is connected between pin H of the right light connector 722 and pin H of the right light power connector 720. A right low beam resistor 792 is connected between pin L of the right light connector 722 and pin L of the right light power connector 720. A left high beam resistor 794 is connected between pin H of the left light connector 728 and pin H of the left light power connector 728. A left low beam resistor 796 is connected between pin L of the left light connector 728 and pin L of the left light power connector 728.

A right parking light resistor 798 is connected between pin P of the right light connector 722 and pin P of the right light power connector 720. A left parking light resistor 800 is connected between pin P of the left light connector 728 and pin P of the left light power connector 728. A right turn signal resistor 802 is connected between pin T of the right light connector 722 and pin T of the right light power connector 720. A left parking light resistor 804 is connected between pin T of the left light connector 728 and pin T of the left light power connector 728.

The resistors 790, 792, 794, 796, 798, 800, 802, and 804 are typically each between approximately 500 Ohms and approximately 2,000 Ohms, and may preferably each be approximately 1,000 Ohms. The resistors 790 and 792 operate to permanently keep the high beam headlight 378 and the low beam headlight 382 in the lighting circuit, although the resistors 790 and 792 are too high to allow the high beam headlight 378 and the low beam headlight 382 to be fully illuminated when the right side vehicle harness connector 310 and the left side vehicle harness connector 312 are disconnected. The resistors 794 and 796 operate to permanently keep the high beam headlight 386 and the low beam headlight 390 in the lighting circuit, although the resistors 794 and 796 are too high to allow the high beam headlight 386 and the low beam headlight 390 to be fully illuminated when the right side vehicle harness connector 310 and the left side vehicle harness connector 312 are disconnected.

The resistors 798 and 800 operate to permanently keep the parking light of the parking/turn light 44 and the parking light of the parking/turn light 44 in the lighting circuit, although the resistors 798 and 800 are too high to allow the parking light of the parking/turn light 44 and the parking light of the parking/turn light 46 to be fully illuminated when the right side vehicle harness connector 310 and the left side vehicle harness connector 312 are disconnected. The resistors 802 and 804 operate to permanently keep the right turn light of the parking/turn light 44 and the left turn light of the parking/turn light 46 in the lighting circuit, although the resistors 802 and 804 are too high to allow the right turn light of the parking/turn light 44 and the left turn light of the parking/turn light 46 to be fully illuminated when the right side vehicle harness connector 310 and the left side vehicle harness connector 312 are disconnected.

It may therefore be appreciated from the above detailed description of the preferred embodiment of the present invention that it teaches independent lighting systems which facilitates the operation of auxiliary headlights by automatically disconnecting the vehicle headlights whenever the auxiliary headlights are connected for operation with the lighting system of the vehicle. The independent lighting systems of the present invention completely eliminate the need for any type of switch to choose between the vehicle headlights and the auxiliary headlights due to their design that allows the mere connection of the wiring harness of the front-mounted vehicle accessory to the wiring harness of the vehicle to disconnect the vehicle headlights and to connect the auxiliary. The independent lighting systems of the present invention also eliminate the need for any relays or additional electronic components to perform a switching function between the vehicle headlights and the auxiliary headlights.

The independent lighting systems feature a simplified design which does not require any wiring or other connection to the passenger compartment of the vehicles in which they is installed. The independent lighting systems are relatively simple and quick to install, and they require neither advanced knowledge of vehicle electrical systems nor special tools in order to accomplish their installation. The independent lighting systems provide sealed connectors to protect against the elements to which they will be exposed in operation, and do not rely upon the need for connector caps to protect their connectors, but rather eliminate the need for such caps entirely, thereby precluding the possibility of their loss or misplacement.

The independent lighting systems are of a construction which is both durable and long lasting, and will require little or no maintenance to be provided by the user throughout its operating lifetime. The independent lighting systems are also of inexpensive construction to enhance their market appeal and to thereby afford them the broadest possible market. Finally, all of the aforesaid advantages and objectives of the independent lighting systems are achieved without incurring any substantial relative disadvantage.

Although the foregoing description of the independent lighting systems has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. An independent lighting system for connecting an auxiliary headlight to the lighting system of a vehicle, the vehicle having a vehicle headlight and a headlight plug which supplies power from the lighting system of the vehicle to the vehicle headlight, said independent lighting system comprising:
   a headlight connector for connection to the vehicle headlight in place of the headlight plug;
   a headlight power connector for connection to the headlight plug;
   a first harness connector that is electrically connected to said headlight connector and to said headlight power connector;
   a second harness connector for removable connection to said first harness connector to enable the operation of the vehicle headlight by the lighting system of the vehicle; and
   a third harness connector that is electrically connected to the auxiliary headlight, said third harness connector for removable connection to said first harness connector to enable the operation of the auxiliary headlight by the lighting system of the vehicle.

2. An independent lighting system as defined in claim 1, wherein either said second harness connector or said third harness connector, but not both said second harness connector and said third harness connector, may be connected to said first harness connector.

3. An independent lighting system as defined in claim 1, wherein said first harness connector may be connected to either of said second harness connector or said third harness connector, but said second harness connector may not be connected to said third harness connector.

4. An independent lighting system as defined in claim 3, wherein said first harness connector is of a first gender and said second harness connector and said third harness connector are of a second gender which is different from said first gender.

5. An independent lighting system as defined in claim 1, wherein said first harness connector, said second harness connector, and said third harness connector each have housings with integrated sealing elements such that whenever said first harness connector is connected to one of said second harness connector and said third harness connector a seal is formed therebetween.

6. An independent lighting system as defined in claim 1, wherein said first harness connector, said second harness connector, and said third harness connector have housings with an integral releasable locking latch such that said first harness connector will remain connected to the one of said second harness connector and said third harness connector it is connected to until said locking latch is released.

7. An independent lighting system as defined in claim 1, wherein the vehicle also has a turn signal light and the independent lighting system also has a turn signal light, and wherein said independent lighting system additionally comprises:
  a turn signal connector for connection to the turn signal light of the vehicle, said turn signal connector also being electrically connected to said first harness connector;
wherein the turn signal light of the independent lighting system is electrically connected to said third harness connector, whereby when said first harness connector is connected to said third harness connector the turn signal light of the independent lighting system will operate whenever the turn signal light of the vehicle is operated.

8. An independent lighting system as defined in claim 1, wherein the vehicle also has a parking light and the independent lighting system also has a parking light, and wherein said independent lighting system additionally comprises:
  a parking light connector for connection to the parking light of the vehicle, said parking light connector also being electrically connected to said first harness connector;
wherein the parking light of the independent lighting system is electrically connected to said third harness connector, whereby when said first harness connector is connected to said third harness connector the parking light of the independent lighting system will operate whenever the parking light of the vehicle is operated.

9. An independent lighting system as defined in claim 1, wherein both said headlight connector and said headlight power connector are three pin connectors.

10. An independent lighting system as defined in claim 1, wherein the vehicle has right and left vehicle headlights respectively having right and left headlight plugs connected thereto to provide power from the lighting system of the vehicle to the right and left vehicle headlights, and wherein the independent lighting system also has left and right auxiliary headlights, and wherein said headlight connector is connected to the right vehicle headlight in place of the right headlight plug, and wherein said headlight power connector is connected to the right headlight plug, and wherein said third harness connector is electrically connected to one of the right and left auxiliary headlights, said independent lighting system additionally comprising:
  a second headlight connector for connection to the left vehicle headlight in place of the left headlight plug;
  a second headlight power connector for connection to the left headlight plug, wherein said second harness connector is electrically connected to said second headlight connector and to said second headlight power connector; and
  a fourth harness connector which is electrically connected to the other of the right and left auxiliary headlights, wherein said fourth harness connector may be removably connected to said second harness connector to enable the operation of the other of the right and left auxiliary headlights by the lighting system of the vehicle.

11. An independent lighting system as defined in claim 1, additionally comprising:
  a first auxiliary harness connector which is electrically connected to said headlight connector and to said headlight power connector; and
  a first interface connector which is electrically connected to said first harness connector, said first interface connector also being removably connected to said first auxiliary harness connector.

12. An independent lighting system as defined in claim 11, wherein said first auxiliary harness connector and said first interface connector each have housings with integrated sealing elements such that whenever said first auxiliary harness connector is connected to said first interface connector a seal is formed therebetween.

13. An independent lighting system as defined in claim 11, wherein said first auxiliary harness connector and said first interface connector have housings with an integral releasable locking latch such that said first auxiliary harness connector will remain connected to said first interface connector until said locking latch is released.

14. An independent lighting system as defined in claim 11, wherein the vehicle also has a turn signal light and the independent lighting system also has a turn signal light, and wherein said independent lighting energy interruption system additionally comprises:
  a turn signal connector for connection to the turn signal light of the vehicle, said turn signal connector also being electrically connected to said first auxiliary harness connector;
wherein the turn signal light of the independent lighting system is electrically connected to said third harness connector, whereby when said first harness connector is connected to said third harness connector the turn signal light of the independent lighting system will operate whenever the turn signal light of the vehicle is operated.

15. An independent lighting system as defined in claim 11, wherein the vehicle also has a parking light and the independent lighting system also has a parking light, and wherein said independent lighting system additionally comprises:
  a parking light connector for connection to the parking light of the vehicle, said parking light connector also being electrically connected to said first auxiliary harness connector;

wherein the parking light of the independent lighting system is electrically connected to said third harness connector, whereby when said first harness connector is connected to said third harness connector the parking light of the independent lighting system will operate whenever the parking light of the vehicle is operated.

16. An independent lighting system as defined in claim 1, additionally comprising:
   a first auxiliary harness connector which is electrically connected to said headlight connector;
   a second auxiliary harness connector which is electrically connected to said headlight power connector;
   a first interface connector which is electrically connected to said first harness connector, said first interface connector being removably electrically connected to said first auxiliary harness connector; and
   a second interface connector which is electrically connected to said first harness connector, said second interface connector being removably electrically connected to said second auxiliary harness connector.

17. An independent lighting system as defined in claim 16, wherein said first auxiliary harness connector and said first interface connector each have housings with integrated sealing elements such that whenever said first auxiliary harness connector is connected to said first interface connector a seal is formed therebetween, and wherein said second auxiliary harness connector and said second interface connector each have housings with integrated sealing elements such that whenever said second auxiliary harness connector is connected to said second interface connector a seal is formed therebetween.

18. An independent lighting system as defined in claim 16, wherein said first auxiliary harness connector and said first interface connector have housings with an integral releasable locking latch such that said first auxiliary harness connector will remain connected to said first interface connector until said locking latch is released, and wherein said second auxiliary harness connector and said second interface connector have housings with an integral releasable locking latch such that said second auxiliary harness connector will remain connected to said second interface connector until said locking latch is released.

19. An independent lighting system as defined in claim 1, additionally comprising:
   a resistor that is electrically connected between said headlight connector and said headlight power connector, wherein said resistor provides an electrical connection between the vehicle headlight and the headlight plug irrespective of whether or not said second harness connector is connected to said first harness connector.

20. A method of connecting an auxiliary headlight to the lighting system of a vehicle, the vehicle having a vehicle headlight and a headlight plug which supplies power from the lighting system of the vehicle to the vehicle headlight, said method comprising:
   connecting a headlight connector to the vehicle headlight in place of the headlight plug, said headlight connector being electrically connected to a first harness connector;
   connecting a headlight power connector to the headlight plug, said headlight power connector also being electrically connected to a first harness connector;
   removably connecting a second harness connector to said first harness connector to enable the operation of the vehicle headlight by the lighting system of the vehicle; and
   removably connecting a third harness connector which is electrically connected to the auxiliary headlight to said first harness connector to enable the operation of the first auxiliary headlight by the lighting system of the vehicle.

21. A method as defined in claim 20, additionally comprising:
   electrically connecting a first auxiliary harness connector to said headlight connector and to said headlight power connector; and
   electrically connecting a first interface connector to said first harness connector, said first interface connector also being removably connected to said first auxiliary harness connector.

22. A method as defined in claim 20, additionally comprising:
   electrically connecting a first auxiliary harness connector to said headlight connector;
   electrically connecting a second auxiliary harness connector to said headlight power connector;
   electrically connecting a first interface connector to said first harness connector, said first interface connector being removably electrically connected to said first auxiliary harness connector; and
   electrically connecting a second interface connector to said first harness connector, said second interface connector being removably electrically connected to said second auxiliary harness connector.

* * * * *

UNITED STATES PATENT AND TRADEMARK OFFICE
CERTIFICATE OF CORRECTION

| | | |
|---|---|---|
| PATENT NO. | : 8,162,521 B2 | |
| APPLICATION NO. | : 12/843165 | |
| DATED | : April 24, 2012 | |
| INVENTOR(S) | : William F. Menze, Michael L. Schultz and Timothy G. Koch | |

It is certified that error appears in the above-identified patent and that said Letters Patent is hereby corrected as shown below:

In the specification:

Col. 29, Line 50

"harness connector 536. Pin of the third left main harness" should read --harness connector 536. Pin 2 of the third left main harness--.

Signed and Sealed this
Fifth Day of June, 2012

David J. Kappos
*Director of the United States Patent and Trademark Office*